US011006311B2

(12) United States Patent
Goel et al.

(10) Patent No.: US 11,006,311 B2
(45) Date of Patent: May 11, 2021

(54) ETHERNET OVER CELLULAR

(71) Applicant: QUALCOMM Incorporated, San Diego, CA (US)

(72) Inventors: Satashu Goel, San Diego, CA (US); Peerapol Tinnakornsrisuphap, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/980,656

(22) Filed: May 15, 2018

(65) Prior Publication Data
US 2018/0338265 A1 Nov. 22, 2018

Related U.S. Application Data

(60) Provisional application No. 62/506,937, filed on May 16, 2017.

(51) Int. Cl.
H04W 28/02 (2009.01)
H04L 29/12 (2006.01)
(Continued)

(52) U.S. Cl.
CPC ..... *H04W 28/0263* (2013.01); *H04L 12/4625* (2013.01); *H04L 45/02* (2013.01);
(Continued)

(58) Field of Classification Search
CPC ..... H04L 12/4625; H04L 45/02; H04L 45/28; H04L 45/66; H04L 45/74; H04L 61/106; H04L 61/6022; H04L 69/22; H04W 28/0263; H04W 28/0268; H04W 40/12; H04W 40/242; H04W 40/248; H04W 4/70; H04W 80/02; H04W 92/02
See application file for complete search history.

(56) References Cited

U.S. PATENT DOCUMENTS 9,504,089 B2 * 11/2016 Klein ............... H04W 84/12
2002/0159407 A1 * 10/2002 Carrafiello ........... H04W 40/00
370/328

(Continued)

OTHER PUBLICATIONS

International Search Report and Written Opinion—PCT/US2018/033026—ISA/EPO—dated Nov. 6, 2018 (174067WO).
(Continued)

*Primary Examiner* — Saad A. Waqas
(74) *Attorney, Agent, or Firm* — Holland & Hart LLP

(57) ABSTRACT

Methods, systems, and devices for wireless communication are described. A plurality of Ethernet devices may transmit Ethernet frames through a cellular network. The Ethernet devices may be coupled to the cellular network via a cellular node. The cellular node may receiver Ethernet frames from the Ethernet devices, identify a traffic class to the Ethernet frames, and map the Ethernet frames to bearers based at least in part on the traffic classes. The cellular node may transmit the Ethernet frames to other cellular nodes using the bearers. At a core network, a mapping between the cellular node and the MAC addresses of the associated Ethernet devices may be stored to allow Ethernet frames to be routed through the cellular network.

28 Claims, 31 Drawing Sheets

(51) Int. Cl.
  *H04L 29/06* (2006.01)
  *H04L 12/751* (2013.01)
  *H04L 12/46* (2006.01)
  *H04L 12/741* (2013.01)
  *H04W 40/12* (2009.01)
  *H04W 92/02* (2009.01)
  *H04L 12/703* (2013.01)
  *H04W 4/70* (2018.01)
  *H04L 12/721* (2013.01)
  *H04W 40/24* (2009.01)
  *H04W 80/02* (2009.01)

(52) U.S. Cl.
  CPC ............ *H04L 45/74* (2013.01); *H04L 61/106* (2013.01); *H04L 61/6022* (2013.01); *H04L 69/22* (2013.01); *H04W 40/12* (2013.01); *H04L 45/28* (2013.01); *H04L 45/66* (2013.01); *H04W 4/70* (2018.02); *H04W 28/0268* (2013.01); *H04W 40/242* (2013.01); *H04W 40/248* (2013.01); *H04W 80/02* (2013.01); *H04W 92/02* (2013.01)

(56) References Cited

U.S. PATENT DOCUMENTS

| | | | |
|---|---|---|---|
| 2003/0112810 A1* | 6/2003 | Nakabayashi | H04W 28/14 370/401 |
| 2007/0064673 A1* | 3/2007 | Bhandaru | H04W 40/246 370/351 |
| 2007/0076648 A1* | 4/2007 | Yong | H04L 51/066 370/328 |
| 2007/0153741 A1* | 7/2007 | Blanchette | H04L 45/66 370/331 |
| 2008/0008128 A1* | 1/2008 | Nagarajan | H04W 8/04 370/331 |
| 2008/0008182 A1 | 1/2008 | Deng | |
| 2010/0115272 A1* | 5/2010 | Batta | H04L 45/566 713/162 |
| 2012/0213085 A1* | 8/2012 | Koren | H04W 72/005 370/241 |
| 2013/0136117 A1* | 5/2013 | Schrum, Jr. | H04L 45/66 370/338 |
| 2013/0301553 A1* | 11/2013 | Klein | H04W 76/12 370/329 |
| 2014/0293936 A1* | 10/2014 | Wang | H04W 80/00 370/329 |
| 2017/0142008 A1* | 5/2017 | Yoo | H04L 45/66 |

OTHER PUBLICATIONS

Partial International Search Report—PCT/US2018/033026—ISA/EPO—dated Aug. 31, 2018 (174067WO).

Spurgeon C E., et al., "Basic Switch Operation What an Ethernet Switch Does" In: "Ethernet Switches: An Introduction to Network Design with Switches", Apr. 1, 2014 (Apr. 1, 2014), O'Reilly Media, Incorporated, 1005 Gravenstein Highway North, Sebastopol, CA 95472, USA, XP055502006, ISBN: 978-1-4493-6730-5, pp. 1-21.

* cited by examiner

| Technology/Protocol | Ethertype | TCP/UDP | Port |
|---|---|---|---|
| IPv6 | 0x86DD | | |
| IPv4 | 0x0800 | | |
| Modbus TCP/IP | 0x0800 | TCP | 502 |
| EtherNet/IP | 0x0800 | UDP | 2222,44818 |
| PROFINET | 0x8892 | | |
| EtherCAT | 0x88A4 | | |
| Ethernet Powerlink | 0x88AB | | |
| SERCOS II | 0x88CD | | |
| Link Layer Discovery Protocol (LLDP) | 0x88CC | | |
| Media Redundancy Protocol (MRP) | 0x88E3 | | |
| Precision Time Protocol | 0x88F7 | | |
| VLAN-Tagged frame (802.1Q) | 0x8100 | | |
| Shortest Path Bridging (802.1AQ) | 0x8100 | | |
| VLAN-tagged frame (802.1Q) with double tagging | 0x9100 | | |

FIG. 6

| Packet Filter | | | | | | | | | EPS Bearer ID | Radio Bearer ID | QoS |
| --- | --- | --- | --- | --- | --- | --- | --- | --- | --- | --- | --- |
| Outer Ethertype | VLAN ID | VLAN Tag PCP | Inner Ethertype | Protocol | Source IP Address | Destination IP Address | Source Port | Destination Port | | | |
| 0x8100 | 123 | 5 | 0x8892 | * | * | * | * | * | 1 | 1 | QCI 5 |
| 0x8100 | 456 | 1 | 0x8892 | * | * | * | * | * | 2 | 2 | QCI 4 |
| 0x8100 | * | * | * | TCP | * | * | 161 | * | 3 | 3 | QCI 9 |
| 0x8100 | * | * | * | * | * | * | * | * | 3 | 3 | QCI 9 |

| Address | VLAN ID | Port | Timestamp |
|---|---|---|---|
| MAC_ID_1 |  | UE1 | t2 |
| MAC_ID_2 |  | P-GW0 | t0 |
| MAC_ID_3 |  | P-GW0 | t3 |
| MAC_ID_4 |  | UE1 | t1 |
| MAC_ID_N |  | UE2 | tn |

FIG. 10

ETHERNET OVER CELLULAR

CROSS REFERENCE & PRIORITY CLAIM

The present Application for Patent claims priority to and the benefit of U.S. Provisional Patent Application No. 62/506,927 by Goel et al., entitled "Ethernet Over Cellular," filed May 16, 2017, assigned to the assignee hereof, and expressly incorporated by reference in its entirety as if fully set forth below and for all applicable purposes.

TECHNICAL FIELD

The technology discussed below relates generally to wireless communication, and more specifically to Ethernet over cellular. Some embodiments can enable and provide solutions and techniques related to interoperability of cellular systems (e.g., LTE or 5G/NR) between or with Ethernet networks (e.g., industrial Ethernet deployments) and can be used in a variety of Internet of Things (IoT) deployment scenarios.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some networks, for example industrial control networks, rely on Ethernet networks due to their high performance requirements such as low latency, high reliability, high redundancy, and high determinism. Some of these Ethernet networks use industrial networking technologies, such as Process Field Net (PROFINET) or Time Sensitive Networking (TSN), that perform Ethernet routing at a data link layer instead of using an internet protocol layer. However, systems using wired Ethernet connections have disadvantages. For example, the deployment and maintenance of Ethernet cables can be expensive and may be a hazard near moving machinery. Wireless networks may avoid some or all of the issues presented by the cables, but a complete replacement of such industrial control networks may be prohibitively expensive, and equipment and machinery configured to use Ethernet may not be compatible with wireless networks.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, or apparatuses that support Ethernet over cellular. In some examples, the described techniques provide for a cellular node coupled to one or more Ethernet devices. The cellular node may include a traffic flow template (TFT) module and a bearer mapping module. The TFT module may be configured to identify traffic classes for Ethernet frames received from the Ethernet devices. The bearer mapping module may be configured to map the Ethernet frames to a corresponding bearer for transport from the cellular node to another cellular node based at least in part on the identified traffic classes.

In some examples, the described techniques may provide a cellular node. The cellular node may receive an Ethernet frame from an Ethernet device via another cellular node. The Ethernet frame may include an indication of a source media access control (MAC) address. The cellular node may identify a mapping between the source MAC address and the another cellular device and store the mapping in a forwarding database. The forwarding database may be used to route Ethernet frames through the cellular network based on the associated destination MAC address.

In some examples, the described techniques may provide a cellular bridge, which may have a wireless link between a first cellular node and a second cellular node. The cellular bridge may receive a first bridge protocol data unit from a neighboring network bridge and identify a cost for the wireless link between the first cellular node and the second cellular node. The cellular bridge may transmit, to one or more other neighboring network bridges of an Ethernet over cellular network, a second bridge protocol data unit including the identified cost for the wireless link.

In some examples, the described techniques may provide a cellular bridge, which may have a wireless link between a first cellular node and a second cellular node in an Ethernet over cellular network. The cellular bridge may identify a value for one or more parameters of the wireless link and determine the supported port speeds of the cellular bridge based at least in part on the identified value for the one or more parameters of the wireless link. The cellular bridge may transmit to another bridge an auto-negotiation transmission that includes an indication of the one or more supported port speeds.

A method of wireless communication is described. The method may include receiving, at a first cellular node, an indication of a source MAC address for an Ethernet frame received at a first port of a set of ports of a cellular network switch, identifying a first mapping between the source MAC address and an identifier of the first cellular node or a second cellular node corresponding to the first port, and storing the first mapping in a forwarding database at the first cellular node.

An apparatus for wireless communication is described. The apparatus may include a processor, memory in electronic communication with the processor, and instructions stored in the memory. The instructions may be executable by the processor to cause the apparatus to receive, at a first cellular node, an indication of a source MAC address for an Ethernet frame received at a first port of a set of ports of a cellular network switch, identify a first mapping between the source MAC address and an identifier of the first cellular node or a second cellular node corresponding to the first port, and store the first mapping in a forwarding database at the first cellular node.

Another apparatus for wireless communication is described. The apparatus may include means for receiving, at a first cellular node, an indication of a source MAC address for an Ethernet frame received at a first port of a set of ports of a cellular network switch, identifying a first mapping between the source MAC address and an identifier of the first cellular node or a second cellular node corresponding to the first port, and storing the first mapping in a forwarding database at the first cellular node.

A non-transitory computer-readable medium storing code for wireless communication is described. The code may include instructions executable by a processor to receive, at a first cellular node, an indication of a source MAC address for an Ethernet frame received at a first port of a set of ports of a cellular network switch, identify a first mapping between the source MAC address and an identifier of the first cellular node or a second cellular node corresponding to the first port, and store the first mapping in a forwarding database at the first cellular node.

Some examples of the method, apparatuses, and non-transitory computer-readable medium described herein may further include operations, features, means, or instructions for receiving a broadcast, multicast, or unknown unicast Ethernet frame and mapping the received broadcast, multicast, or unknown unicast Ethernet frame to a set of unicast frames for a set of UEs.

Some examples of the method, apparatuses, and non-transitory computer-readable medium described herein may further include operations, features, means, or instructions for receiving a broadcast, multicast, or unknown unicast Ethernet frame and mapping the received broadcast, multicast, or unknown unicast Ethernet frame to a cellular broadcast channel.

In some examples of the method, apparatuses, and non-transitory computer-readable medium described herein, the cellular network switch comprises a plurality of cellular nodes corresponding to the plurality of ports. In some examples of the method, apparatuses, and non-transitory computer-readable medium described herein, the first cellular node is one of the plurality of cellular nodes.

Some examples of the method, apparatuses, and non-transitory computer-readable medium described herein may further include operations, features, means, or instructions for transmitting, to a third cellular node, one or more mappings from the forwarding database.

In some examples of the method, apparatuses, and non-transitory computer-readable medium described herein, the first cellular node includes a UE and the third cellular node includes a node of next generation core (NGC).

Some examples of the method, apparatuses, and non-transitory computer-readable medium described herein may further include operations, features, means, or instructions for receiving a second Ethernet frame at the first port, identifying a second source MAC address for the second Ethernet frame and updating the forwarding database with a second mapping between the second source MAC address and the identifier of the first cellular node or the second cellular node corresponding to the first port.

In some examples of the method, apparatuses, and non-transitory computer-readable medium described herein, updating the forwarding database includes: identifying a first time indication in the forwarding database for the first mapping, the method further including comparing the first time indication to a second time indication for the second mapping and updating the forwarding database with the second mapping based on the comparison.

Some examples of the method, apparatuses, and non-transitory computer-readable medium described herein may further include operations, features, means, or instructions for monitoring a time indication in the forwarding database for the first mapping, identifying that the time indication exceeds an age threshold and removing the first mapping from the forwarding database based on the identification.

Some examples of the method, apparatuses, and non-transitory computer-readable medium described herein may further include operations, features, means, or instructions for receiving a second Ethernet frame at a second port corresponding to the first cellular node, identifying a destination MAC address for the second Ethernet frame, the destination MAC address a same address as the source MAC address and routing the second Ethernet frame to the first cellular node or the second cellular node based on the identification and the forwarding database.

In some examples of the method, apparatuses, and non-transitory computer-readable medium described herein, the identifier of the second cellular node includes an international mobile subscriber identity (IMSI), or a subscription identifier, or a certificate identifier, or an access point name (APN), or a Data Network Name (DNN), or a General Packet Radio Service (GPRS) Tunneling Protocol (GTP) tunnel endpoint identifier (TED), or a combination thereof.

In some examples of the method, apparatuses, and non-transitory computer-readable medium described herein, the source MAC address may be associated with a virtual local area network (VLAN) identifier, and identifying the first mapping between the source MAC address and the identifier of the first cellular node or the second cellular node includes identifying a mapping between a source pair and the identifier of the first cellular node or the second cellular node, the source pair including the source MAC address and the associated VLAN identifier.

In some examples of the method, apparatuses, and non-transitory computer-readable medium described herein, the first cellular network switch communicates in a first VLAN using the first port of the set of ports and a second VLAN using a second port of the set of ports.

Some examples of the method, apparatuses, and non-transitory computer-readable medium described herein may further include operations, features, means, or instructions for maintaining a first forwarding database for the first VLAN and maintaining a second forwarding database for the second VLAN.

A method of wireless communication is described. The method may include receiving, at a cellular bridge of a local area network including the cellular bridge and other network bridges, a first bridge protocol data unit (BPDU) from a neighboring network bridge, the cellular bridge including a wireless link between a first cellular node and a second cellular node, identifying a cost for the wireless link between the first cellular node and the second cellular node, and transmitting, to one or more other neighboring network bridges of the local area network, a second BPDU including the identified cost for the wireless link.

An apparatus for wireless communication is described. The apparatus may include a processor, memory in electronic communication with the processor, and instructions stored in the memory. The instructions may be executable by the processor to cause the apparatus to receive, at a cellular bridge of a local area network including the cellular bridge and other network bridges, a first BPDU from a neighboring network bridge, the cellular bridge including a wireless link between a first cellular node and a second cellular node, identify a cost for the wireless link between the first cellular node and the second cellular node, and transmit, to one or more other neighboring network bridges of the local area network, a second BPDU including the identified cost for the wireless link.

Another apparatus for wireless communication is described. The apparatus may include means for receiving, at a cellular bridge of a local area network including the cellular bridge and other network bridges, a first BPDU from a neighboring network bridge, the cellular bridge including a wireless link between a first cellular node and a second cellular node, identifying a cost for the wireless link between the first cellular node and the second cellular node, and transmitting, to one or more other neighboring network bridges of the local area network, a second BPDU including the identified cost for the wireless link.

A non-transitory computer-readable medium storing code for wireless communication is described. The code may include instructions executable by a processor to receive, at a cellular bridge of a local area network including the cellular bridge and other network bridges, a first BPDU from a neighboring network bridge, the cellular bridge including a wireless link between a first cellular node and a second cellular node, identify a cost for the wireless link between the first cellular node and the second cellular node, and transmit, to one or more other neighboring network bridges of the local area network, a second BPDU including the identified cost for the wireless link.

Some examples of the method, apparatuses, and non-transitory computer-readable medium described herein may further include operations, features, means, or instructions for identifying a root bridge of the local area network and transmitting the second BPDU includes forwarding the second BPDU toward the one or more other neighboring networks bridges.

In some examples of the method, apparatuses, and non-transitory computer-readable medium described herein, the identified cost for the wireless link includes a fixed value, or a value indicating a downlink capacity of the wireless link, or a value indicating an uplink capacity of the wireless link, or a combination thereof.

In some examples of the method, apparatuses, and non-transitory computer-readable medium described herein, the cellular bridge includes a UE, or a packet data network gateway (P-GW), or a user plane function (UPF), or a combination thereof.

Some examples of the method, apparatuses, and non-transitory computer-readable medium described herein may further include operations, features, means, or instructions for identifying the cost for the wireless link between the first cellular node and the second cellular node may be based on an identification that the BPDU may be received at the UE, or that the BPDU may be received at the P-GW or the UPF.

Some examples of the method, apparatuses, and non-transitory computer-readable medium described herein may further include operations, features, means, or instructions for determining that the wireless link may be unavailable, where determining that the wireless link may be unavailable includes at least one of determining that the wireless link may have been lost and determining that a channel quality of the wireless link may have degraded past a channel quality threshold and triggering a topology change notification based on determining that the wireless link may be unavailable.

A method of wireless communication is described. The method may include receiving a plurality of Ethernet frames at a first cellular node of a cellular network, identifying traffic classes for the plurality of received Ethernet frames, and mapping the plurality of received Ethernet frames to a plurality of bearers for transport from the first cellular node to a second cellular node of the cellular network based at least in part on the identified traffic classes for the plurality of received Ethernet frames.

An apparatus for wireless communication is described. The apparatus may include means for receiving a plurality of Ethernet frames at a first cellular node of a cellular network, means for identifying traffic classes for the plurality of received Ethernet frames, and means for mapping the plurality of received Ethernet frames to a plurality of bearers for transport from the first cellular node to a second cellular node of the cellular network based at least in part on the identified traffic classes for the plurality of received Ethernet frames.

Another apparatus for wireless communication is described. The apparatus may include a processor, memory in electronic communication with the processor, and instructions stored in the memory. The instructions may be operable to cause the processor to receive a plurality of Ethernet frames at a first cellular node of a cellular network, identify traffic classes for the plurality of received Ethernet frames, and map the plurality of received Ethernet frames to a plurality of bearers for transport from the first cellular node to a second cellular node of the cellular network based at least in part on the identified traffic classes for the plurality of received Ethernet frames.

A non-transitory computer readable medium for wireless communication is described. The non-transitory computer-readable medium may include instructions operable to cause a processor to receive a plurality of Ethernet frames at a first cellular node of a cellular network, identify traffic classes for the plurality of received Ethernet frames, and map the plurality of received Ethernet frames to a plurality of bearers for transport from the first cellular node to a second cellular node of the cellular network based at least in part on the identified traffic classes for the plurality of received Ethernet frames.

In some examples of the method, apparatus, and non-transitory computer-readable medium described above, identifying the traffic classes for the plurality of received Ethernet frames comprises identifying, for a first Ethernet frame of the plurality of received Ethernet frames, a value for a parameter of the first Ethernet frame. Some examples of the method, apparatus, and non-transitory computer-readable medium described above may further include processes, features, means, or instructions for determining that the identified value for the parameter may be associated with a first of the traffic classes.

In some examples of the method, apparatus, and non-transitory computer-readable medium described above, the parameter comprises an Ethertype, or a virtual local area network (VLAN) identifier, or a VLAN tag priority code point (PCP), or a transmission protocol type, or a source address, or a destination address, or a source port identifier, or a destination port identifier, or a combination thereof.

In some examples of the method, apparatus, and non-transitory computer-readable medium described above, mapping the received Ethernet frames based at least in part on the identified traffic classes for the plurality of received Ethernet frames comprises applying, for each of the respective plurality of received Ethernet frames, one or more packet filter rules to the identified traffic classes of a respective Ethernet frame to obtain a result. Some examples of the method, apparatus, and non-transitory computer-readable medium described above may further include processes, features, means, or instructions for mapping each of the plurality of received Ethernet frames to a bearer of the plurality of bearers based at least in part on the result.

In some examples of the method, apparatus, and non-transitory computer-readable medium described above, a TFT of the first cellular node comprises the one or more packet filter rules.

In some examples of the method, apparatus, and non-transitory computer-readable medium described above, mapping the plurality of received Ethernet frames to the plurality bearers comprises mapping the plurality of received Ethernet frames to an evolved packet system bearer identifier, or a radio bearer identifier, or a quality of service class identifier, or a combination thereof.

Some examples of the method, apparatus, and non-transitory computer-readable medium described above may further include processes, features, means, or instructions for identifying a PCP field in a virtual local area network tag of one or more of the plurality of received Ethernet frames. Some examples of the method, apparatus, and non-transitory computer-readable medium described above may further include processes, features, means, or instructions for mapping the one or more of the plurality of received Ethernet frames to the quality of service class identifier based at least in part on the PCP field in the VLAN tag.

In some examples of the method, apparatus, and non-transitory computer-readable medium described above, identifying the traffic classes for the plurality of received Ethernet frames comprises identifying a first Ethertype for each of the plurality of received Ethernet frames.

In some examples of the method, apparatus, and non-transitory computer-readable medium described above, identifying the traffic classes for the plurality of received Ethernet frames further comprises identifying a presence of a VLAN indicator associated with the first Ethertype. Some examples of the method, apparatus, and non-transitory computer-readable medium described above may further include processes, features, means, or instructions for identifying a second Ethertype based at least in part on identifying the presence of the VLAN indicator. Some examples of the method, apparatus, and non-transitory computer-readable medium described above may further include processes, features, means, or instructions for mapping the plurality of received Ethernet frames may be based at least in part on the identified second Ethertype.

Some examples of the method, apparatus, and non-transitory computer-readable medium described above may further include processes, features, means, or instructions for transmitting the plurality of received Ethernet frames on the plurality of bearers to the second cellular node via a non-internet protocol (non-IP) packet data network based at least in part on the mapping.

Some examples of the method, apparatus, and non-transitory computer-readable medium described above may further include processes, features, means, or instructions for receiving a plurality of interne protocol (IP) frames at the first cellular node. Some examples of the method, apparatus, and non-transitory computer-readable medium described above may further include processes, features, means, or instructions for mapping the received plurality of IP frames to an IP bearer to transport the received plurality of IP frames from the first cellular node to a second cellular node of the Ethernet over cellular network, wherein the IP bearer may be distinct from the plurality of bearers.

Some examples of the method, apparatus, and non-transitory computer-readable medium described above may further include processes, features, means, or instructions for transmitting the plurality of IP frames on the IP bearer to the second cellular node via an IP packet data network.

In some examples of the method, apparatus, and non-transitory computer-readable medium described above, a first bearer of the plurality of bearers may be configured to carry two or more of the plurality of traffic classes.

Some examples of the method, apparatus, and non-transitory computer-readable medium described above may further include processes, features, means, or instructions for establishing the plurality of bearers based at least in part on a preconfigured list of bearers.

Some examples of the method, apparatus, and non-transitory computer-readable medium described above may further include processes, features, means, or instructions for receiving, at the first cellular node, an Ethernet frame associated with an additional traffic class. Some examples of the method, apparatus, and non-transitory computer-readable medium described above may further include processes, features, means, or instructions for identifying an absence of a bearer for the additional traffic class. Some examples of the method, apparatus, and non-transitory computer-readable medium described above may further include processes, features, means, or instructions for establishing, in addition to the plurality of bearers, the bearer for the additional traffic class.

In some examples of the method, apparatus, and non-transitory computer-readable medium described above, the first cellular node comprises a user equipment (UE), and the second cellular node comprises a packet data network gateway (P-GW) or a user plane function (UPF). In some examples of the method, apparatus, and non-transitory computer-readable medium described above, the first cellular node comprises the P-GW or the UPF, and the second cellular node comprises the UE.

A method of wireless communication is described. The method may include identifying, at a first cellular bridge of aa local area network comprising the first cellular bridge and other network bridges, a value for one or more parameters of a wireless link between a first cellular node of the first cellular bridge and a second cellular node of the first cellular bridge, determining one or more supported port speeds of the first cellular bridge based at least in part on the identified value for the one or more parameters of the wireless link, and transmitting, to a second bridge of the local area network, a first auto-negotiation transmission that includes an indication of the one or more supported port speeds for the first cellular bridge, wherein the second bridge comprises one or more of the other network bridges or a second cellular bridge.

An apparatus for wireless communication is described. The apparatus may include means for identifying, at a first cellular bridge of aa local area network comprising the first cellular bridge and other network bridges, a value for one or more parameters of a wireless link between a first cellular node of the first cellular bridge and a second cellular node of the first cellular bridge, means for determining one or more supported port speeds of the first cellular bridge based at least in part on the identified value for the one or more parameters of the wireless link, and means for transmitting, to a second bridge of the local area network, a first auto-negotiation transmission that includes an indication of the one or more supported port speeds for the first cellular bridge, wherein the second bridge comprises one or more of the other network bridges or a second cellular bridge.

Another apparatus for wireless communication is described. The apparatus may include a processor, memory in electronic communication with the processor, and instructions stored in the memory. The instructions may be operable to cause the processor to identify, at a first cellular bridge of aa local area network comprising the first cellular bridge and other network bridges, a value for one or more parameters of a wireless link between a first cellular node of the first cellular bridge and a second cellular node of the first cellular bridge, determine one or more supported port speeds of the first cellular bridge based at least in part on the identified value for the one or more parameters of the wireless link, and transmit, to a second bridge of the local area network, a first auto-negotiation transmission that includes an indication of the one or more supported port speeds for the first cellular bridge, wherein the second bridge comprises one or more of the other network bridges or a second cellular bridge.

A non-transitory computer readable medium for wireless communication is described. The non-transitory computer-readable medium may include instructions operable to cause a processor to identify, at a first cellular bridge of aa local area network comprising the first cellular bridge and other network bridges, a value for one or more parameters of a wireless link between a first cellular node of the first cellular bridge and a second cellular node of the first cellular bridge, determine one or more supported port speeds of the first cellular bridge based at least in part on the identified value for the one or more parameters of the wireless link, and transmit, to a second bridge of the local area network, a first auto-negotiation transmission that includes an indication of the one or more supported port speeds for the first cellular bridge, wherein the second bridge comprises one or more of the other network bridges or a second cellular bridge.

Some examples of the method, apparatus, and non-transitory computer-readable medium described above may further include processes, features, means, or instructions for receiving, from the second bridge, a second auto-negotiation transmission that includes an indication of one or more supported port speeds for the second bridge. Some examples of the method, apparatus, and non-transitory computer-readable medium described above may further include processes, features, means, or instructions for determining a port speed for communications between the first cellular bridge and the second bridge based at least in part on the one or more supported port speeds for the first cellular bridge and the one or more supported port speeds for the second bridge.

Other aspects, features, and embodiments of the technology will become apparent to those of ordinary skill in the art, upon reviewing the following description of specific, exemplary embodiments in conjunction with the accompanying features. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments, it should be understood that such exemplary embodiments can be implemented in varying shapes, sizes, layouts, arrangements, circuits, devices, systems, and methods.

BRIEF DESCRIPTION OF THE DRAWINGS

FIG. 6 illustrates an example of a classification table used by a wireless device in a communications network that supports Ethernet over cellular in accordance with aspects of the present disclosure.

FIG. 10 illustrates an example of a forwarding database in a communications network that supports Ethernet over cellular in accordance with aspects of the present disclosure.

DETAILED DESCRIPTION

Figure 1:
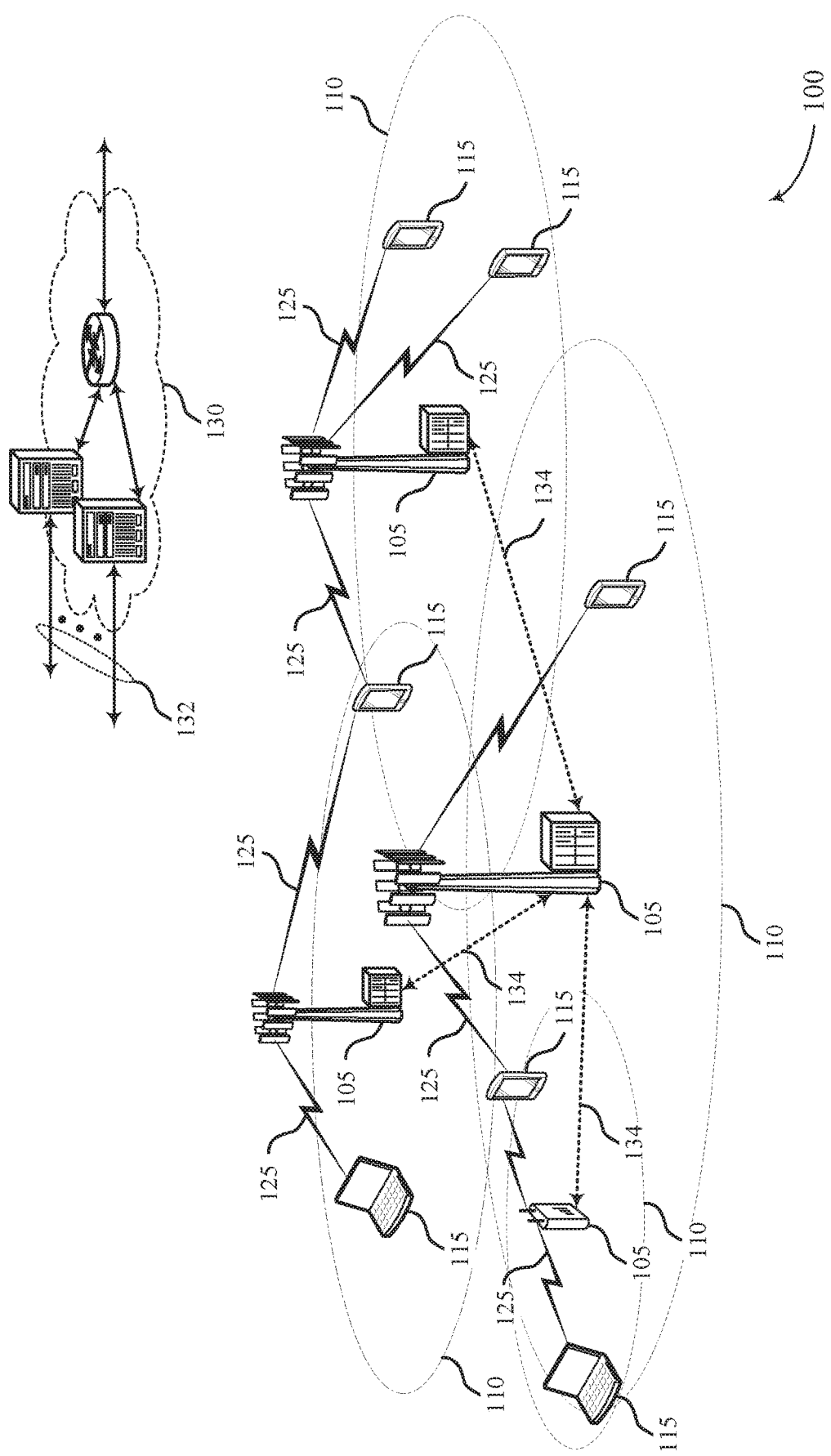
FIG. 1 illustrates an example of a system for wireless communication that supports Ethernet over cellular in accordance with aspects of the present disclosure.

Certain wired networks, such as industrial control networks, may benefit from the deployment of wireless communication technologies. A wireless communication network for use in industrial control networks may interoperate with existing Ethernet-based industrial networking technologies (e.g., PROFINET or TSN) at a data link layer, and in some cases may be implemented with little or no modification to existing machines and end devices.

Wireless communication networks for use in industrial control networks may include a cellular network coupled to one or more Ethernet devices. These can be used as remote input/output devices, controllers, and the like. Each Ethernet device may be coupled to a cellular node (e.g., a user equipment (UE) or gateway). Couplings may be accomplished via one or more adapter modules as discussed below. The cellular node and/or adapter may include a traffic flow template (TFT) module and a bearer mapping module for classifying incoming Ethernet traffic into one or more classifications and mapping the traffic classifications to two or more evolved packet system (EPS) bearers. The cellular network may also store a forwarding database for routing Ethernet communications through the cellular network based on the MAC address of the destination Ethernet device.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Aspects of the disclosure are initially described in the context of a wireless communications system. Aspects of the disclosure are further illustrated by and described with reference to apparatus diagrams, system diagrams, and flowcharts that relate to Ethernet over cellular.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. The wireless communications system 100 may be coupled to one or more Ethernet devices. For example, one or more Ethernet devices may be coupled to UEs 115 (either directly or via an adapter).

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be or incorporate an evolved packet core (EPC) or a next generation core (NGC), or a combination of these, which may include at least one mobility management entity (MME), at least one serving gateway (S-GW), and at least one Packet Data Network (PDN) gateway (P-GW). The MME may be the control node that processes the signaling between the UE 115 and the EPC, or NGC, or both. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

UEs 115 and/or components of the core network 130 (e.g., one or more P-GWs) may include a cellular node communications manager 101. The cellular node communications manager 101 may identify traffic classes for a plurality of received Ethernet frames and map the plurality of Ethernet frames to a plurality of bearers for transport from the cellular node to another cellular node of a cellular network based at least in part on the identified traffic classes for the plurality of Ethernet frames.

Components of the core network 130 may include a core network device communications manager 102. The core network device communications manager 102 may identifying a mapping between a source MAC address of an Ethernet frame and an identifier of a cellular node corresponding to the port over which the Ethernet frame was received. The core network device communications manager 102 may also store the mapping in a forwarding database.

Components of the core network 130 may include a cellular bridge 103. The cellular bridge 103 may calculate a cost for a wireless link between a first and second cellular node in a cellular network. The cellular bridge may identify a value for one or more parameters of a wireless link between a first and second cellular bridge and determine one or more supported port speeds of the cellular bridge based at least in part on the identified value for the one or more parameters of the wireless link.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
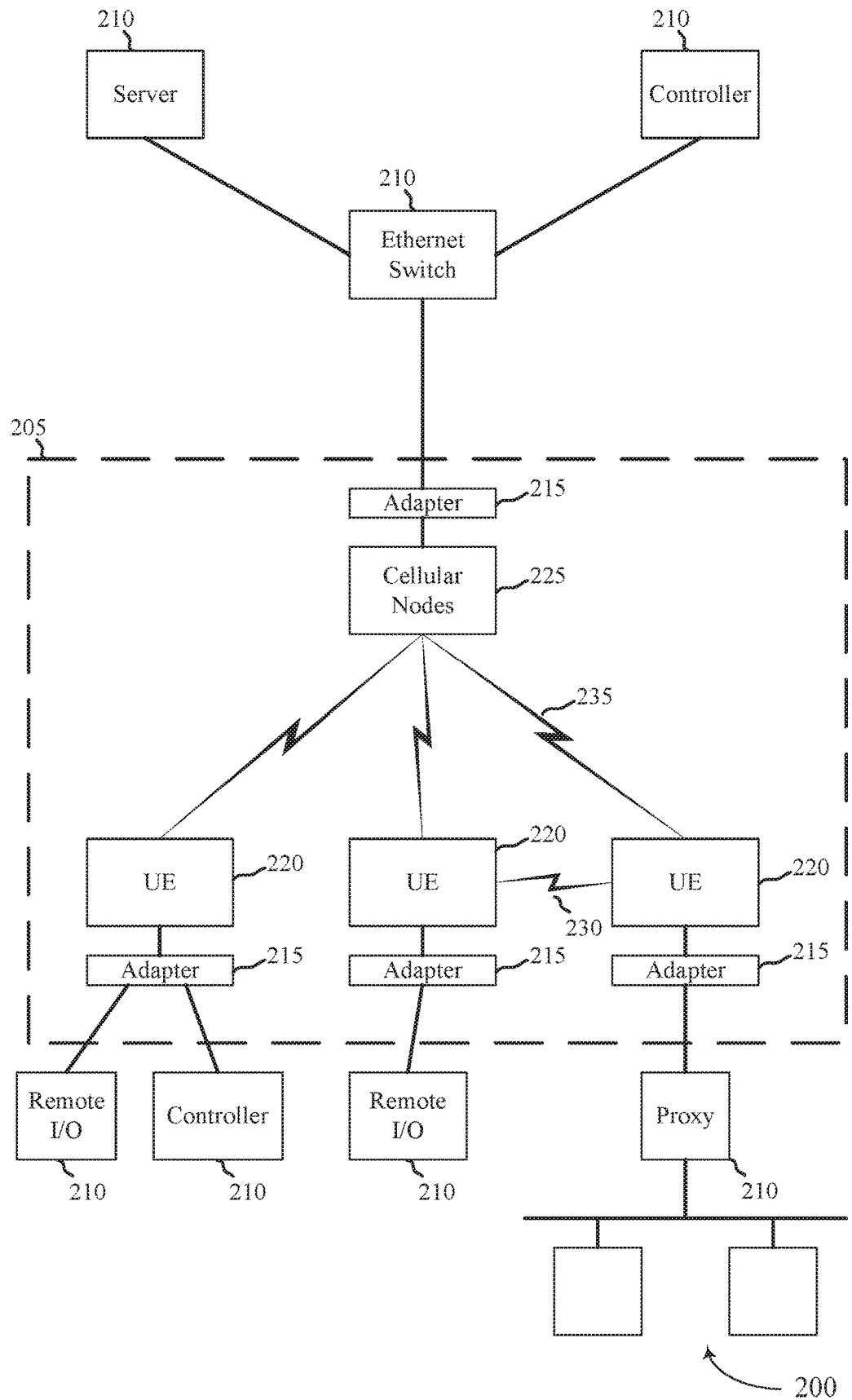
FIG. 2 illustrates an example of a communications network that supports Ethernet over cellular in accordance with aspects of the present disclosure.

FIG. 2 illustrates an example of a communications network 200 that supports Ethernet over cellular in accordance with various aspects of the present disclosure. In some examples, communications network 200 may implement aspects of wireless communications system 100. The communications network 200 may include a cellular network 205 and Ethernet devices 210. The cellular network 205 may be an example of aspects of wireless communications system 100 described with reference to FIG. 1.

The communications network 200 may be an example of a local area network. The local area network may include various components that may be classified as a group, without taking away from their contribution to the network as a whole. For example, while communications network 200 may include cellular network 205, it should be understood that the cellular network 205 is not an independent network that does not form a broader local area network with the remaining portions of communications network 200. Rather, the communications network 200 is a local area network that includes components that can be grouped into a subgroup called the cellular network 205. Other subgroups of a local area network such as communications network 200 may be similarly classified without detracting from their role in the local area network as a whole.

The cellular network 205 may include adapters 215, UEs 220, and cellular nodes 225. The UEs 220 may be examples of aspects of UEs 115 described with reference to FIG. 1. The cellular nodes 225 may be an example of aspects of base stations 105 and core network 130 described with reference to FIG. 1. For examples, the cellular nodes 225 may include one or more eNBs, MMEs, S-GWs, and/or P-GWs.

Ethernet devices 210 may include any devices operating in accordance with an Ethernet protocol. Ethernet protocols may be protocols that comply with the IEEE 802.3 specification. For example, Ethernet protocols may include, among others, Modbus TCP/IP, EtherNet/IP, PROFINET, TSN, EtherCAT, Ethernet Powerlink, and SERCOS III. In some examples, devices that communicate according to non-Ethernet wired communication protocols such as Process Field Bus (PROFIBUS) or INTERBUS may be used instead of Ethernet devices 210.

The Ethernet devices 210 may include Ethernet servers, Ethernet controllers, Ethernet switches, Ethernet remove input/output (I/O) devices, and Ethernet proxies. In some examples, at least some of the Ethernet devices 210 may be components of industrial control networks.

Adapters 215 may be configured to provide an interface between one or more Ethernet devices 210 and UEs 220. For example, adapters 215 may receive data according to an Ethernet protocol, translate the data into a cellular or other wireless protocol (e.g., LTE), and transmit the data to UEs 220 in the cellular or other wireless protocol. In some examples, the adapter 215 may be a component of an associated UE 220.

UEs 220 may be configured to communicate wirelessly with cellular nodes 225. The adapters 215 and/or UEs 225 may include a traffic flow template (TFT) module and a bearer mapping module. The TFT module may be configured to classify incoming Ethernet traffic (e.g., into two or more classifications). The TFT module may classify incoming Ethernet traffic into two or more classifications using a packet filter with a set of rules. The TFT module may classify the incoming Ethernet traffic based at least in part on an ethertype, a protocol type (e.g., Transmission Control Protocol (TCP) or User Datagram Protocol (UDP)), a port, or a combination thereof. In some examples, the set of rules may be based at least in part on an outer ethertype, an inner ethertype, a virtual local area network (VLAN) identifier, a priority level such as a VLAN tag priority code point (PCP), a protocol type (e.g., TCP or UDP), a source IP address, a destination IP address, a source port, a destination port, or a combination thereof.

The bearer mapping module may map the Ethernet traffic to an EPS bearer based at least in part on the classifications. An EPS bearer may also be referred to as a Quality of Service (QoS) flow. In some examples, each traffic classification may be mapped to a different EPS bearer. In some other examples, two or more traffic classifications may be mapped to the same EPS bearer. In some examples, one traffic classification may be mapped to two or more EPS bearers. Each EPS bearer may be configured to provide a different class of service to Ethernet traffic transmitted thereon.

In some examples, the EPS bearers may be pre-established based on pre-configuration data. In some other examples, the EPS bearers may be dynamically established based at least in part on the data packets ready for transmission.

The adapters 215, UEs 220, and/or cellular nodes 225 may include a forwarding database. A forwarding database may be a forwarding database including more local forwarding information, for example in contrast to a forwarding database including forwarding information that is more global (e.g., less local than the forwarding database including local or more local information). The forwarding database may include information for each of the Ethernet devices 210 coupled to the UE 220. The forwarding database may include, for example, a MAC address for each of the coupled Ethernet devices, a port through which the coupled Ethernet device may be reached, and a timestamp indicating the time of the last communication from the coupled Ethernet device. In some examples, the adapter 215 and/or UE 220 may determine the source MAC address for each Ethernet frame received from a coupled Ethernet device and update the forwarding database accordingly. For example, a new entry may be added to the forwarding database if the source MAC address in an incoming Ethernet frame is not included in the forwarding database. As another example, an existing entry corresponding to the source MAC address in an incoming Ethernet frame may be updated. In some examples, the updating may include specifying the port over which the Ethernet frame was received when the new port does not match the port identified in the existing entry. In some examples, the updating may include providing a new timestamp. In some examples, the adapter 215 and/or UE 220 may remove an entry from the database when no communications have been received from a coupled Ethernet device corresponding to the MAC address in that entry for a threshold period of time. For example, an entry may be removed if the timestamp is older than the threshold period of time. In some examples, the UE 220 may transmit control signaling to cellular nodes 225 when an entry is added or removed from the forwarding database so that corresponding changes may be made to a forwarding database stored at a core network.

Cellular nodes 225 may include base stations and a core network. The core network may include one or more S-GWs and one or more P-GWs or UPFs. In some examples, the P-GW or UPF may include a TFT module, a bearer mapping module, and a forwarding database as described with reference to the adapters 215 and UEs 220.

The core network may store a forwarding database (e.g., a forwarding database for forwarding information that is less local than other forwarding databases). The term forwarding database may be a generally-understood forwarding database in networking, for example a table that maps MAC addresses to ports. Such a forwarding database in other contexts may be alternatively referred to as a forwarding information base, forwarding table, or MAC table, etc. The forwarding database may include, for example, a MAC address for all known Ethernet devices 210 in the communications network 200, an identification of a device in the cellular network 205 through which the Ethernet device 210 corresponding to the MAC address may be reached (the cellular network port), and a timestamp indicating the time of the last communication from the Ethernet device 210 corresponding to the MAC address. In some examples, the core network may determine a source MAC address for all incoming traffic from either a UE 220 or a P-GW (or user plane function (UPF)) and update the forwarding database. In some examples, the core network may add a new entry to the forwarding database if the source MAC address in an incoming Ethernet frame is not included in the forwarding database. As another example, the core network may update an existing entry corresponding to the source MAC address in an incoming Ethernet frame. In some examples, the updating may include specifying the cellular network port (e.g., the UE 220 or P-GW) over which the Ethernet frame was received when the new cellular network port does not match the cellular network port identified in the existing entry. In some examples, the updating may include providing a new timestamp. In some examples, the core network may remove an entry from the database when no communications have been received from a coupled Ethernet device corresponding to the MAC address in that entry for a threshold period of time. For example, an entry may be removed if the timestamp is older than the threshold period of time. In some examples, entries may be added to or removed from the forwarding database based at least in part on control signaling received from cellular devices such as UEs 220 and P-GWs or UPFs.

The core network may use the forwarding database to route Ethernet traffic through the cellular network 205. For example, when the core network receives an Ethernet frame identifying a destination MAC address, the core network may identify an entry in the forwarding database corresponding to that MAC address. The core network may then identify the cellular network port identified in that entry and transmit the Ethernet frame to the corresponding cellular device (e.g., a UE 220 or a P-GW).

In some examples, the forwarding database may not include an entry for a destination MAC address, i.e., the MAC address is an unknown unicast address. In such examples, the core network may transmit the Ethernet frame to all active (i.e., non-blocked) cellular network ports other than the cellular network port on which it was received. For example, if the frame was received from a UE 220, the frame should be transmitted to all other active UEs 220 and any active P-GWs or UPFs. As another example, if the frame was received from a P-GW or UPF, the frame may be transmitted to all other active P-GWs or UPFs and all active UEs 220. An incoming Ethernet frame may also be transmitted to all active (e.g., non-blocked) cellular network ports when the MAC address corresponds to a broadcast MAC address. The Ethernet frame may be transmitted as a duplicate unicast frame to each active cellular network port, or may be transmitted as a broadcast frame. For example, a broadcast, multicast, or unknown unicast Ethernet frame that is received may be mapped to a number of unicast frame for the UEs to receive the broadcast, multicast, or unknown unicast Ethernet frame (e.g., where the unknown unicast Ethernet frame includes an unknown unicast address). In some other examples, the received broadcast, multicast, or unknown unicast Ethernet frame may be mapped to a cellular broadcast channel.

In some examples, an incoming Ethernet frame may be transmitted to two or more cellular network ports when the MAC address corresponds to a multicast MAC address. In some examples, the forwarding database may identify two or more cellular network ports in the entry corresponding to the multicast MAC address. In some other examples, the entry for the multicast address may be linked to two or more other MAC addresses in the forwarding database.

In some examples, the forwarding database may be shared with the UEs 220. In some examples, the UEs 220 may be able to route traffic in the cellular network 205 without routing the traffic to the core network based at least in part on the forwarding database. For example, a UE 220 may be able to route traffic between two Ethernet devices 210 coupled to the UE 220 based as least in part on the forwarding database. As another example, a UE 220 may be able to route traffic to another UE 220 over a device-to-device (D2D) communications link 230.

The cellular nodes 225 may also include a cellular bridge. The cellular bridge may be, for example, a component of the core network. The cellular bridge may utilize a rapid spanning tree protocol to avoid infinite loops for broadcast messages (e.g., or for multicast and/or unknown multicast messages. The cellular bridge may communicate with Ethernet bridges to build a common spanning tree. A root bridge may be chosen for the spanning tree. In some examples, the cellular bridge may set a bridge priority to decrease the likelihood that the cellular bridge may be chosen as the root bridge.

The cellular bridge may calculate a least cost path to the root bridge. The cellular bridge may calculate the least cost path by comparing the links between the cellular bridge and the root bridge over the available paths therebetween. The available paths may include one or more Ethernet links, which may have a fixed value for purposes of calculating the least cost path. The available paths may also include one or more airlinks (e.g., wireless communications link 235) between a base station and a UE 220. The airlinks may have a fixed value, which may be higher than the fixed value of the Ethernet links. In some examples, the airlinks may have a variable value. The value of the airlinks may be based at least in part on a downlink or uplink system capacity, one uplink or downlink metrics for the link between a UE 220 and an associated base station, or a combination thereof. The cellular bridge may select the least cost path based at least in part on the values assigned to the Ethernet links and the airlinks.

The cellular bridge may block all cellular network ports in the loop except the cellular network port(s) that are part of the least cost path. The cellular bridge may block a cellular port by including only non-blocked cellular network ports in the forwarding database. The core network will also refrain from sending broadcast, multicast, and/or unknown unicast frames to blocked cellular network ports. However, the cellular bridge may transmit a topology change notification (TCN) to other bridges in the communications network 200 if a link to an active UE 220 in the least cost path degrades or the connection to the active UE 220 in the least cost path is lost.

The core network may also support virtual local area networks (VLANs). In some examples, different VLANs may provide different quality of service (QoS). The cellular bridge may maintain a separate spanning tree and, in some cases, a separate forwarding database, for each VLAN in the communications network 200. The cellular bridge may add or remove VLAN identification information such as 802.1Q VLAN headers from Ethernet packets. For example, the cellular bridge may add a 802.1Q VLAN header identifying a first VLAN to an Ethernet frame received from a UE 220 that is part of the first VLAN.

In some examples, the cellular bridge may perform auto-negotiation for supported speeds over a communication path including both Ethernet links and airlinks. For example, the cellular bridge may negotiate with an Ethernet device 210 to establish a supported speed over a communications path including a wireless communications link 235 between a base station and a UE 220 and an Ethernet link between a UE 220 and an Ethernet device 210 (which may be connected via an adapter 215). The supported speed may be determined based at least in part on a UE category, an available bandwidth of the wireless communications link 235, a bandwidth re-use, a time division duplexing (TDD) configuration of the wireless communications link 235, a received signal power (e.g., reference signal received power (RSRP), received signal strength indicator (RSSI), etc.) at UE 220, a signal to noise ratio (e.g., SNR or SINR) at UE 220, or a combination thereof.

Figure 3:
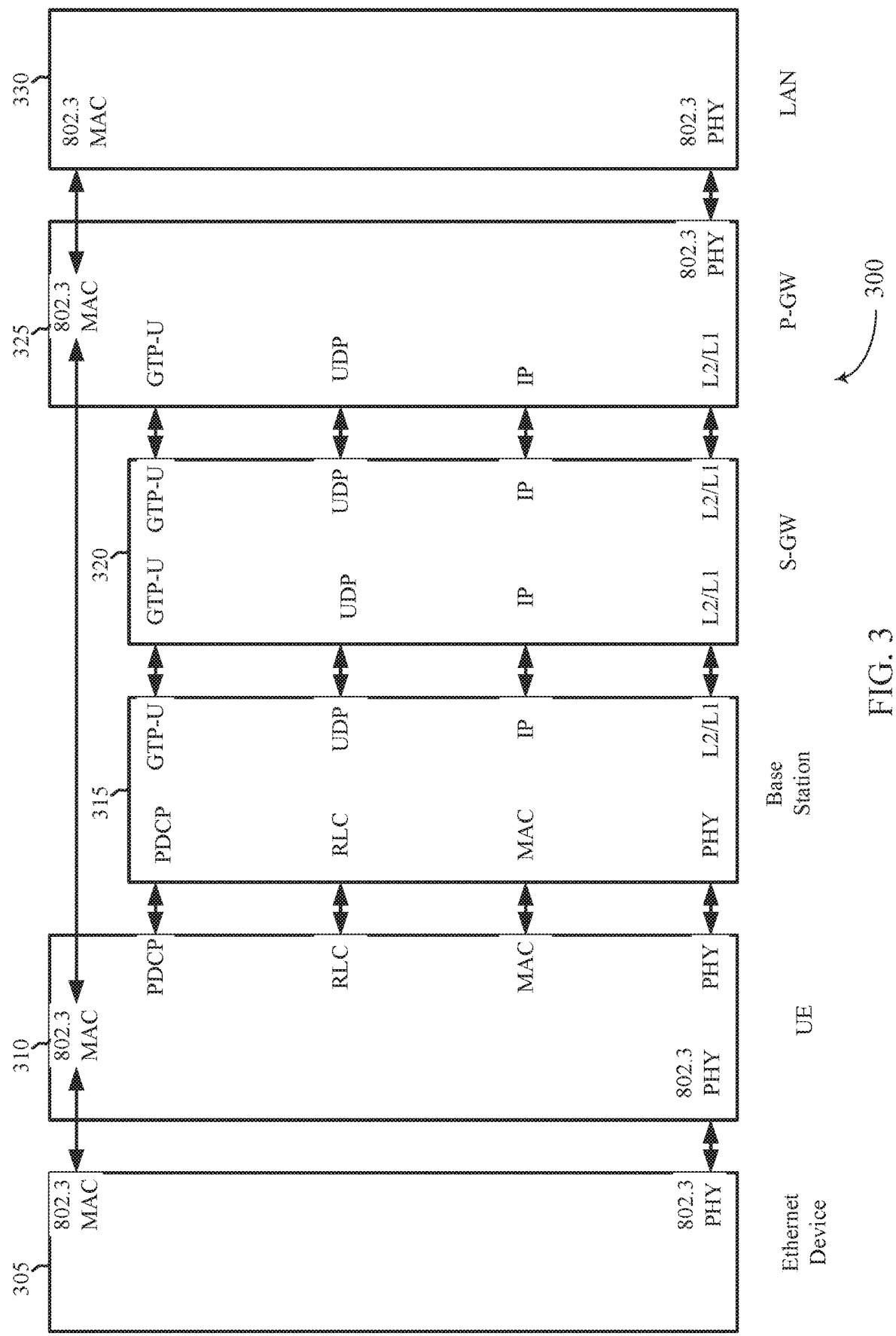
FIG. 3 illustrates an example of a communications network that supports Ethernet over cellular in accordance with aspects of the present disclosure.

FIG. 3 illustrates an example of a communications network 300 that supports Ethernet over cellular in accordance with various aspects of the present disclosure. In some examples, communications network 300 may implement aspects of wireless communications system 100. The communications network 300 may include an Ethernet device 305, a UE 310, a base station 315, a S-GW 320, a P-GW 325, and a local area network (LAN) 330. The UE 310 and base station 315 may be examples of aspects of UE 115 and base station 105 described with reference to FIG. 1. The S-GW 320 and P-GW 325 may be components of a core network such as core network 130 as described with reference to FIG. 1. In some examples, communications network 300 may include a UPF that performs the functions of P-GW 325 instead of P-GW 325. The Ethernet device 305 may be an example of aspects of an Ethernet device 210 described with reference to FIG. 2. For example, the Ethernet device may be a remote I/O device, a controller, or a proxy server.

The Ethernet device 305 may communicate with the UE 310 over an Ethernet communication link. In some examples, the Ethernet device 305 may communicate with the UE 310 via an external adapter such as adapter 215 described with reference to FIG. 2. In some other examples, the UE 310 may receive Ethernet communications directly and internally perform any necessary processing.

The UE 310 may communicate with the base station 315 over a cellular communication link such as the LTE radio interface (Uu). The cellular communication link may be an example of aspects of communication link 125 described with reference to FIG. 1. For example, the UE 310 may communicate with the base station 315 using the Packet Data Convergence Protocol (PDCP) layer, the RLC layer, the MAC layer, and the PHY layer in a LTE network. The UE 310 or an associated adapter may translate the information received from the Ethernet device 305 into the appropriate format for transmission over the cellular network.

The base station 315 may communication with the S-GW 320 over a communication link such as the S1-U interface. The communication link may be an example of aspects of backhaul links 132 described with reference to FIG. 1. The S-GW 320 may communicate with the P-GW 325 over a communication link such as the S5 interface.

The P-GW 325 may be configured to receive communications from the S-GW 320 and format the information for communication to an external network such as LAN 330. For example, the S-GW 320 may communicate with the P-GW 325 using General Packet Radio Service (GPRS) Tunneling Protocols (GTP-U), UDP, IP, or Layer 2 (L2) or Layer 1 (L1) protocols. In some examples, the LAN 330 may be an Ethernet network. Accordingly, the P-GW 325 may format the information received from S-GW 320 into a format suitable for communication with one or more Ethernet devices in LAN 330 using the 802.3 PHY layer and the 802.3 MAC layer. Such communications may be transparent to the Ethernet (802.3) MAC layer. Thus, the MAC layer transport may be between UE 310 and P-GW 325. Communication at the MAC layer may appear direct between UE 310 and P-GW 325 at the MAC layer as Ethernet to cellular protocol translation occurs at layers lower than the MAC layer.

Figure 4:
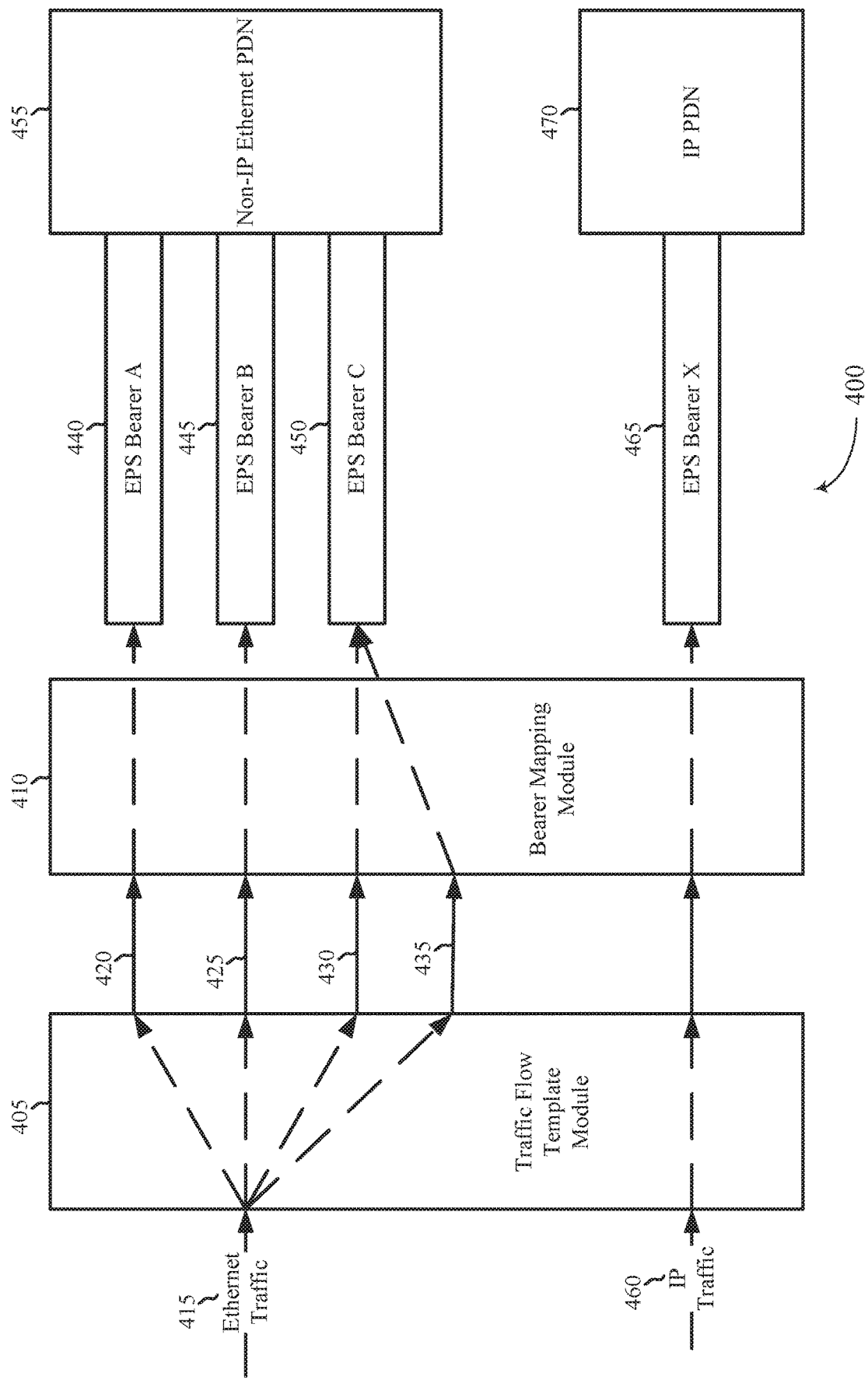
FIG. 4 illustrates an example of a wireless device in a communications network that supports Ethernet over cellular in accordance with aspects of the present disclosure.

FIG. 4 illustrates an example of a wireless device 400 that supports Ethernet over cellular in accordance with various aspects of the present disclosure. In some examples, wireless device 400 may implement aspects of wireless communications system 100. In some examples, the wireless device 400 may be an example of UE 115 as described with reference to FIG. 1. In some other examples, the wireless device 400 may be an example of a PDN gateway such as P-GW 325 described with reference to FIG. 3. The wireless device 400 may include a TFT module 405 and a bearer mapping module 410.

The TFT module 405 may receive Ethernet traffic 415 from one or more Ethernet devices such as Ethernet devices 210 described with reference to FIG. 2. The Ethernet traffic 415 may include a plurality of Ethernet frames. The TFT module 405 may classify each of the Ethernet frames into two or more traffic classifications. For example, the TFT module 405 may classify the Ethernet traffic 415 into PROFINET traffic 420, Modbus TCP/IP traffic 425, other IP Ethernet traffic 430, and other non-IP Ethernet traffic 435 (e.g., TSN traffic, etc.). The TFT module 405 may classify the Ethernet traffic based on an ethertype, a protocol type (e.g., Transmission Control Protocol versus User Datagram Protocol), and/or a port.

The TFT module 405 may pass the various traffic classifications of Ethernet traffic 415 (e.g., PROFINET traffic 420, Modbus TCP/IP traffic 425, other IP Ethernet traffic 430, and other non-IP Ethernet traffic 435, including TSN traffic) to the bearer mapping module 410. The bearer mapping module 410 may map the various traffic classifications to one or more EPS bearers or QoS flows. For example, the bearer mapping module 410 may map PROFINET traffic 420 to EPS Bearer A 440, Modbus TCP/IP traffic 425 to EPS Bearer B 445, and other IP Ethernet traffic 430 and other non-IP Ethernet traffic 435, for example TSN traffic, to EPS Bearer C 450. Each EPS bearer may be associated with different QoS attributes. The traffic on EPS Bearer A 440, EPS Bearer B 445, and EPS Bearer C 450 may be transmitted over a non-IP "Ethernet" PDN 455 with different priority.

The TFT module 405 may also receive IP traffic 460. The TFT module may pass the IP traffic 460 to the bearer mapping module 410 without classification. The bearer mapping module 410 may map all IP traffic 460 to the same EPS bearer (e.g., EPS Bearer X 465). The IP traffic on EPS Bearer X 465 may be transmitted over IP PDN 470.

Figure 5:
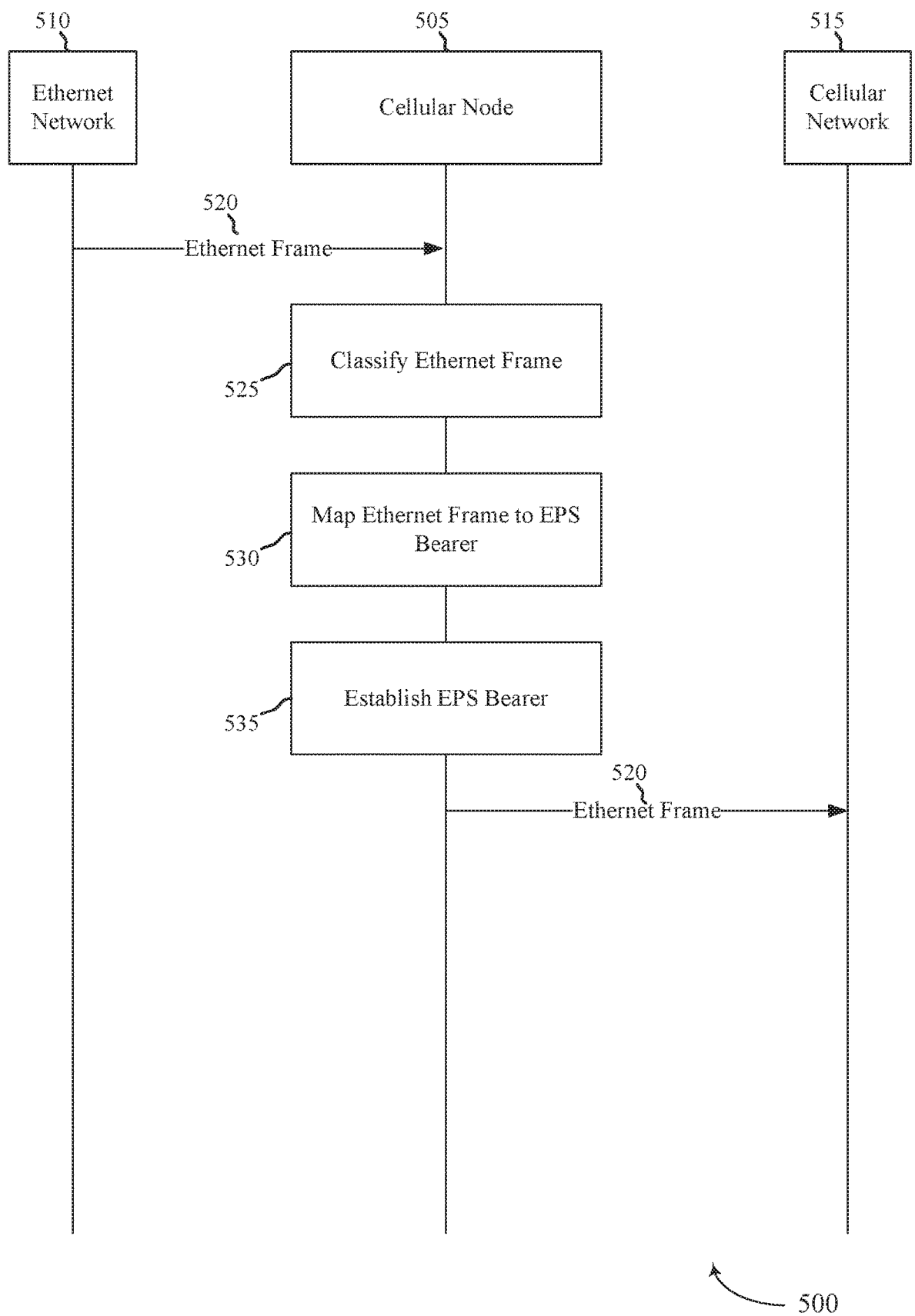
FIG. 5 illustrates an example of a communication flow in a communications network that supports Ethernet over cellular in accordance with aspects of the present disclosure.

FIG. 5 illustrates an example of a communication flow 500 in a communications network that supports Ethernet over cellular in accordance with various aspects of the present disclosure. In some examples, communication flow 500 may implement aspects of wireless communications system 100. The communication flow 500 shows Ethernet traffic being received by a cellular node 505 from an Ethernet network 510 and transmitted from the cellular node 505 on a cellular network 515. In some examples, the cellular node 505 may be an example of aspects of UE 115 described with reference to FIG. 1. In some other examples, the cellular node 505 may be an example of aspects of P-GW 325 as described with reference to FIG. 3.

An Ethernet frame 520 may be transmitted from a device in an Ethernet network 510 to the cellular node 505. The cellular node 505 may classify the Ethernet frame 520 at 525. In some examples, the Ethernet frame may be classified by a TFT module such as TFT module 405 as described with reference to FIG. 4. The Ethernet frame may be classified based at least in part on an ethertype, a protocol type, a port, VLAN tag information, an IP address, or a combination thereof.

The cellular node 505 may map the Ethernet frame 520 to an EPS Bearer or QoS flow at 530. In some examples, the Ethernet frame may be classified by a bearer mapping module 410 as described with reference to FIG. 4. The Ethernet frame 520 may be mapped to an EPS Bearer based at least in part on the traffic classification assigned to the Ethernet frame by a TFT module.

In some examples, the EPS bearers are pre-configured, e.g., all potential EPS bearers are pre-established based on configuration data. In some other examples, the EPS bearers may be dynamically established based on incoming Ethernet traffic. The cellular node 505 may determine that the EPS bearer to which the Ethernet frame 520 has been mapped is not currently established. The cellular node 505 may establish the EPS bearer at 535.

The cellular node 505 may transmit the Ethernet frame 520 on the cellular network 515 using the EPS bearer to which the Ethernet frame 520 has been mapped. For example, the cellular node 505 may transmit the Ethernet frame 520 to a UE such as the UEs 115 described with reference to FIG. 1 or to a P-GW such as P-GW 325 described with reference to FIG. 3.

FIG. 6 illustrates an example of a classification table 600 used by a wireless device that supports Ethernet over cellular in accordance with various aspects of the present disclosure. In some examples, classification table 600 may implement aspects of wireless communications system 100. The classification table 600 shows attributes of various types of Ethernet protocols 605 that may be used by a TFT module (such as TFT module 405 as described in FIG. 4) in classifying Ethernet traffic into various classifications. In some examples, the TFT module may use ethertypes 610 to classify Ethernet traffic. Various Ethernet protocols 605 may have different ethertypes 610. For example, PROFINET traffic has an ethertype 610 of 0x8892 and EtherCAT traffic has an ethertype 610 of 0x88A4.

In some examples, the TFT module may use a protocol type 615 to classify Ethernet traffic. For example, the TFT module may classify Ethernet traffic based at least in part on whether the Ethernet traffic uses TCP or UDP. In some examples, the TFT module may use protocol type 615 to distinguish between Ethernet protocols 605 that have the same ethertype 610. For example, both Modbus TCP/IP traffic and EtherNet/IP have an ethertype 610 of 0x0800. However, Modbus TCP/IP uses TCP while EtherNet/IP uses UDP. In some examples, the TFT module may use a port 620 to classify Ethernet traffic.

Figure 7:
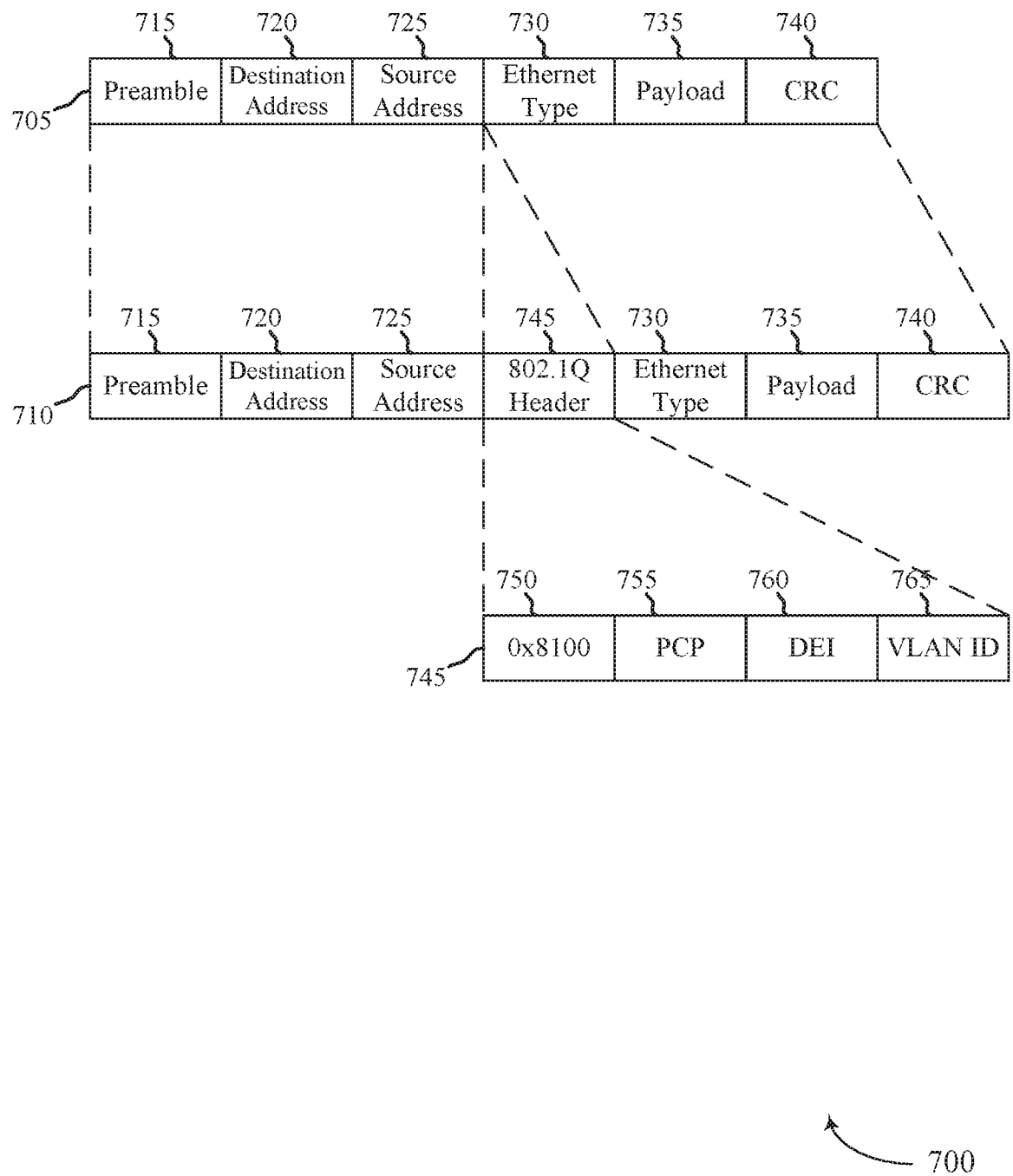
FIG. 7 illustrates an example of a comparison between Ethernet frames in a communications network that supports Ethernet over cellular in accordance with aspects of the present disclosure.

FIG. 7 illustrates an example of a comparison 700 of Ethernet frames in a communications network that supports Ethernet over cellular in accordance with various aspects of the present disclosure. In some examples, comparison 700 may implement aspects of wireless communications system 100. The comparison 700 shows an original Ethernet frame 705 and a tagged Ethernet frame 710. The original Ethernet frame 705 may include a preamble 715, a destination MAC address 720, a source MAC address 725, an Ethernet type 730, a payload 735, and a Cyclic Redundancy Check (CRC) 740. The Ethernet type 730 may identify an ethertype such as the ethertypes 610 described with reference to FIG. 6.

The tagged Ethernet frame 710 may include the information included in the original Ethernet frame 705. In addition, the tagged Ethernet frame 710 may include a 802.1Q header 745 that is added to the frame during a tagging process. The 802.1Q header 745 may include a VLAN ethertype 750, a PCP field 755, a drop eligibility identifier (DEI) 760, and a VLAN identifier 765. The VLAN ethertype 750 may be, for example, 0x8100, which identifies a VLAN-tagged frame with double tagging. The VLAN ethertype 750 may be referred to as the outer ethertype. The Ethernet type 730 may be referred to as the inner ethertype. In some examples, an Ethernet frame may have multiple tags, in which case the outer ethertype may be the most recently-added ethertype (e.g., the outermost ethertype) and the inner ethertype may be the original ethertype (e.g., the innermost ethertype).

Figure 8:
FIG. 8 illustrates an example of a packet filter in a wireless device in a communications network that supports Ethernet over cellular in accordance with aspects of the present disclosure.

FIG. 8 illustrates an example of a packet filter 800 used by a wireless device that supports Ethernet over cellular in accordance with various aspects of the present disclosure. In some examples, packet filter 800 may implement aspects of wireless communications system 100. The packet filter 800 may be used by a TFT module, such as TFT module 405 described with reference to FIG. 4, to classify Ethernet traffic.

The packet filter 800 may include one or more rules 805 for classifying Ethernet traffic. The rules 805 may be provided in a priority order (e.g., top to bottom as shown in packet filter 800), with the first rule that matches a particular data frame being applied. The rules may be based on an outer ethertype 810, a VLAN ID 815, a VLAN tag PCP 820, an inner ethertype 825, a protocol type 830, a source IP address 835, a destination IP address 840, a source port 845, a destination port 850, or a combination thereof. Accordingly, the TFT module may filter packets into different classes based on ethertypes (inner or outer), protocol types (TCP/UDP), ports (source or destination), VLAN tags (ID or PCP), IP addresses (source or destination), or a combination thereof. An asterisk in a rule 805 indicates that an Ethernet frame may have any value for that field and match the rule.

An Ethernet frame matches the first rule 805-a when the frame has a VLAN ID 123, a VLAN tag PCP 5, and carries PROFINET traffic (ethertype 0x8892). Such frames may be classified into a first traffic classification. An Ethernet frame matches the second rule 805-b when the frame has a VLAN ID 456, a VLAN tag PCP 1, and carries PROFINET traffic. Such frames may be classified into a second traffic classification. An Ethernet frame matches the third rule when it has an ethertype of 0x0800, uses TCP, and has a source port of 161. Such frames may be classified into a third traffic classification. All other frames match the fourth rule 805-d, which is a catch-all rule that covers all frames that do not match any previous rules. Such frames may be classified into a fourth traffic classification.

The rules 805 in the packet filter 800 may be used to classify Ethernet traffic so that appropriate QoS may be provided to each classification. A bearer mapping module, such as bearer mapping module 410 described with reference to FIG. 4, may map each of the four traffic classifications to EPS bearers or QoS flows. For example, the bearer mapping module may map the first traffic classification to EPS Bearer 1 having a first radio bearer ID and assigned a QoS Class Identifier (QCI) 5 classification. The bearer mapping module may map the second traffic classification to EPS Bearer 2 having a second radio bearer ID and assigned a QCI 4 classification. The bearer mapping module may map the third and fourth traffic classifications to EPS Bearer 3 having a third radio bearer ID and assigned a QCI 9 classification.

Figure 9:
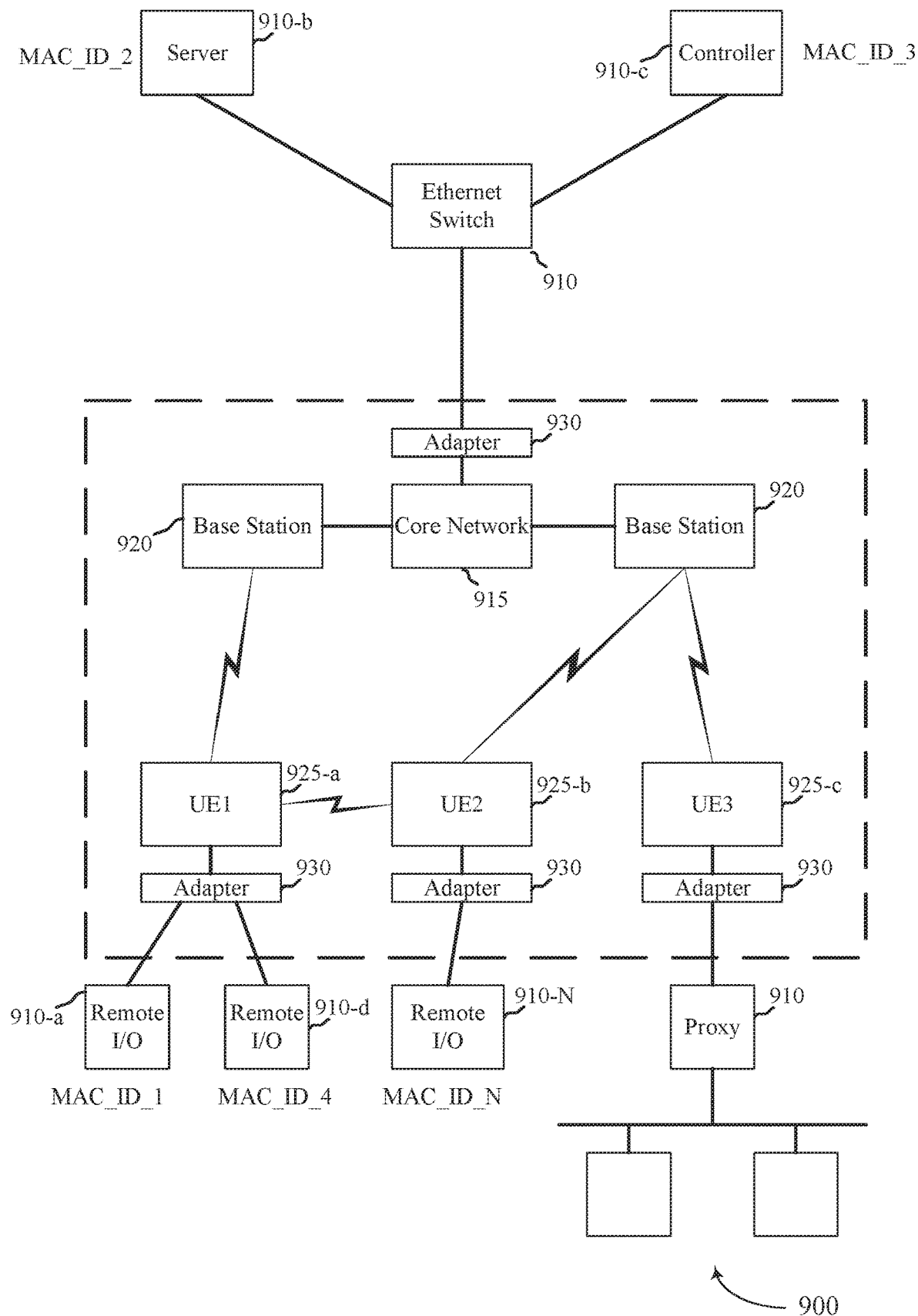
FIG. 9 illustrates an example of a communications network that supports Ethernet over cellular in accordance with aspects of the present disclosure.

FIG. 9 illustrates an example of a communications network 900 that supports Ethernet over cellular in accordance with various aspects of the present disclosure. In some examples, communications network 900 may implement aspects of wireless communications system 100. The communications network 900 may be an example of aspects of communications network 200 described with reference to FIG. 2. The communications network 900 may include a cellular network 905 coupled to Ethernet devices 910.

The cellular network 905 may include a core network 915, base stations 920, and UEs 925. For example, the cellular network 905 may include UE1 925-a, UE2 925-b, and UE3 925-c. The core network 915, base stations 920, and UEs 925 may be examples of aspects of core network 130, base stations 105, and UEs 115 described with reference to FIG. 1. The cellular network 905 may also include adapters 930 configured to interface between the Ethernet devices 910 and devices in the cellular network 905 such as the core network 915 and UEs 925. Adapters 930 may be examples of aspects of adapters 215 described with reference to FIG. 2.

Each of the Ethernet devices 910 may be examples of aspects of Ethernet devices 210 described with reference to FIG. 2. Each Ethernet device 910 may be associated with a MAC address. For example, Ethernet device 910-a may be associated with a MAC address of MAC_ID_1, Ethernet device 910-b may be associated with a MAC address of MAC_ID_2, Ethernet device 910-c may be associated with a MAC address of MAC_ID_3, Ethernet device 910-d may be associated with a MAC address of MAC_ID_4, and Ethernet device 910-n may be associated with a MAC address of MAC_ID_N. The MAC addresses may be used to address Ethernet frames. For example, if a device wanted to transmit an Ethernet frame to Ethernet device 910-d, it would include the MAC address MAC_ID_4 in the destination MAC address field of the frame.

However, a UE 925 may not transmit a received Ethernet frame directly to the Ethernet device 910 corresponding to the destination MAC address. For example, when UE3 925-c receives an Ethernet frame with a destination MAC address of MAC_ID_4, UE3 925-c may route the Ethernet frame to core network 915 (via base station 920). The core network may 915 then route the Ethernet frame to UE1 925-c via another base station 920.

The core network 915 may store a forwarding database to assist in routing Ethernet frames through the communications network 900. In some examples, UEs 925 may also store forwarding databases.

FIG. 10 illustrates an example of a forwarding database 1000 for a communications network that supports Ethernet over cellular in accordance with various aspects of the present disclosure. In some examples, forwarding database 1000 may implement aspects of wireless communications system 100. The forwarding database 1000 may include a plurality of entries 1005.

In some examples, the forwarding database 1000 may be stored at a core network such as core network 130 as described with reference to FIG. 1. Each entry 1005 in the forwarding database 1000 may include a MAC address field 1010, a VLAN identifier field 1015, a port field 1020, and a timestamp field 1025. The forwarding database 1000 may include one entry 1005 for each current MAC address known to the core network.

The MAC address field 1010 may identify the MAC address of an Ethernet device that is or was recently connected to the cellular network as described, for example, with reference to FIGS. 2 and 9. Where VLANs are in use in the communications network, for example, a first VLAN may be connected to a first port of a bridge while a second VLAN may be connected to a second port of the bridge, such that VLAN identifier field 1015 may indicate the first VLAN or second VLAN. In some other examples, different forwarding databases may be maintained for different VLANs.

The port field 1020 may identify a cellular network port, e.g., a wireless device, through which the Ethernet device identified by the MAC address is reachable. For example, the forwarding database 1000 indicates that the Ethernet device associated with MAC address MAC_ID_1 (e.g., Ethernet device 910-a in FIG. 9) and the Ethernet device associated with MAC address MAC_ID_4 (e.g., Ethernet device 910-d in FIG. 9) are reachable through UE1 (e.g., UE1 925-a in FIG. 9). A UE may be identified, for example, by a subscription identifier, a certificate identifier, a General Packet Radio Service (GPRS) Tunneling Protocol (GTP) tunnel endpoint identifier (TED), or an International Mobile Subscriber Identity (IMSI). In the case of a broadcast MAC, the port field 1020 may identify all active cellular network ports in the cellular network.

The timestamp field 1025 may indicate the last time the core network confirmed that the Ethernet device identified by the MAC address field 1010 was reachable through the cellular device identified in the port field 1020. The core network may update the timestamp field 1025 each time the core network receives a communication from the cellular device identified in the port field 1020 regarding the Ethernet address identified by the MAC address field 1010. For example, the core network may receive a transmission from a first cellular device (e.g., UE1 925-a in FIG. 9) identifying a destination address (e.g., MAC_ID_N) and a source address (e.g., MAC_ID_1). Based on this transmission, the core network may update the timestamp field 1025 associated with the source address. The core network may remove an entry from the forwarding database 1000 when the timestamp has not been updated for a threshold time period. For example, the core network may remove an entry when the timestamp indicates that the last update occurred more than 300 seconds in the past (e.g., the timestamp is more than 300 seconds old).

In some examples, the core network may share the forwarding database 1000 with UEs and/or P-GWs or UPFs in the communications network. For example, the forwarding database 1000 may be transmitted to all cellular network ports at a regular interval. In some examples, a UE may use the forwarding database to route traffic through the communications network without transmitting the traffic to the core network. For example, the UE may receive an Ethernet frame from one Ethernet device coupled thereto and route that frame to another Ethernet device coupled thereto based at least in part on the forwarding database. As another example, the UE may receive an Ethernet frame from an Ethernet device coupled thereto and route that frame to the appropriate cellular network port (e.g., another UE) directly (e.g., via D2D communication) based at least in part on the forwarding database.

Figure 11:
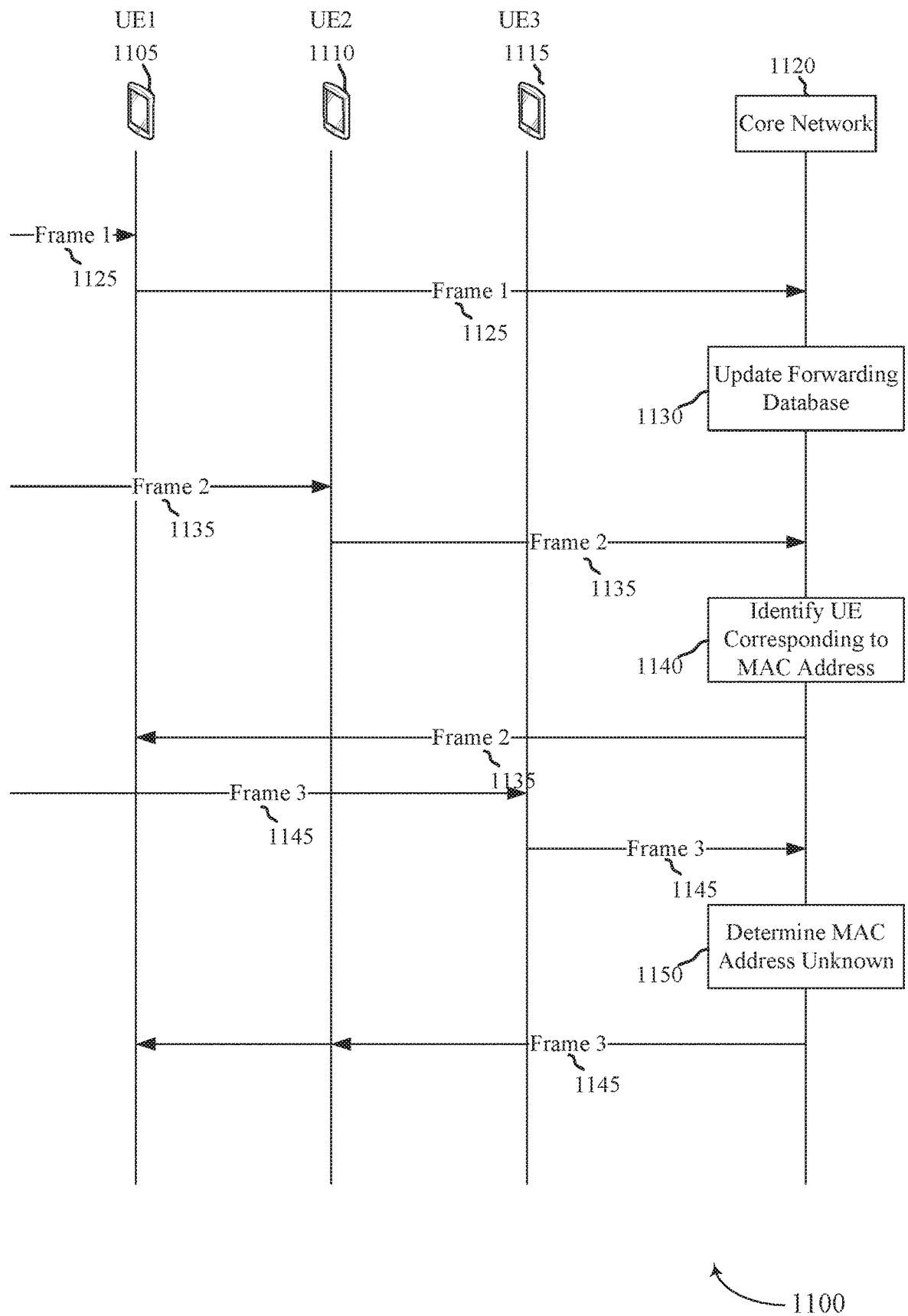
FIG. 11 illustrates an example of a communication flow in a communications network that supports Ethernet over cellular in accordance with aspects of the present disclosure.

FIG. 11 illustrates an example of a communication flow 1100 in a communications network that supports Ethernet over cellular in accordance with various aspects of the present disclosure. In some examples, communication flow 1100 may implement aspects of wireless communications system 100. The communication flow 1100 shows communications between UE1 1105, UE2 1110, UE3 1115, and core network 1120. UE1 1105, UE2 1110, and UE3 1115 may be examples of aspects of UE 115 described with reference to FIG. 1. Core network 1120 may be an example of aspects of core network 130 described with reference to FIG. 1.

UE1 1105 may receive a first frame 1125 from an Ethernet device coupled thereto. For example, UE1 1105 may receive a first frame 1125 from a first Ethernet device associated with the MAC address MAC_ID_1 to be transmitted to another Ethernet device. The first frame 1125 may include the MAC address MAC_ID_1 in a source MAC address data field. UE1 1105 may transmit the first frame 1125 to the core network 1120 for routing through the cellular network.

Core network 1120 may update a forwarding database based on the first frame 1125 at 1130. The forwarding database may be an example of aspects of forwarding database 1000 as described with reference to FIG. 10. The core network may determine the source MAC address from the first frame 1125 and update the forwarding database based at least in part on the source MAC address.

In some examples, the core network 1120 may determine that an entry for the source MAC address (e.g., MAC_ID_1) is not included in the forwarding database. The core network 1120 may create a new entry for the source MAC address. The core network 1120 may write the source MAC address to the MAC address field of the new entry, write UE1 1105 to the port field of the new entry, and write the current time to the timestamp field of the new entry.

In some other examples, the core network may determine that an entry for the source MAC address (e.g., MAC_ID_1) is already included in the forwarding database. The core network 1120 may update the existing entry for the source MAC address. For example, the core network 1120 may confirm that the port field of the existing entry identifies the cellular device (e.g., UE1 1105) from which the first frame 1125 was received. If the port field of the existing entry identifies another cellular device, the core network 1120 may update the port field of the existing entry to identify UE1 1105. In addition, the core network 1120 may overwrite the timestamp field of the existing entry with the current time.

The core network 1120 may also route the first frame 1125 to the Ethernet device identified in the destination address field (not shown).

UE2 1110 may then receive a second frame 1135 from an Ethernet device coupled thereto. For example, UE2 may receive a second frame 1135 from a second Ethernet device. The second frame 1135 may identify the MAC address of the second Ethernet device (e.g., MAC_ID_N) in the source MAC address field and the MAC address of the first Ethernet device (e.g., MAC_ID_1) in the destination MAC address field, indicating that the second frame 1135 is to be transmitted to the first Ethernet device. UE 1110 may transmit the second frame 1135 to the core network 1120.

The core network 1120 may identify a cellular device corresponding to the destination MAC address in the second frame 1135 at 1140. For example, the core network 1120 may determine the destination MAC address (e.g., MAC_ID_1) from the second frame 1135 and access the corresponding entry in the forwarding database. The core network 1120 may then access the port field of the entry to determine how to route the second frame 1135. For example, the core network 1120 may determine that the MAC address MAC_ID_1 is reachable through UE1 1105. The core network 1120 may then transmit the second frame 1135 to UE1 1105, which may route the second frame 1135 accordingly. The core network 1120 may also update the forwarding database based on the second frame 1135 as described with reference to block 1130.

UE3 1115 may receive a third frame 1145 from an Ethernet device coupled thereto. For example, UE3 1115 may receive a third frame 1145 from a third Ethernet device. The third frame 1145 may identify the MAC address of the second Ethernet device in the source MAC address field and the MAC address of a destination Ethernet device (e.g., MAC_ID_X) in the destination MAC address field. UE3 may transmit the third frame 1145 to core network 1120.

Core network 1120 may determine that an entry for the destination MAC address (e.g., MAC_ID_X) is not included in the forwarding database. The core network 1120 may accordingly transmit the third frame 1145 to all available ports. In some examples, the core network 1120 may not transmit the third frame 1145 back to UE 1115. The core network 1120 may also update the forwarding database based on the third frame 1145 as described with reference to block 1130.

Figure 12:
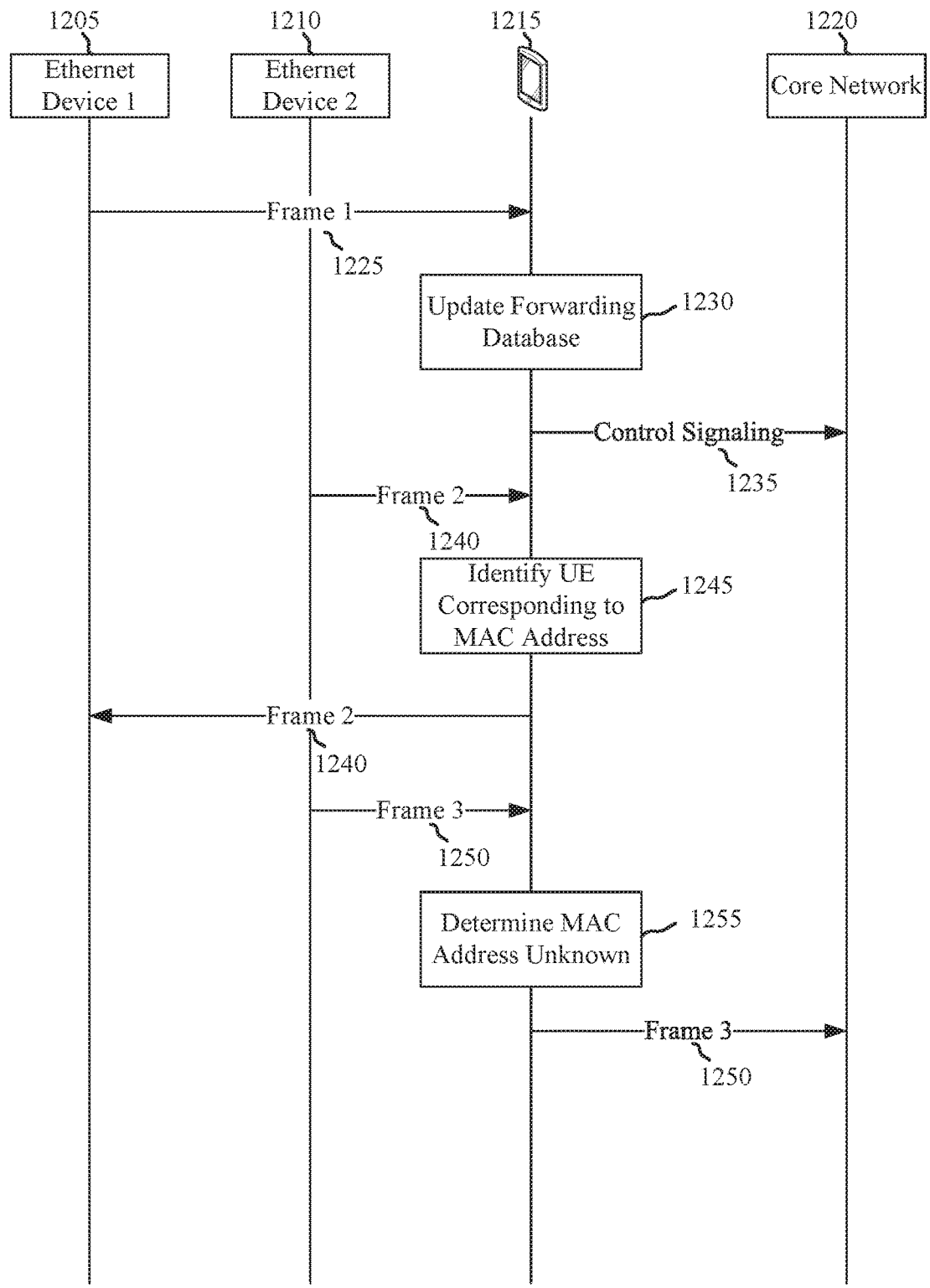
FIG. 12 illustrates an example of a communication flow in a communications network that supports Ethernet over cellular in accordance with aspects of the present disclosure.

FIG. 12 illustrates an example of a communication flow 1200 that supports Ethernet over cellular in accordance with various aspects of the present disclosure. In some examples, communication flow 1200 may implement aspects of wireless communications system 100. The communication flow 1200 shows communications between a first Ethernet device 1205, a second Ethernet device 1210, a UE 1215, and a core network 1220. The first Ethernet device 1205 and the second Ethernet device 1210 may be examples of aspects of Ethernet devices 210 described with reference to FIG. 2. The UE 1215 may be an example of aspects of UE 115 as described with reference to FIG. 1. The core network 1220 may be an example of aspects of core network 130 described with reference to FIG. 1.

UE 1215 may store a forwarding database (e.g., a forwarding database including more local forwarding information than other forwarding databases) in addition to the forwarding database stored at core network 1120 (e.g., a forwarding database including more global forwarding information). The forwarding database may be an example of aspects of forwarding database 1000 described with reference to FIG. 10. For example, the forwarding database may include an entry for each Ethernet device coupled thereto.

UE 1215 may receive a first frame 1225 from the first Ethernet device 1205. The first frame 1225 may indicate the MAC address of the first Ethernet device 1205 (e.g., MAC_ID_1) in a source MAC address field. The UE 1215 may update the forwarding database based on the first frame 1125.

In some examples, UE 1215 may determine that the forwarding database does not include an entry corresponding to the MAC address identified in the source MAC address field (e.g., MAC_ID_1). The UE 1215 may create a new entry for the MAC address (e.g., MAC_ID_1) as described with reference to block 1130 in FIG. 11. In some other examples, the UE 1215 may determine that the forwarding database does include an entry corresponding to the MAC address identified in the source destination field. The UE 1215 may update the existing entry by, for example, providing a new timestamp identifying the current time.

In some examples, the UE 1215 transmits control signaling 1230 to core network 1220 when a new entry is added to the forwarding database. The control signaling 1230 identifies the new MAC address and associated information which allows the core network 1220 to create a corresponding entry in the forwarding database stored at the core network 1220 for routing.

The UE 1215 may receive a second frame 1240 from the second Ethernet device 1210. The second frame 1240 may indicate the MAC address of the second Ethernet device 1210 in the source destination field, and may identify the MAC address of the first Ethernet device (e.g., MAC_ID_1) in the destination MAC address field.

UE 1215 may determine that the destination MAC address of the second frame 1240 matches an entry in the forwarding database at 1245. UE 1215 may transmit the second frame 1240 to the first Ethernet device 1205. In some examples, UE 1215 may also transmit control signaling to core network 1120 so that core network 1220 may update the timestamp in the forwarding database. In some other examples, UE 1215 may maintain all timestamp information for the Ethernet devices coupled thereto. The UE 1215 may transmit control signaling to the core network 1220 when an Ethernet device is removed from the forwarding database so that the core network 1120 may also remove the corresponding entry from the forwarding database. In some examples, the forwarding database may not include a timestamp field.

UE 1215 may receive a third frame 1250 from the second Ethernet device 1210. The UE 1215 may determine that the destination MAC address is not included in the forwarding database at 1255. UE 1215 may transmit the third frame 1250 to the core network 1220. In some examples, UE 1215 may update the forwarding database by updating the timestamp corresponding to the source MAC address.

The core network 1220 may route the third frame 1250 through the cellular network as described with reference to FIG. 11. In some examples, when the timestamp information is maintained in the forwarding database, the core network 1220 may not update a timestamp field of the forwarding database.

Figure 13:
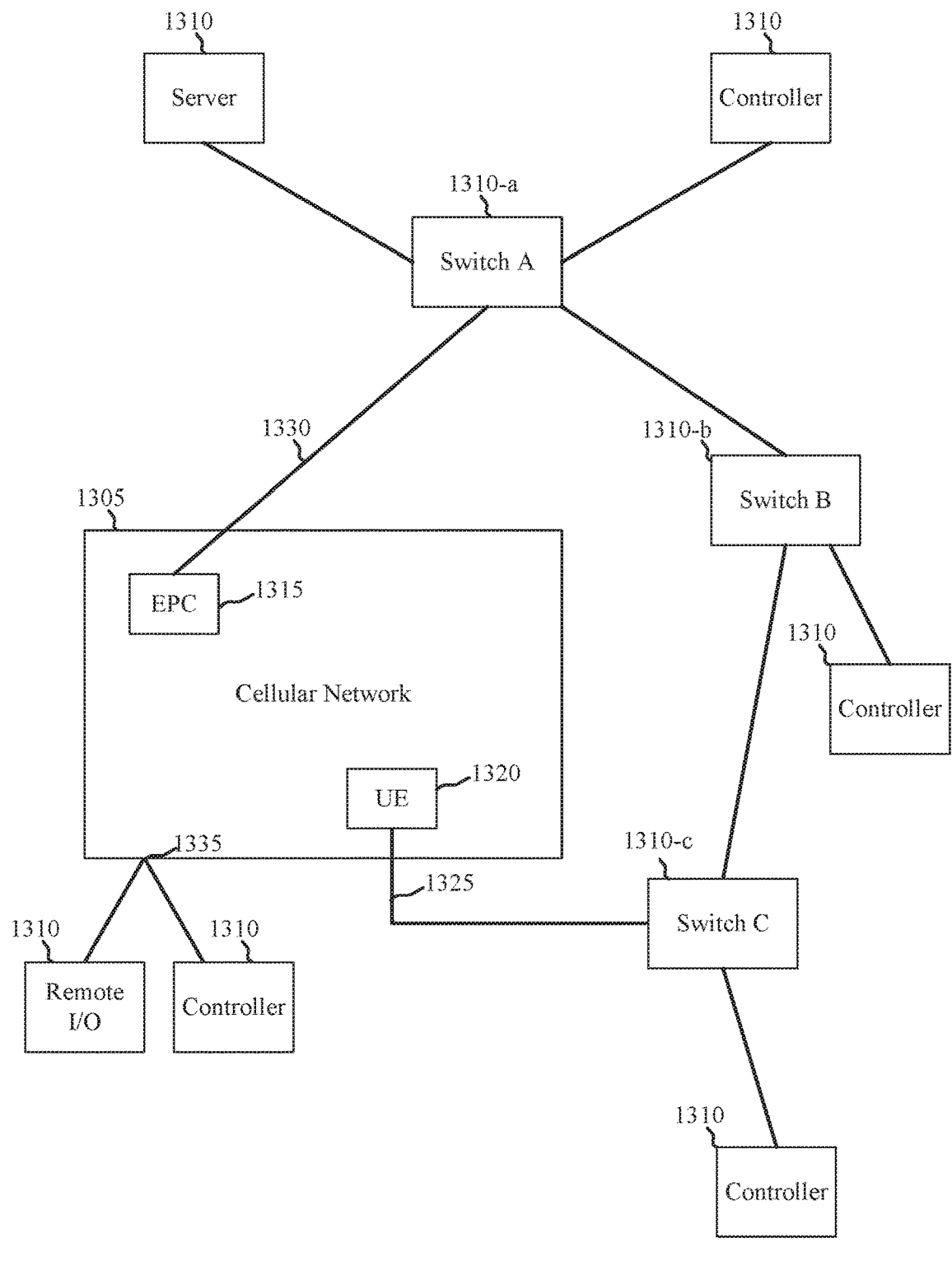
FIG. 13 illustrates an example of a communications network that supports Ethernet over cellular in accordance with aspects of the present disclosure.

FIG. 13 illustrates an example of a communications network 1300 that supports Ethernet over cellular in accordance with various aspects of the present disclosure. In some examples, communications network 1300 may implement aspects of wireless communications system 100. The communications network 1300 may be an example of aspects of communications network 200 described with reference to FIG. 2. The communications network 1300 may include a cellular network 1305 and Ethernet devices 1310. The cellular network 1305 may be an example of aspects of cellular network 205 described with reference to FIG. 2. The Ethernet devices 1310 may be an example of aspects of Ethernet devices 210 described with reference to FIG. 2. In some other examples, the cellular network 1305 may be coupled to non-Ethernet devices that communicate according to other wired communication protocols.

The communications network 1300 may include a number of Ethernet bridges such as Ethernet switch A 1310-a, Ethernet switch B 1310-b, and Ethernet switch C 1310-c. The Ethernet bridges may be configured to route Ethernet traffic to other Ethernet devices 1310 such as remote I/O devices, controllers, and the like. In some other examples, the communications network 1300 may include non-Ethernet bridges that communicate according to another wired communication protocol. Bridge functionality may also be implemented in a core network in the cellular network 1305. For example, the EPC 1315 (or NGC) of the cellular network 1305 may be designated as a bridge.

A communications network may include one or more loops. For example, communications network 1300 includes a loop from cellular network 1305 to Ethernet Switch A 1310-a to Ethernet switch B 1310-b to Ethernet switch C 1310-c and back to cellular network 1305. Such loops may result in an endless loop for broadcast packets, for example, if a broadcast packet that is received by an Ethernet bridge is transmitted on each port except the port on which the broadcast packet was received.

In order to avoid this infinite loop problem, the communications network 1300 may use a rapid spanning tree protocol. In the rapid spanning tree protocol, a root bridge for the loop may be chosen. In some examples, the bridge priority of the EPC 1315 may be set to a low priority value to decrease the likelihood that it will be chosen as the root bridge. For example, Ethernet switch C 1310-c may be chosen as the root bridge.

The EPC 1315 may then calculate a least cost path to the root bridge. The least cost path may be calculated by calculating the cost for each link between the EPC 1315 and the root bridge (e.g., Ethernet switch C 1310-c). In some examples, an airlink may be assessed a higher cost than an Ethernet link. For example, a first path between EPC 1315 and Ethernet switch C 1310-c runs from EPC 1315 to Ethernet switch A 1310-a to Ethernet switch B 1310-b to Ethernet switch C 1310-c. A second path between EPC 1315 and Ethernet switch C 1310-c runs from EPC 1315 to UE 1320 to Ethernet switch C 1310-c. The first path includes three Ethernet links. The second patch has two links: one Ethernet link and one airlink. If the airlink has a cost of more than double the cost of an Ethernet link, the first path may be chosen even though it includes more total links.

In some examples, the cost for the airlink may be a fixed value. In some examples, the cost for the airlink may be based at least in part on downlink and/or uplink system capacity. In some examples, the airlink cost may be based at least in part on whether a bridge protocol data unit (BPDU) is received on a P-GW or UPF, or on a UE. If the BPDU is received on a UE, the airlink cost may be based at least in part on uplink or downlink metrics for the link between the UE and an associated base station.

When the least cost path is identified, the EPC 1315 may prevent certain transmissions from the other ports included in the loop. For example, if the first path is selected as the least cost path, the EPC 1315 may block port 1325. The EPC 1315 may block port 1325 by not mapping any MAC addresses to port 1325. For example, the EPC 1315 may map the MAC address of the Ethernet switches 1310-a, 1310-b, and 1310-c, and the Ethernet devices 1310 coupled thereto, to the P-GW or UPF at port 1330. The EPC 1315 may also block port 1325 by not transmitting broadcast and/or multicast and/or unknown unicast messages over the blocked port. Instead, the EPC 1315 may transmit broadcast, multicast, and unknown unicast messages only over the port 1330 on the least cost path and any ports that are not part of any loop, such as port 1335.

In some examples, a path using an airlink may be chosen as the least cost path. For example, the path through port 1325 may be chosen as the least cost path. In such examples, there may come a time when the channel quality of the airlink between the EPC 1315 and UE 1320 degrades, or when the connection between the EPC 1315 and UE 1320 is lost. In some examples, the EPC 1315 may respond by triggering a TCN BPDU on an Ethernet link (e.g., on port 1330). The EPC 1315 may then select a different least cost path (which may or may not be based on a different root bridge).

Figure 14:
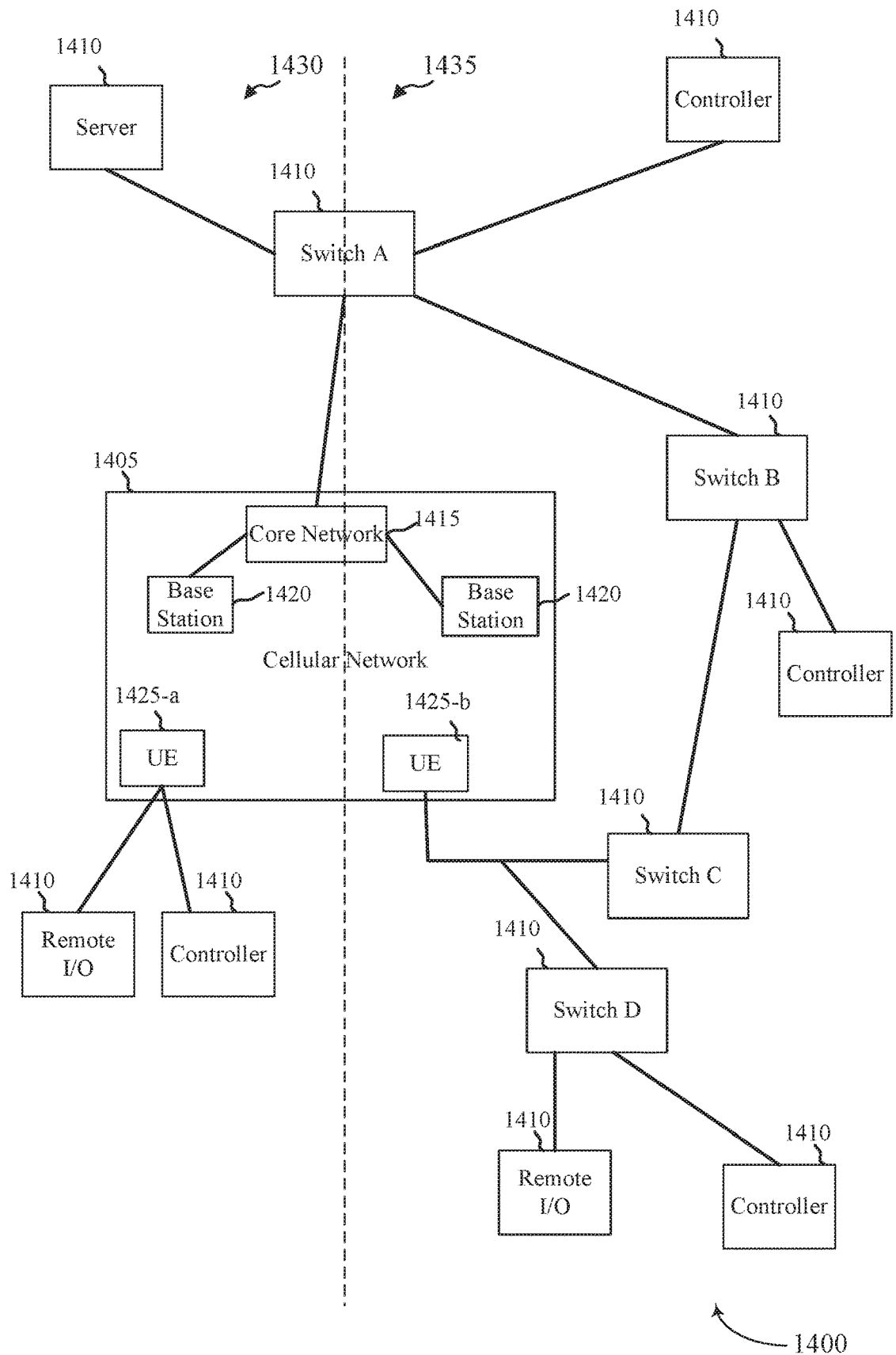
FIG. 14 illustrates an example of a communications network that supports Ethernet over cellular in accordance with aspects of the present disclosure.

FIG. 14 illustrates an example of a communications network 1400 that supports Ethernet over cellular in accordance with various aspects of the present disclosure. In some examples, communications network 1400 may implement aspects of wireless communications system 100. The communications network 1400 may be an example of aspects of communications network 200 described with reference to FIG. 2. Communications network 1400 may include a cellular network 1405 and Ethernet devices 1410. The cellular network 1405 and Ethernet devices 1410 may be an example of aspects of cellular network 205 and Ethernet devices 210 described with reference to FIG. 2.

The cellular network 1405 may include a core network 1415, base stations 1420, and UEs 1425. Core network 1415, base stations 1420, and UEs 1425 may be examples of aspects of core network 130, base stations 105, and UEs 115 described with reference to FIG. 1. The core network 1415 may be or include an EPC, or an NGC, or both.

In some examples, the core network 1415 (e.g., the EPC or the NGC) may logically separate the communications network 1400 into two or more virtual LANs (VLANs). For example, the communications network may be separated into a first VLAN 1430 and a second VLAN 1440. For example, the core network may separate the communications network 1400 into two VLANs because a second VLAN 1435 may have higher QoS requirements than a first VLAN 1430. A cellular network switch may communicate in a first VLAN 1430 using a first port and may communicate in a second VLAN 1140 using a second port. The core network 1415 may separate traffic for the two VLANs and provide the appropriate level of QoS. In addition, the core network 1415 may store a spanning tree for each VLAN. In some examples, the core network 1415 may add or remove VLAN identifiers (e.g., a 802.1Q VLAN header) for incoming traffic. For example, the core network 1415 may add a 802.1Q header identifying the first VLAN 1430 to packets received from a first UE 1425-*a*. Likewise, the core network 1415 may add a 802.1Q header identifying the second VLAN 1435 to packets received from a second UE 1425-*b*. In some examples, the core network 1415 may maintain a first forwarding database for the first VLAN 1430 and may maintain a second forwarding database for the second VLAN 1440.

Figure 15:
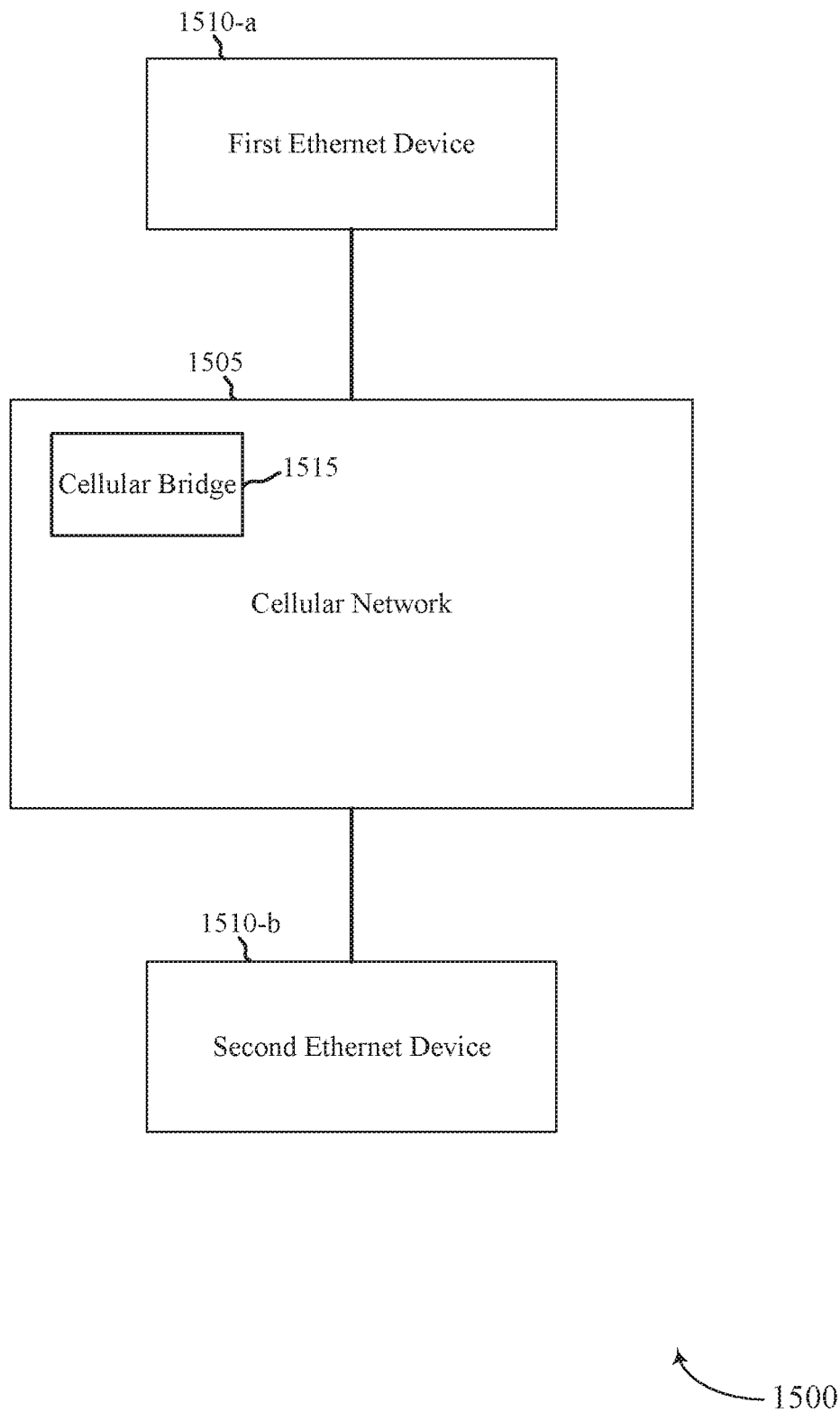
FIG. 15 illustrates an example of a communications network that supports Ethernet over cellular in accordance with aspects of the present disclosure.

FIG. 15 illustrates an example of a communications network 1500 that supports Ethernet over cellular in accordance with various aspects of the present disclosure. In some examples, communications network 1500 may implement aspects of wireless communications system 100. The communications network 1500 may be an example of aspects of communications network 200 described with reference to FIG. 2. Communications network 1500 may include a cellular network 1505 and Ethernet devices 1510. The cellular network 1505 and Ethernet devices 1510 may be an example of aspects of cellular network 205 and Ethernet devices 210 described with reference to FIG. 2.

The cellular network 1505 may include a cellular bridge 1515. The cellular bridge 1515 may be, for example, a component of a core network such as core network 130 described with reference to FIG. 1. In some examples, the cellular bridge 1515 may be a component of an EPC or an NGC.

An Ethernet link may be capable of transmitting at various speeds based on the devices communicating over the link. The cellular bridge 1515 may perform auto-negotiation of supported speeds. In some examples, the cellular bridge 1515 may perform auto-negotiation of supported speeds for a communication path including Ethernet links only. For example, the first Ethernet device 1510-*a* may be connected to the cellular bridge 1515 by an Ethernet link (e.g., via a P-GW or UPF). In some other examples, the cellular bridge 1515 may perform auto-negotiation of supported speeds for a communication path including both Ethernet links and wireless communication links. For example, the second Ethernet device 1510-*b* may be connected to the cellular bridge 1515 by an Ethernet link and a wireless communications link between a UE and a base station.

In the latter examples, the auto-negotiation of supported speeds may be based at least in part on a UE category, an available bandwidth over the wireless link (uplink and downlink), bandwidth re-use over the wireless link, time division duplexing (TDD) configuration, received signal power over the wireless link at the UE, signal-to-noise ratios (e.g., SNR or SINR) at the UE, or a combination thereof.

Figure 16:
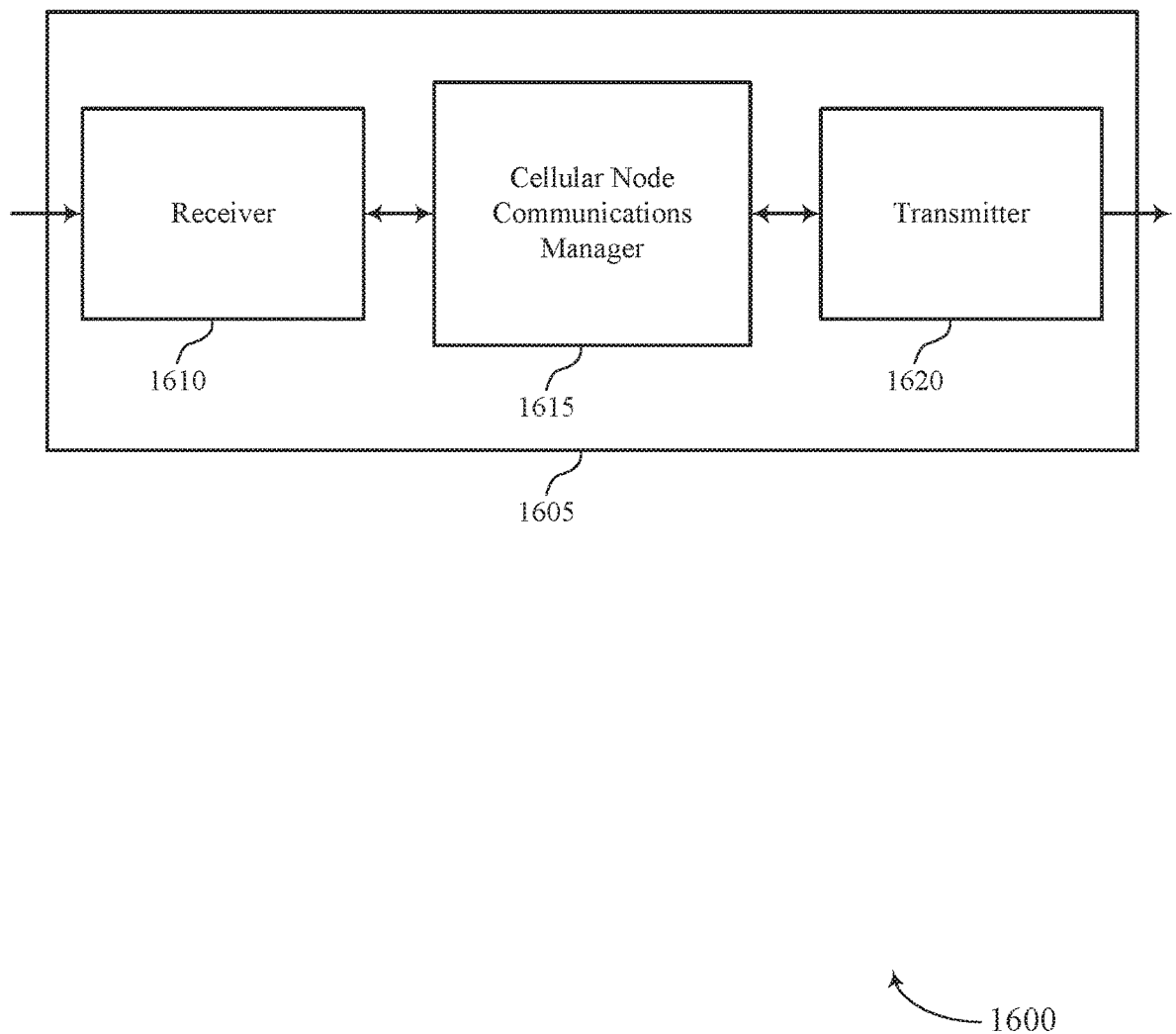
FIGS. 16 through 18 show block diagrams of a device that supports Ethernet over cellular in accordance with aspects of the present disclosure.

FIG. 16 shows a block diagram 1600 of a wireless device 1605 that supports Ethernet over cellular in accordance with aspects of the present disclosure. Wireless device 1605 may be an example of aspects of a cellular node 225 or cellular node 505 as described herein. Wireless device 1605 may include receiver 1610, cellular node communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to Ethernet over cellular, etc.). Information may be passed on to other components of the device. The receiver 1610 may be an example of aspects of the transceiver 1935 described with reference to FIG. 19. The receiver 1610 may utilize a single antenna or a set of antennas.

Receiver 1610 may receive a set of Ethernet frames at a first cellular node of a cellular network, receive a set of internet protocol (IP) frames at the first cellular node, and receive, at the first cellular node, an Ethernet frame associated with an additional traffic class.

Cellular node communications manager 1615 may be an example of aspects of the cellular node communications manager 1915 described with reference to FIG. 19.

Cellular node communications manager 1615 and/or at least some of its various sub-components may be implemented in hardware, software executed by a processor, firmware, or any combination thereof. If implemented in software executed by a processor, the functions of the cellular node communications manager 1615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The cellular node communications manager 1615 and/or at least some of its various sub-components may be physically located at various positions, including being distributed such that portions of functions are implemented at different physical locations by one or more physical devices. In some examples, cellular node communications manager 1615 and/or at least some of its various sub-components may be a separate and distinct component in accordance with various aspects of the present disclosure. In other examples, cellular node communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Cellular node communications manager 1615 may identify traffic classes for the set of received Ethernet frames and map the set of received Ethernet frames to a set of bearers for transport from the first cellular node to a second cellular node of the cellular network based on the identified traffic classes for the set of received Ethernet frames.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Transmitter 1620 may transmit the set of received Ethernet frames on the set of bearers to the second cellular node via a non-IP packet data network based on the mapping and transmit the set of IP frames on the IP bearer to the second cellular node via an IP packet data network.

Figure 17:
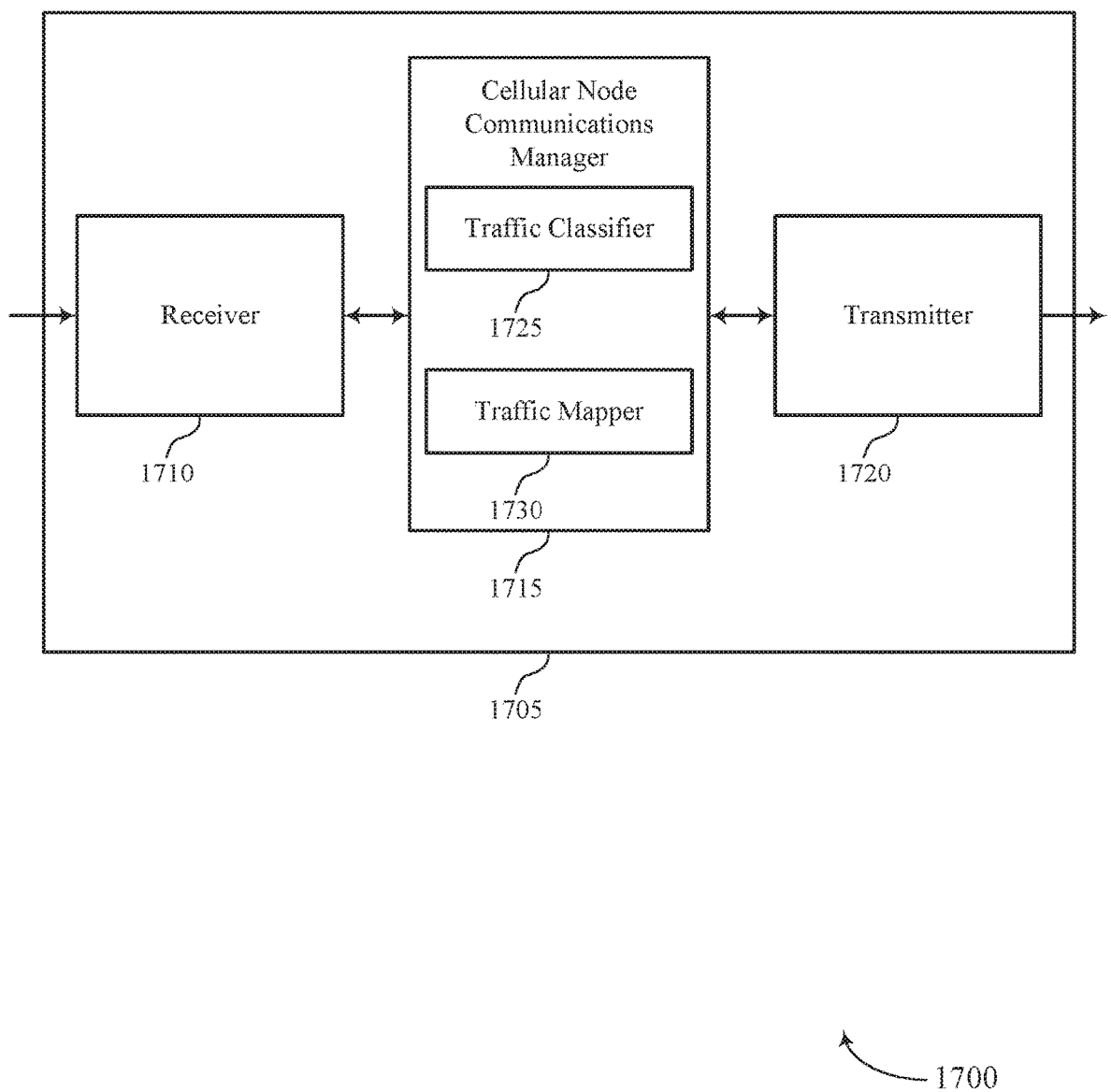

FIG. 17 shows a block diagram 1700 of a wireless device 1705 that supports Ethernet over cellular in accordance with aspects of the present disclosure. Wireless device 1705 may be an example of aspects of a wireless device 1605 or a cellular node 225 or cellular node 505 as described with reference to FIG. 16. Wireless device 1705 may include receiver 1710, cellular node communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to Ethernet over cellular, etc.). Information may be passed on to other components of the device. The receiver 1710 may be an example of aspects of the transceiver 1935 described with reference to FIG. 19. The receiver 1710 may utilize a single antenna or a set of antennas.

Cellular node communications manager 1715 may be an example of aspects of the cellular node communications manager 1915 described with reference to FIG. 19.

Cellular node communications manager 1715 may also include traffic classifier 1725 and traffic mapper 1730.

Traffic classifier 1725 may identify traffic classes for the set of received Ethernet frames, determine that the identified value for the parameter is associated with a first of the traffic classes, identify a priority code point (PCP) field in a virtual local area network tag of one or more of the set of received Ethernet frames, and identify a second Ethertype based on identifying the presence of the VLAN indicator. In some cases, identifying the traffic classes for the set of received Ethernet frames includes: identifying, for a first Ethernet frame of the set of received Ethernet frames, a value for a parameter of the first Ethernet frame. In some cases, the parameter includes an Ethertype, or a VLAN identifier, or a VLAN tag PCP, or a transmission protocol type, or a source address, or a destination address, or a source port identifier, or a destination port identifier, or a combination thereof. In some cases, identifying the traffic classes for the set of received Ethernet frames includes: identifying a first Ethertype for each of the set of received Ethernet frames. In some cases, identifying the traffic classes for the set of received Ethernet frames further includes: identifying a presence of a VLAN indicator associated with the first Ethertype.

Traffic mapper 1730 may map the set of received Ethernet frames to a set of bearers for transport from the first cellular node to a second cellular node of the cellular network based on the identified traffic classes for the set of received Ethernet frames, map each of the set of received Ethernet frames to a bearer of the set of bearers based on the result, map the one or more of the set of received Ethernet frames to the quality of service class identifier based on the PCP field in the VLAN tag, map the set of received Ethernet frames is based on the identified second Ethertype, and map the received set of IP frames to an IP bearer to transport the received set of IP frames from the first cellular node to a second cellular node of the Ethernet over cellular network, where the IP bearer is distinct from the set of bearers. In some cases, mapping the received Ethernet frames based on the identified traffic classes for the set of received Ethernet frames includes: applying, for each of the respective set of received Ethernet frames, one or more packet filter rules to the identified traffic classes of a respective Ethernet frame to obtain a result. In some cases, a TFT of the first cellular node includes the one or more packet filter rules. In some cases, mapping the set of received Ethernet frames to the set bearers includes: mapping the set of received Ethernet frames to an evolved packet system bearer identifier, or a radio bearer identifier, or a quality of service class identifier, or a combination thereof. In some cases, a first bearer of the set of bearers is configured to carry two or more of the set of traffic classes.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
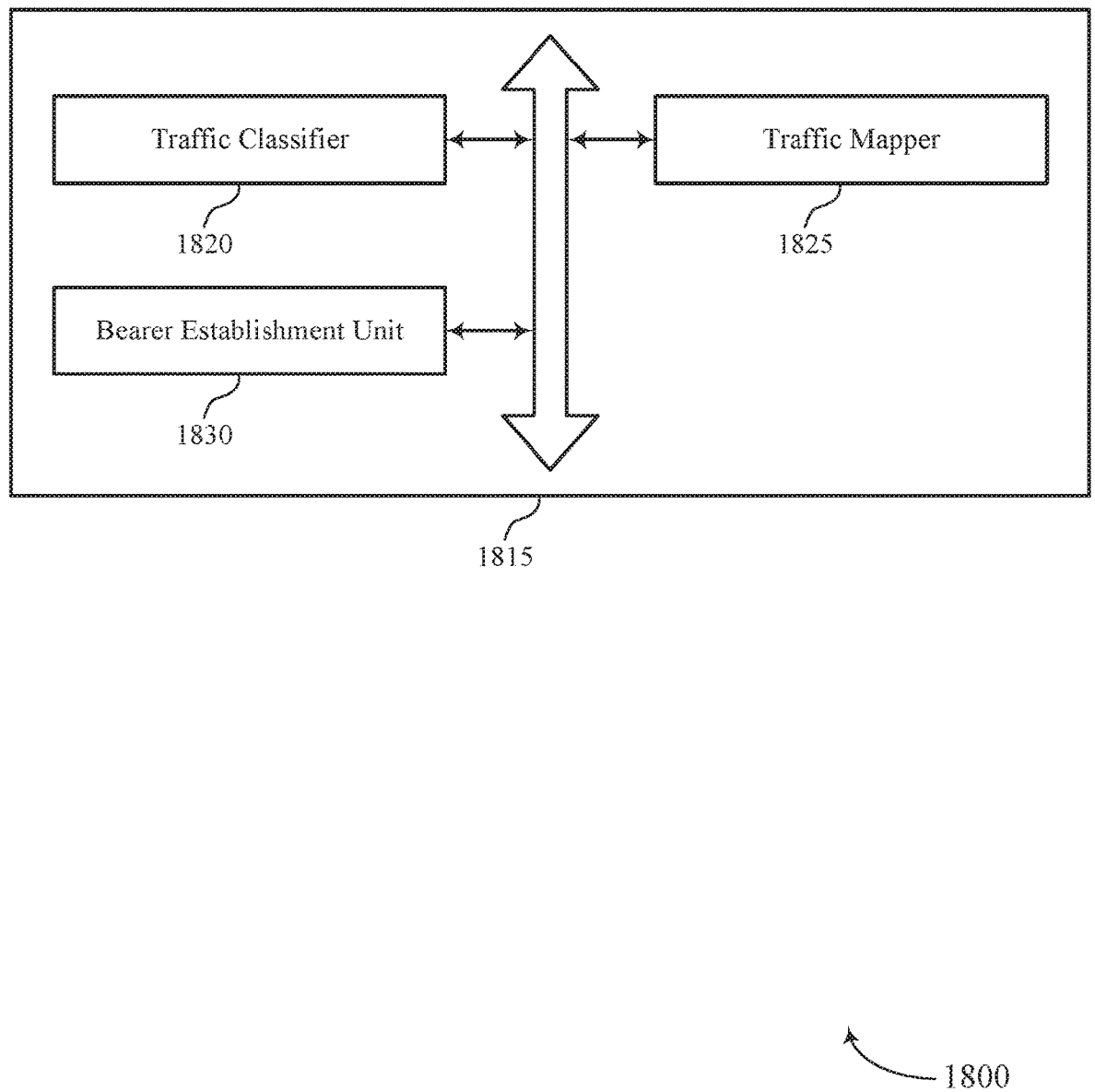

FIG. 18 shows a block diagram 1800 of a cellular node communications manager 1815 that supports Ethernet over cellular in accordance with aspects of the present disclosure. The cellular node communications manager 1815 may be an example of aspects of a cellular node communications manager 1615, a cellular node communications manager 1715, or a cellular node communications manager 1915 described with reference to FIGS. 16, 17, and 19. The cellular node communications manager 1815 may include traffic classifier 1820, traffic mapper 1825, and bearer establishment unit 1830. Each of these modules may communicate, directly or indirectly, with one another (e.g., via one or more buses).

Traffic classifier 1820 may identify traffic classes for the set of received Ethernet frames, determine that the identified value for the parameter is associated with a first of the traffic classes, identify a PCP field in a virtual local area network tag of one or more of the set of received Ethernet frames, and identify a second Ethertype based on identifying the presence of the VLAN indicator. In some cases, identifying the traffic classes for the set of received Ethernet frames includes: identifying, for a first Ethernet frame of the set of received Ethernet frames, a value for a parameter of the first Ethernet frame. In some cases, the parameter includes an Ethertype, or a VLAN identifier, or a VLAN tag priority code point (PCP), or a transmission protocol type, or a source address, or a destination address, or a source port identifier, or a destination port identifier, or a combination thereof. In some cases, identifying the traffic classes for the set of received Ethernet frames includes: identifying a first Ethertype for each of the set of received Ethernet frames. In some cases, identifying the traffic classes for the set of received Ethernet frames further includes: identifying a presence of a VLAN indicator associated with the first Ethertype.

Traffic mapper 1825 may map the set of received Ethernet frames to a set of bearers for transport from the first cellular node to a second cellular node of the cellular network based on the identified traffic classes for the set of received Ethernet frames, map each of the set of received Ethernet frames to a bearer of the set of bearers based on the result, map the one or more of the set of received Ethernet frames to the quality of service class identifier based on the PCP field in the VLAN tag, map the set of received Ethernet frames is based on the identified second Ethertype, and map the received set of IP frames to an IP bearer to transport the received set of IP frames from the first cellular node to a second cellular node of the Ethernet over cellular network, where the IP bearer is distinct from the set of bearers. In some cases, mapping the received Ethernet frames based on the identified traffic classes for the set of received Ethernet frames includes: applying, for each of the respective set of received Ethernet frames, one or more packet filter rules to the identified traffic classes of a respective Ethernet frame to obtain a result. In some cases, a TFT of the first cellular node includes the one or more packet filter rules. In some cases, mapping the set of received Ethernet frames to the set bearers includes: mapping the set of received Ethernet frames to an evolved packet system bearer identifier, or a radio bearer identifier, or a quality of service class identifier, or a combination thereof. In some cases, a first bearer of the set of bearers is configured to carry two or more of the set of traffic classes. In some cases, the first cellular node includes the P-GW or the UPF, and the second cellular node includes the UE.

Bearer establishment unit 1830 may establish the set of bearers based on a preconfigured list of bearers, identify an absence of a bearer for the additional traffic class, and establish, in addition to the set of bearers, the bearer for the additional traffic class.

In some cases, the cellular node communications manager 1815 includes or is part of a UE. In some other examples, the cellular node communications manager 1815 includes or is part of a P-GW) or a UPF.

Figure 19:
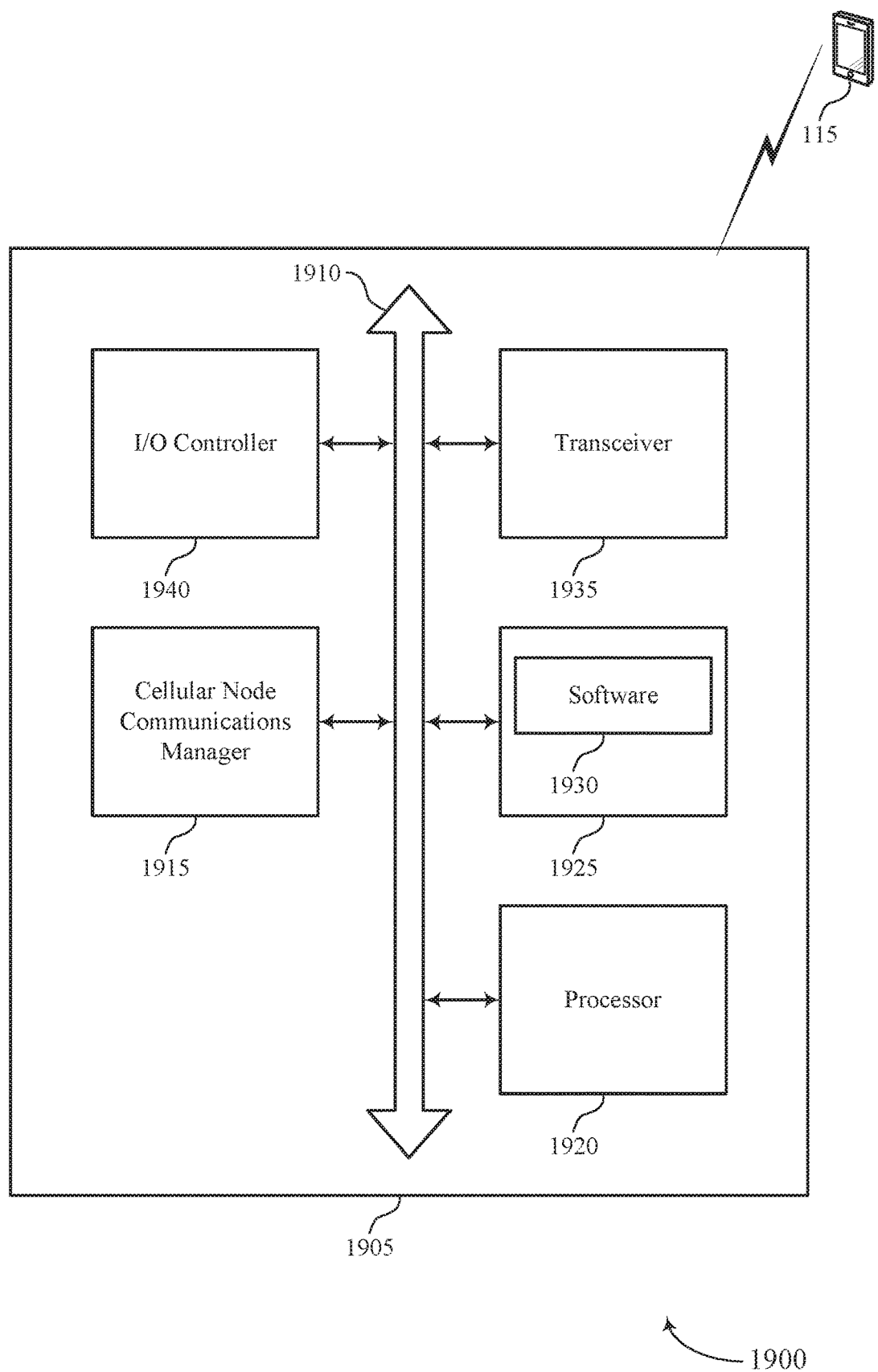
FIG. 19 illustrates a block diagram of a system including a cellular node that supports Ethernet over cellular in accordance with aspects of the present disclosure.

FIG. 19 shows a diagram of a system 1900 including a device 1905 that supports Ethernet over cellular in accordance with aspects of the present disclosure. Device 1905 may be an example of or include the components of wireless device 1605, wireless device 1705, or a cellular node 225 or cellular node 505 as described above, e.g., with reference to FIGS. 16 and 17. Device 1905 may include components for bi-directional voice and data communications including components for transmitting and receiving communications, including cellular node communications manager 1915, processor 1920, memory 1925, software 1930, transceiver 1935, and I/O controller 1940. These components may be in electronic communication via one or more buses (e.g., bus 1910).

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting Ethernet over cellular).

Memory 1925 may include random access memory (RAM) and read only memory (ROM). The memory 1925 may store computer-readable, computer-executable software 1930 including instructions that, when executed, cause the processor to perform various functions described herein. In some cases, the memory 1925 may contain, among other things, a basic input/output system (BIOS) which may control basic hardware or software operation such as the interaction with peripheral components or devices.

Software 1930 may include code to implement aspects of the present disclosure, including code to support Ethernet over cellular. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

I/O controller 1940 may manage input and output signals for device 1905. I/O controller 1940 may also manage peripherals not integrated into device 1905. In some cases, I/O controller 1940 may represent a physical connection or port to an external peripheral. In some cases, I/O controller 1940 may utilize an operating system such as iOS®, ANDROID®, MS-DOS®, MS-WINDOWS®, OS/2®, UNIX®, LINUX®, or another known operating system. In other cases, I/O controller 1940 may represent or interact with a modem, a keyboard, a mouse, a touchscreen, or a similar device. In some cases, I/O controller 1940 may be implemented as part of a processor. In some cases, a user may interact with device 1905 via I/O controller 1940 or via hardware components controlled by I/O controller 1940.

Figure 20:
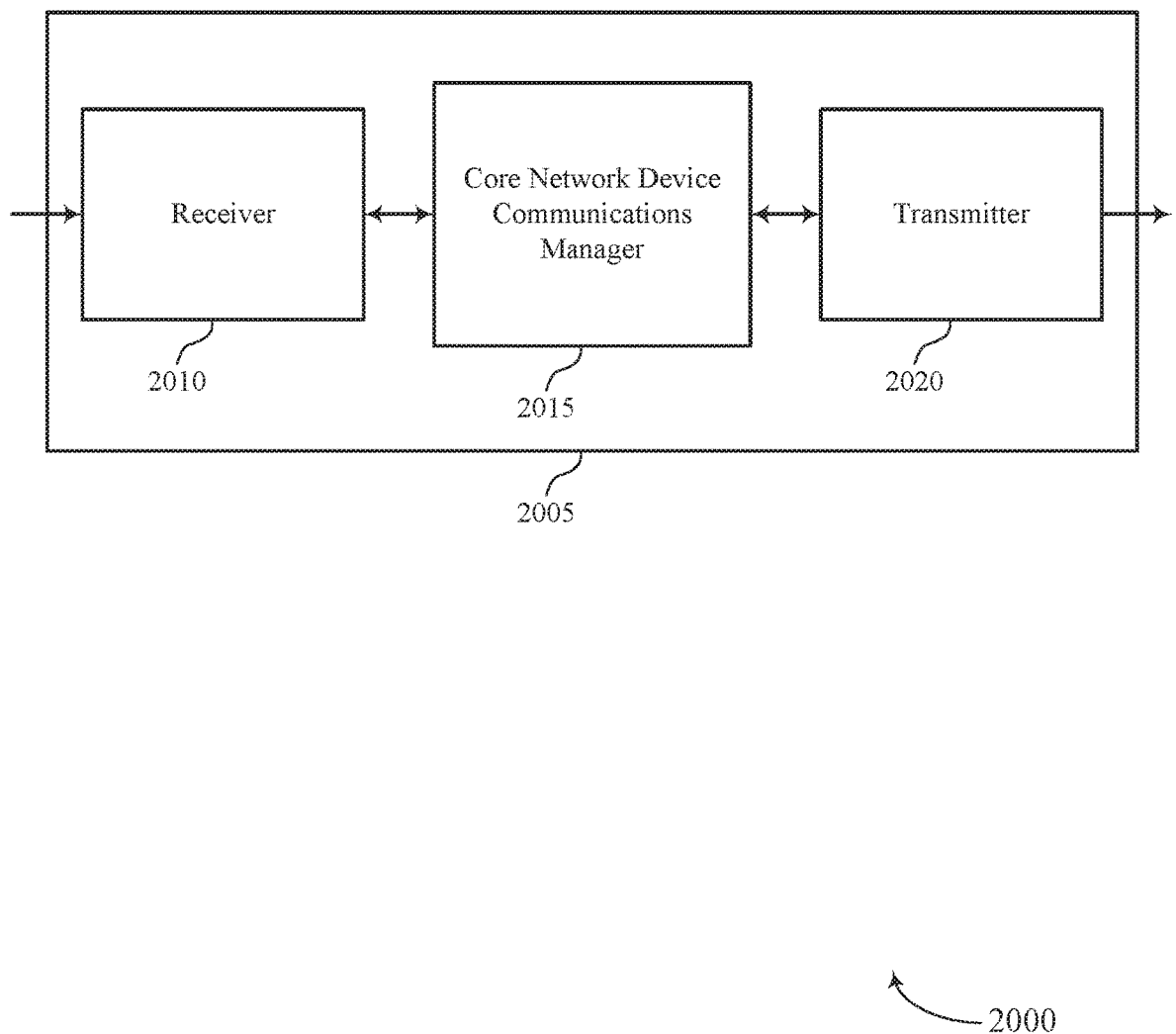
FIGS. 20 through 22 show block diagrams of a device that supports Ethernet over cellular in accordance with aspects of the present disclosure.

FIG. 20 shows a block diagram 2000 of a wireless device 2005 that supports Ethernet over cellular in accordance with aspects of the present disclosure. Wireless device 2005 may be an example of aspects of a component of an EPC or an NGC, or another core network component as described herein. Wireless device 2005 may include receiver 2010, core network device communications manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to Ethernet over cellular, etc.). Information may be passed on to other components of the device. The receiver 2010 may be an example of aspects of the transceiver 2335 described with reference to FIG. 23. The receiver 2010 may utilize a single antenna or a set of antennas.

Receiver 2010 may receive, at a first cellular node, an indication of a first source MAC address for an Ethernet frame received at a first port of a set of ports of a cellular network switch, the cellular network switch including a set of cellular nodes corresponding to the set of ports, receive a broadcast, multicast, or unknown unicast Ethernet frame, receive a second Ethernet frame at the first port, and receive a second Ethernet frame at a second port corresponding to the first cellular node.

Core network device communications manager 2015 may be an example of aspects of the core network device communications manager 2315 described with reference to FIG. 23.

Core network device communications manager 2015 and/or at least some of its various sub-components may be implemented in hardware, software executed by a processor, firmware, or any combination thereof. If implemented in software executed by a processor, the functions of the core network device communications manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The core network device communications manager 2015 and/or at least some of its various sub-components may be physically located at various positions, including being distributed such that portions of functions are implemented at different physical locations by one or more physical devices. In some examples, core network device communications manager 2015 and/or at least some of its various sub-components may be a separate and distinct component in accordance with various aspects of the present disclosure. In other examples, core network device communications manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Core network device communications manager 2015 may identify a first mapping between the first source MAC address and an identifier of the first cellular node or a second cellular node corresponding to the first port and store the first mapping in a forwarding database at the first cellular node.

Transmitter 2020 may transmit signals generated by other components of the device. In some examples, the transmitter 2020 may be collocated with a receiver 2010 in a transceiver module. For example, the transmitter 2020 may be an example of aspects of the transceiver 2335 described with reference to FIG. 23. The transmitter 2020 may utilize a single antenna or a set of antennas.

Transmitter 2020 may route the second Ethernet frame to the first cellular node or the second cellular node based on the identification and the forwarding database.

Figure 21:
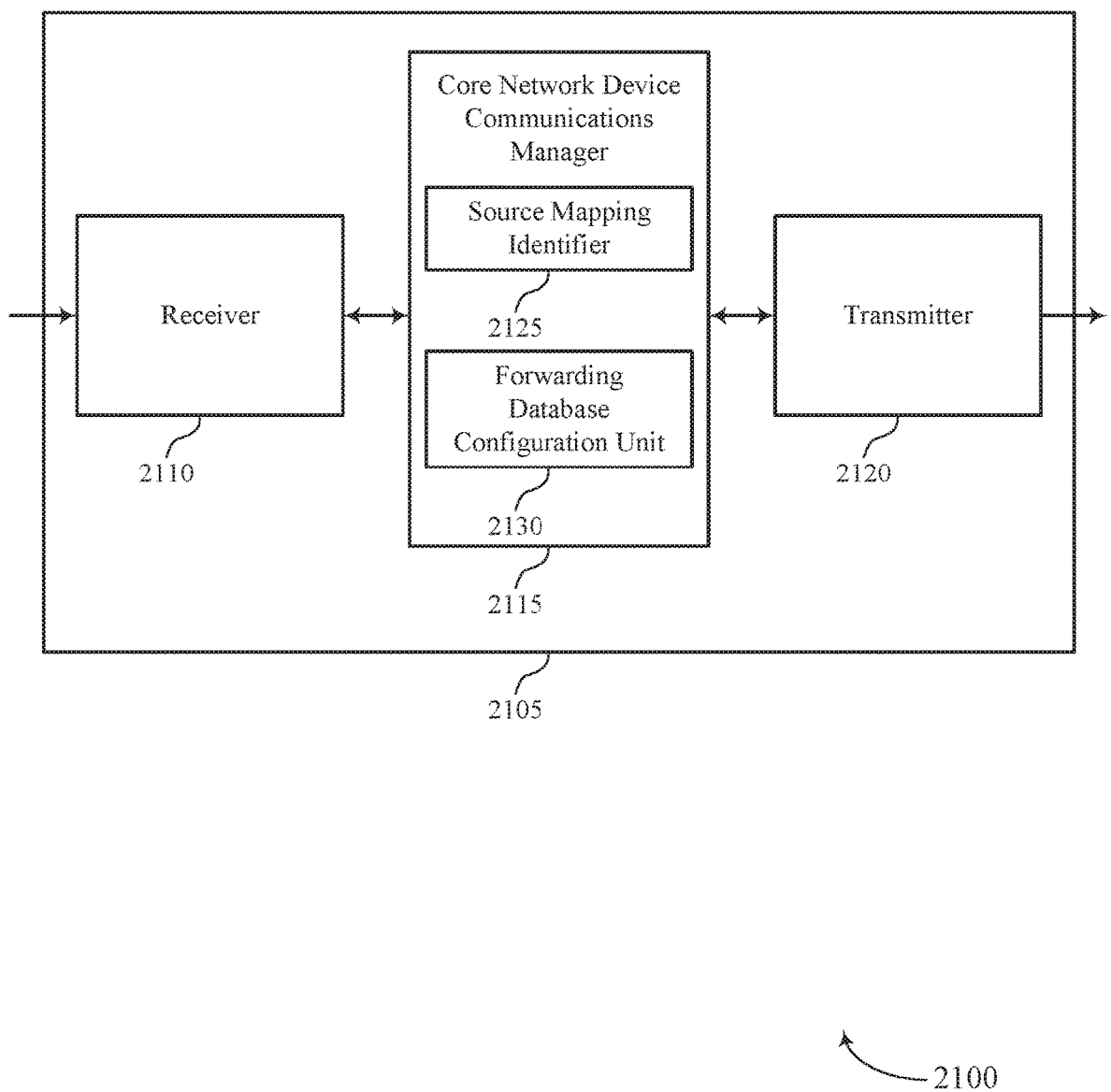

FIG. 21 shows a block diagram 2100 of a wireless device 2105 that supports Ethernet over cellular in accordance with aspects of the present disclosure. Wireless device 2105 may be an example of aspects of a wireless device 2005 or a core network device as described with reference to FIG. 20. Wireless device 2105 may include receiver 2110, core network device communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to Ethernet over cellular, etc.). Information may be passed on to other components of the device. The receiver 2110 may be an example of aspects of the transceiver 2335 described with reference to FIG. 23. The receiver 2110 may utilize a single antenna or a set of antennas.

Core network device communications manager 2115 may be an example of aspects of the core network device communications manager 2315 described with reference to FIG. 23.

Core network device communications manager 2115 may also include source mapping identifier 2125 and forwarding database configuration unit 2130.

Source mapping identifier 2125 may identify a first mapping between the first source MAC address and an identifier of the first cellular node or a second cellular node corresponding to the first port, map the received broadcast, multicast, or unknown unicast Ethernet frame to a set of unicast frames for a set of UEs, map the received broadcast, multicast, or unknown unicast Ethernet frame to a cellular broadcast channel, and identify a second source MAC address for the second Ethernet frame. In some cases, the identifier of the second cellular node includes an international mobile subscriber identity (IMSI), or a subscription identifier, or a certificate identifier, or an access point name (APN), or a Data Network Name (DNN), or a General Packet Radio Service (GPRS) Tunneling Protocol (GTP) tunnel endpoint identifier (TED), or a combination thereof. In some cases, the first source MAC address is associated with a VLAN identifier, and identifying the first mapping between the first source MAC address and the identifier of the first cellular node or the second cellular node includes identifying a mapping between a source pair and the identifier of the first cellular node or the second cellular node, the source pair including the first source MAC address and the associated VLAN identifier.

Forwarding database configuration unit 2130 may store the first mapping in a forwarding database at the first cellular node, update the forwarding database with a second mapping between the second source MAC address and the identifier of the first cellular node or the second cellular node corresponding to the first port, compare the first time indication to a second time indication for the second mapping, update the forwarding database with the second mapping based on the comparison, monitor a time indication in the forwarding database for the first mapping, identify that the time indication exceeds an age threshold, and remove the first mapping from the forwarding database based on the identification. In some cases, updating the forwarding database includes: identifying a first time indication in the forwarding database for the first mapping.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2335 described with reference to FIG. 23. The transmitter 2120 may utilize a single antenna or a set of antennas.

Transmitter 2120 may provide one or more mappings from the forwarding database to a third cellular node of the set of cellular nodes. In some examples, the wireless device 2105 may be aa UE and the third cellular node may be a node of an evolved packet core.

In some examples, core network communications manager 2115 may communicate in a first VLAN of the local area network using one or more first ports and a second VLAN of the local area network using one or more second ports. Forwarding database configuration unit 2130 may maintain a first forwarding database for the first VLAN and maintain a second forwarding database for the second VLAN.

Figure 22:
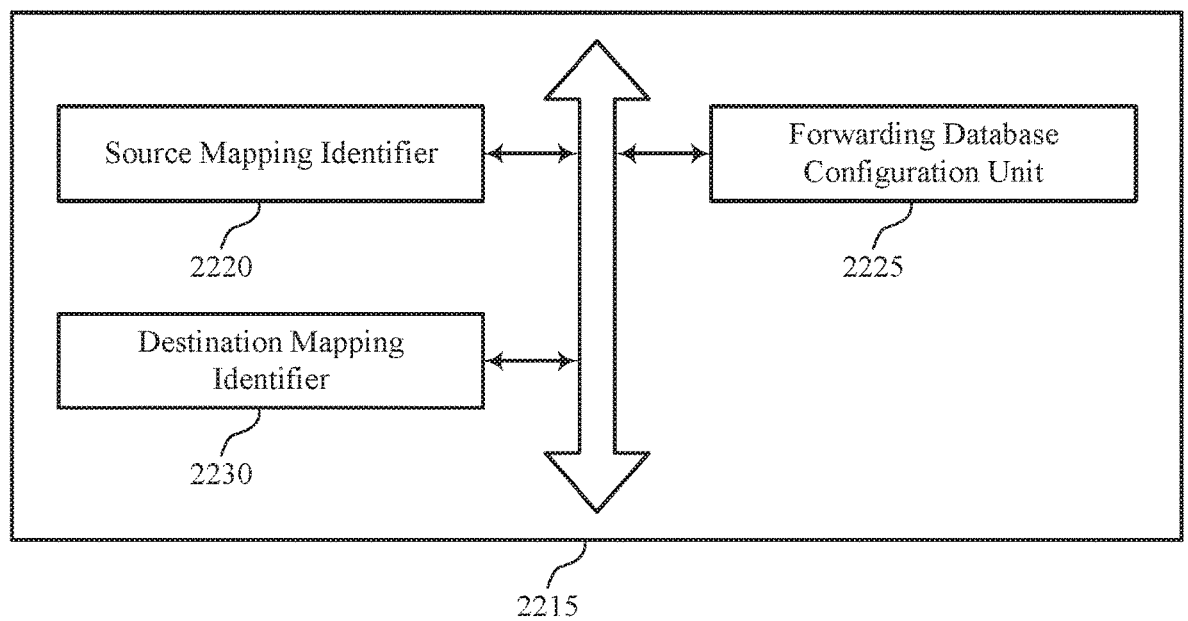

FIG. 22 shows a block diagram 2200 of a core network device communications manager 2215 that supports Ethernet over cellular in accordance with aspects of the present disclosure. The core network device communications manager 2215 may be an example of aspects of a core network device communications manager 2315 described with reference to FIGS. 20, 21, and 23. The core network device communications manager 2215 may include source mapping identifier 2220, forwarding database configuration unit 2225, and destination mapping identifier 2230. Each of these modules may communicate, directly or indirectly, with one another (e.g., via one or more buses).

Source mapping identifier 2220 may identify a first mapping between the first source MAC address and an identifier of the first cellular node or a second cellular node corresponding to the first port, map the received broadcast, multicast, or unknown unicast Ethernet frame to a set of unicast frames for a set of UEs, map the received broadcast, multicast, or unknown unicast Ethernet frame to a cellular broadcast channel, and identify a second source MAC address for the second Ethernet frame. In some cases, the identifier of the second cellular node includes an IMSI, or a subscription identifier, or a certificate identifier, or an APN, or a Data Network Name (DNN), or a General Packet Radio Service (GPRS) Tunneling Protocol (GTP) tunnel endpoint identifier (TEID), or a combination thereof. In some cases, the first source MAC address is associated with a VLAN identifier, and identifying the first mapping between the first source MAC address and the identifier of the first cellular node or the second cellular node includes identifying a mapping between a source pair and the identifier of the first cellular node or the second cellular node, the source pair including the first source MAC address and the associated VLAN identifier.

Forwarding database configuration unit 2225 may store the first mapping in a forwarding database at the first cellular node, update the forwarding database with a second mapping between the second source MAC address and the identifier of the first cellular node or the second cellular node corresponding to the first port, compare the first time indication to a second time indication for the second mapping, update the forwarding database with the second mapping based on the comparison, monitor a time indication in the forwarding database for the first mapping, identify that the time indication exceeds an age threshold, and remove the first mapping from the forwarding database based on the identification. In some cases, updating the forwarding database includes: identifying a first time indication in the forwarding database for the first mapping.

Destination mapping identifier 2230 may identify a destination MAC address for the second Ethernet frame, the destination MAC address a same address as the first source MAC address.

Figure 23:
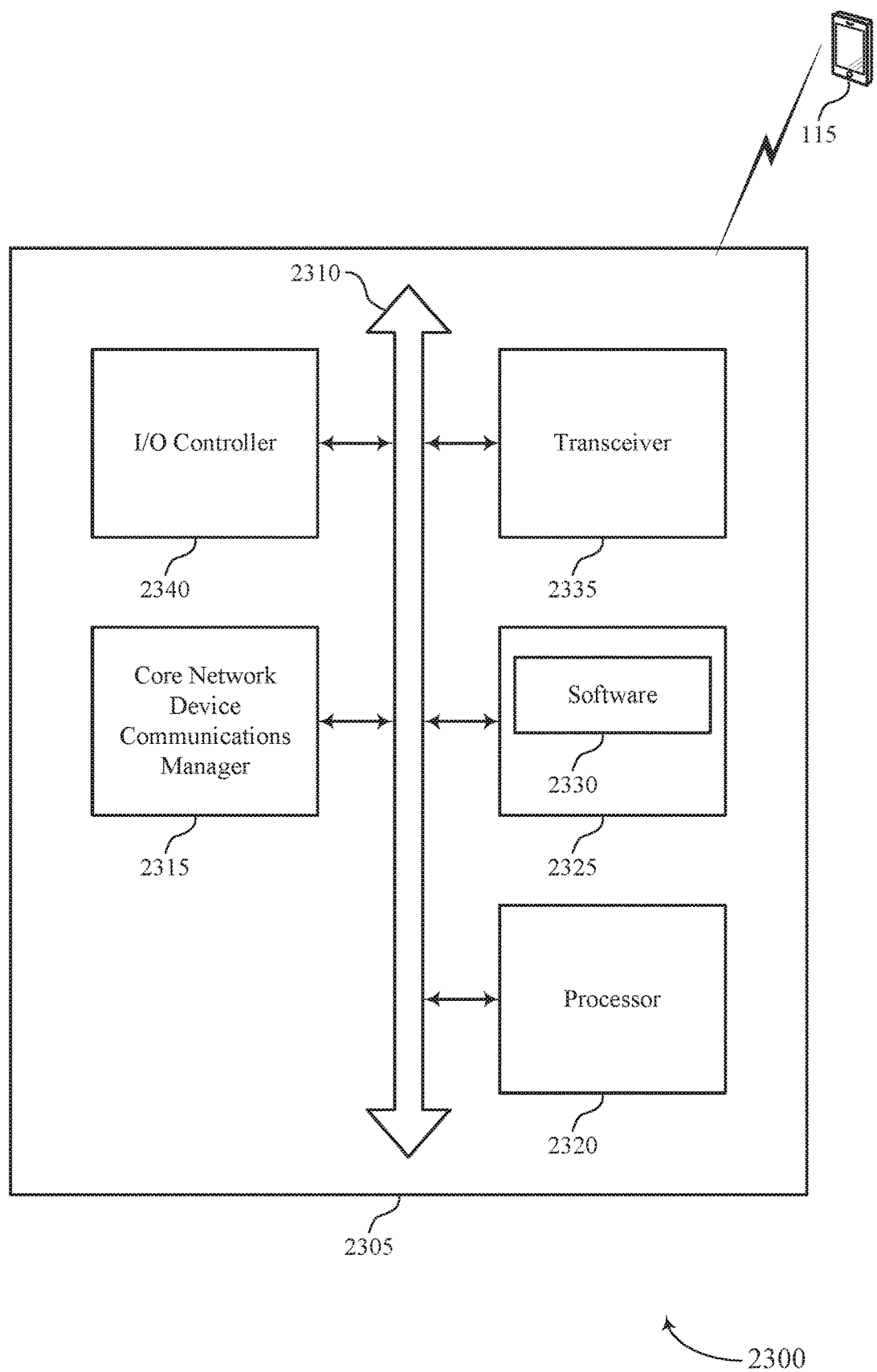
FIG. 23 illustrates a block diagram of a system including a core network device that supports Ethernet over cellular in accordance with aspects of the present disclosure.

FIG. 23 shows a diagram of a system 2300 including a device 2305 that supports Ethernet over cellular in accordance with aspects of the present disclosure. Device 2305 may be an example of or include the components of core network 130 as described above, e.g., with reference to FIG. 1. Device 2305 may include components for bi-directional voice and data communications including components for transmitting and receiving communications, including core network device communications manager 2315, processor 2320, memory 2325, software 2330, transceiver 2335, and I/O controller 2340. These components may be in electronic communication via one or more buses (e.g., bus 2310).

Processor 2320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2320 may be configured to operate a memory array using a memory controller. In other cases, a memory controller may be integrated into processor 2320. Processor 2320 may be configured to execute computer-readable instructions stored in a memory to perform various functions (e.g., functions or tasks supporting Ethernet over cellular).

Memory 2325 may include RAM and ROM. The memory 2325 may store computer-readable, computer-executable software 2330 including instructions that, when executed, cause the processor to perform various functions described herein. In some cases, the memory 2325 may contain, among other things, a BIOS which may control basic hardware or software operation such as the interaction with peripheral components or devices.

Software 2330 may include code to implement aspects of the present disclosure, including code to support Ethernet over cellular. Software 2330 may be stored in a non-transitory computer-readable medium such as system memory or other memory. In some cases, the software 2330 may not be directly executable by the processor but may cause a computer (e.g., when compiled and executed) to perform functions described herein.

Transceiver 2335 may communicate bi-directionally, via one or more antennas, wired, or wireless links as described above. For example, the transceiver 2335 may represent a wireless transceiver and may communicate bi-directionally with another wireless transceiver. The transceiver 2335 may also include a modem to modulate the packets and provide the modulated packets to the antennas for transmission, and to demodulate packets received from the antennas.

I/O controller 2340 may manage input and output signals for device 2305. I/O controller 2340 may also manage peripherals not integrated into device 2305. In some cases, I/O controller 2340 may represent a physical connection or port to an external peripheral. In some cases, I/O controller 2340 may utilize an operating system such as iOS®, ANDROID®, MS-DOS®, MS-WINDOWS®, OS/2®, UNIX®, LINUX®, or another known operating system. In other cases, I/O controller 2340 may represent or interact with a modem, a keyboard, a mouse, a touchscreen, or a similar device. In some cases, I/O controller 2340 may be implemented as part of a processor. In some cases, a user may interact with device 2305 via I/O controller 2340 or via hardware components controlled by I/O controller 2340.

Figure 24:
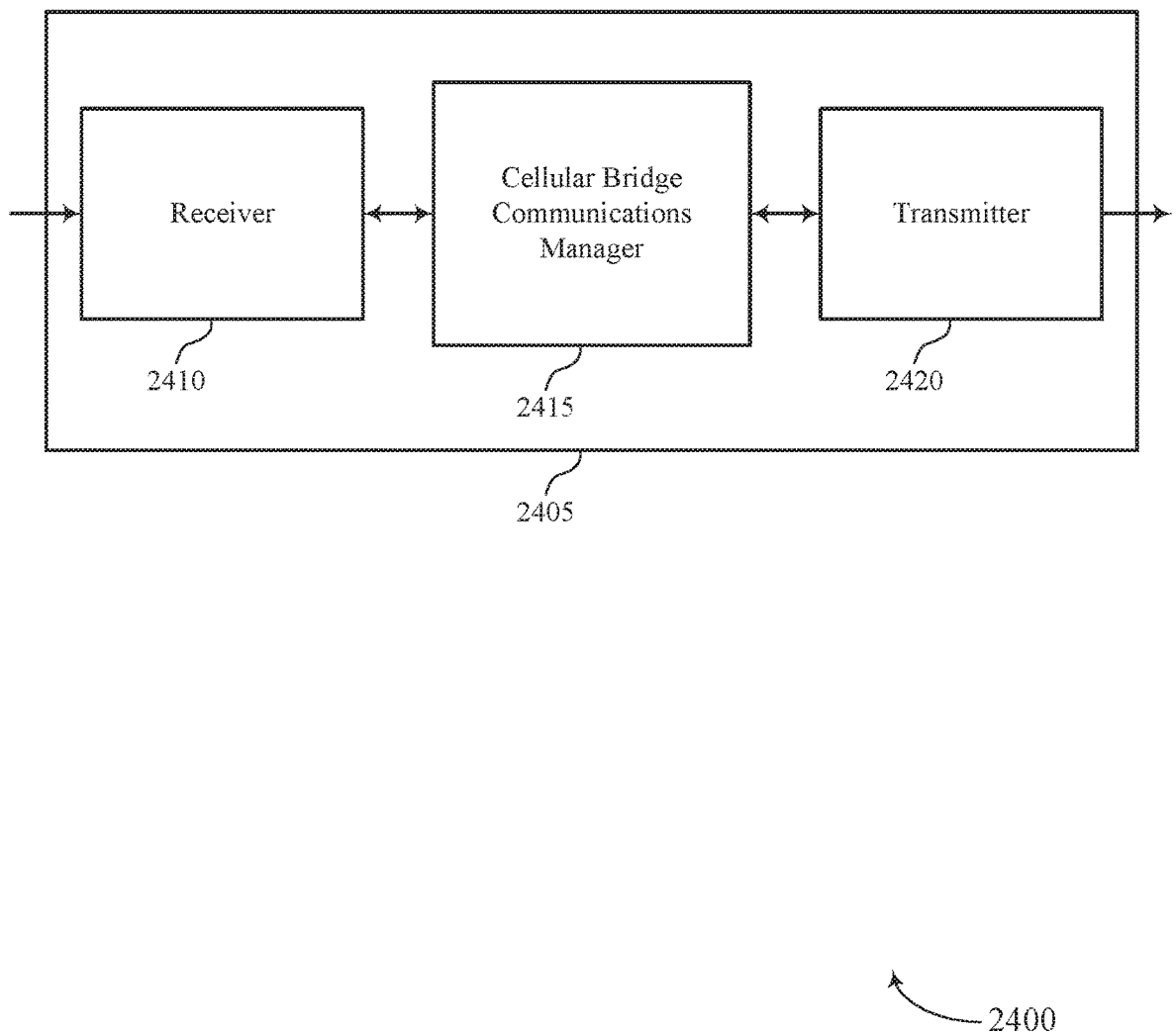
FIGS. 24 through 26 show block diagrams of a device that supports Ethernet over cellular in accordance with aspects of the present disclosure.

FIG. 24 shows a block diagram 2400 of a wireless device 2405 that supports Ethernet over cellular in accordance with aspects of the present disclosure. Wireless device 2405 may be an example of aspects of a cellular bridge 1515 as described herein. Wireless device 2405 may include receiver 2410, cellular bridge communications manager 2415, and transmitter 2420. Wireless device 2405 may also include a processor. Each of these components may be in communication with one another (e.g., via one or more buses).

Receiver 2410 may receive information such as packets, user data, or control information associated with various information channels (e.g., control channels, data channels, and information related to Ethernet over cellular, etc.). Information may be passed on to other components of the device. The receiver 2410 may be an example of aspects of the transceiver 2735 described with reference to FIG. 27. The receiver 2410 may utilize a single antenna or a set of antennas.

Receiver 2410 may receive, at a cellular bridge of a local area network including the cellular bridge and other network bridges, a first BPDU from a neighboring network bridge, the cellular bridge including a wireless link between a first cellular node and a second cellular node and receive, from the second bridge, a second auto-negotiation transmission that includes an indication of one or more supported port speeds for the second bridge.

Cellular bridge communications manager 2415 may be an example of aspects of the cellular bridge communications manager 2715 described with reference to FIG. 27.

Cellular bridge communications manager 2415 and/or at least some of its various sub-components may be implemented in hardware, software executed by a processor, firmware, or any combination thereof. If implemented in software executed by a processor, the functions of the cellular bridge communications manager 2415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The cellular bridge communications manager 2415 and/or at least some of its various sub-components may be physically located at various positions, including being distributed such that portions of functions are implemented at different physical locations by one or more physical devices. In some examples, cellular bridge communications manager 2415 and/or at least some of its various sub-components may be a separate and distinct component in accordance with various aspects of the present disclosure. In other examples, cellular bridge communications manager 2415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Cellular bridge communications manager 2415 may identify a cost for the wireless link between the first cellular node and the second cellular node. The cellular bridge communications manager 2415 may also identify, at a first cellular bridge of cellular local area network including the first cellular bridge and other network bridges, a value for one or more parameters of a wireless link between a first cellular node of the first cellular bridge and a second cellular node of the first cellular bridge and determine one or more supported port speeds of the first cellular bridge based on the identified value for the one or more parameters of the wireless link.

Transmitter 2420 may transmit signals generated by other components of the device. In some examples, the transmitter 2420 may be collocated with a receiver 2410 in a transceiver module. For example, the transmitter 2420 may be an example of aspects of the transceiver 2735 described with reference to FIG. 27. The transmitter 2420 may utilize a single antenna or a set of antennas.

Transmitter 2420 may transmit, to one or more other neighboring network bridges of the local area network, a second BPDU including the identified cost for the wireless link, transmit the second BPDU includes forwarding the second BPDU toward the one or more other neighboring networks bridges, and transmit, to a second bridge of the local area network, a first auto-negotiation transmission that includes an indication of the one or more supported port speeds for the first cellular bridge, where the second bridge includes one or more of the other network bridges or a second cellular bridge.

Figure 25:
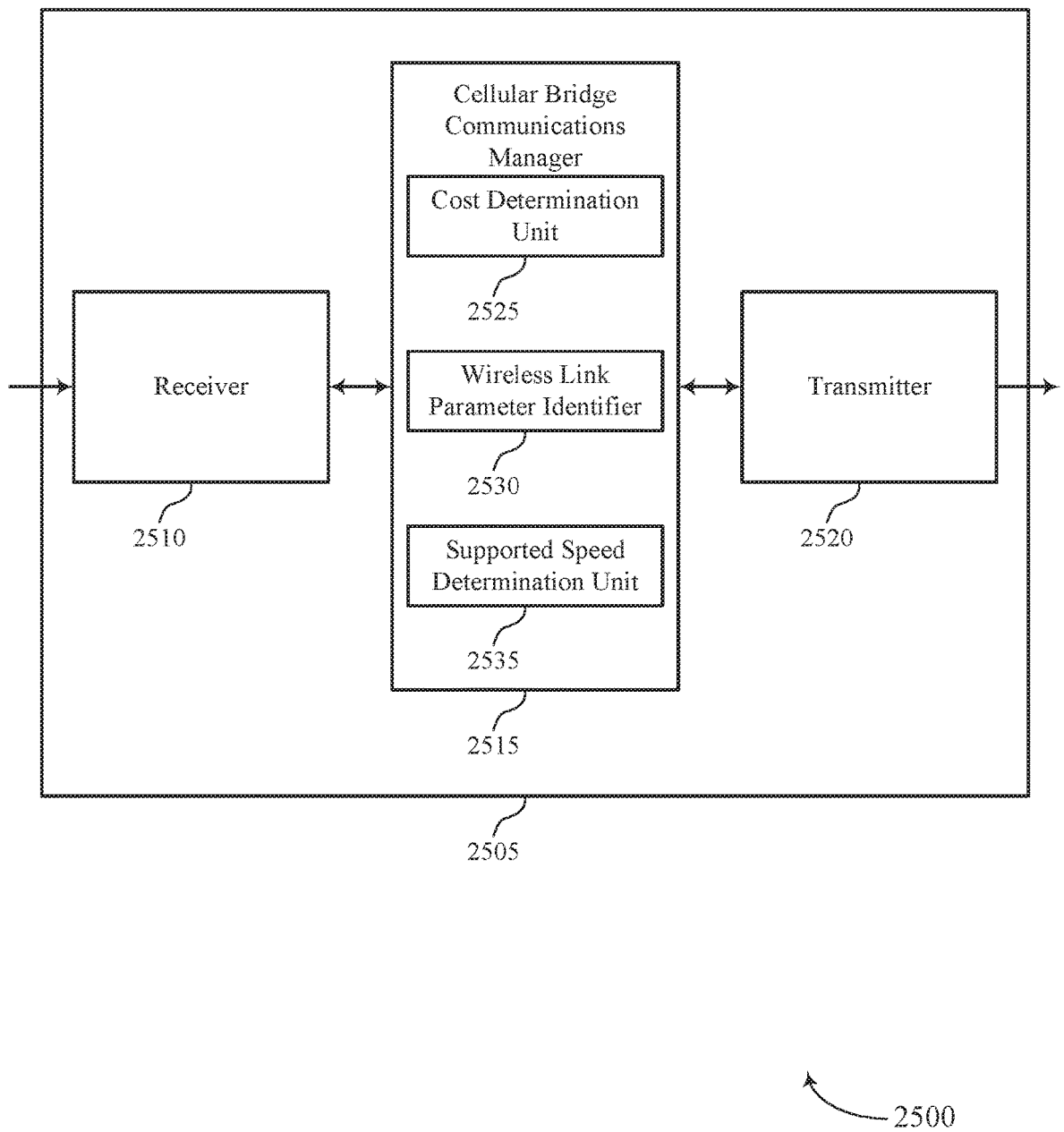

FIG. 25 shows a block diagram 2500 of a wireless device 2505 that supports Ethernet over cellular in accordance with aspects of the present disclosure. Wireless device 2505 may be an example of aspects of a wireless device 2405 or a cellular bridge as described with reference to FIG. 24. Wireless device 2505 may include receiver 2510, cellular bridge communications manager 2515, and transmitter 2520. Wireless device 2505 may also include a processor. Each of these components may be in communication with one another (e.g., via one or more buses).

Receiver 2510 may receive information such as packets, user data, or control information associated with various information channels (e.g., control channels, data channels, and information related to Ethernet over cellular, etc.). Information may be passed on to other components of the device. The receiver 2510 may be an example of aspects of the transceiver 2735 described with reference to FIG. 27. The receiver 2510 may utilize a single antenna or a set of antennas.

Cellular bridge communications manager 2515 may be an example of aspects of the cellular bridge communications manager 2715 described with reference to FIG. 27.

Cellular bridge communications manager 2515 may also include cost determination unit 2525, wireless link parameter identifier 2530, and supported speed determination unit 2535.

Cost determination unit 2525 may identify a cost for the wireless link between the first cellular node and the second cellular node and identify the cost for the wireless link between the first cellular node and the second cellular node is based on an identification that the BPDU is received at the UE, or that the BPDU is received at the P-GW or UPF. In some cases, the identified cost for the wireless link includes a fixed value, or a value indicating a downlink capacity of the wireless link, or a value indicating an uplink capacity of the wireless link, or a combination thereof.

Wireless link parameter identifier 2530 may identify, at a first cellular bridge of a local area network including the first cellular bridge and other network bridges, a value for one or more parameters of a wireless link between a first cellular node of the first cellular bridge and a second cellular node of the first cellular bridge. In some cases, the one or more parameters of the wireless link include a cellular node category, or an available bandwidth, or a duplexing mode, or a signal strength measurement, or a combination thereof.

Supported speed determination unit 2535 may determine one or more supported port speeds of the first cellular bridge based on the identified value for the one or more parameters of the wireless link and determine a port speed for communications between the first cellular bridge and the second bridge based on the one or more supported port speeds for the first cellular bridge and the one or more supported port speeds for the second bridge.

Transmitter 2520 may transmit signals generated by other components of the device. In some examples, the transmitter 2520 may be collocated with a receiver 2510 in a transceiver module. For example, the transmitter 2520 may be an example of aspects of the transceiver 2735 described with reference to FIG. 27. The transmitter 2520 may utilize a single antenna or a set of antennas.

Figure 26:
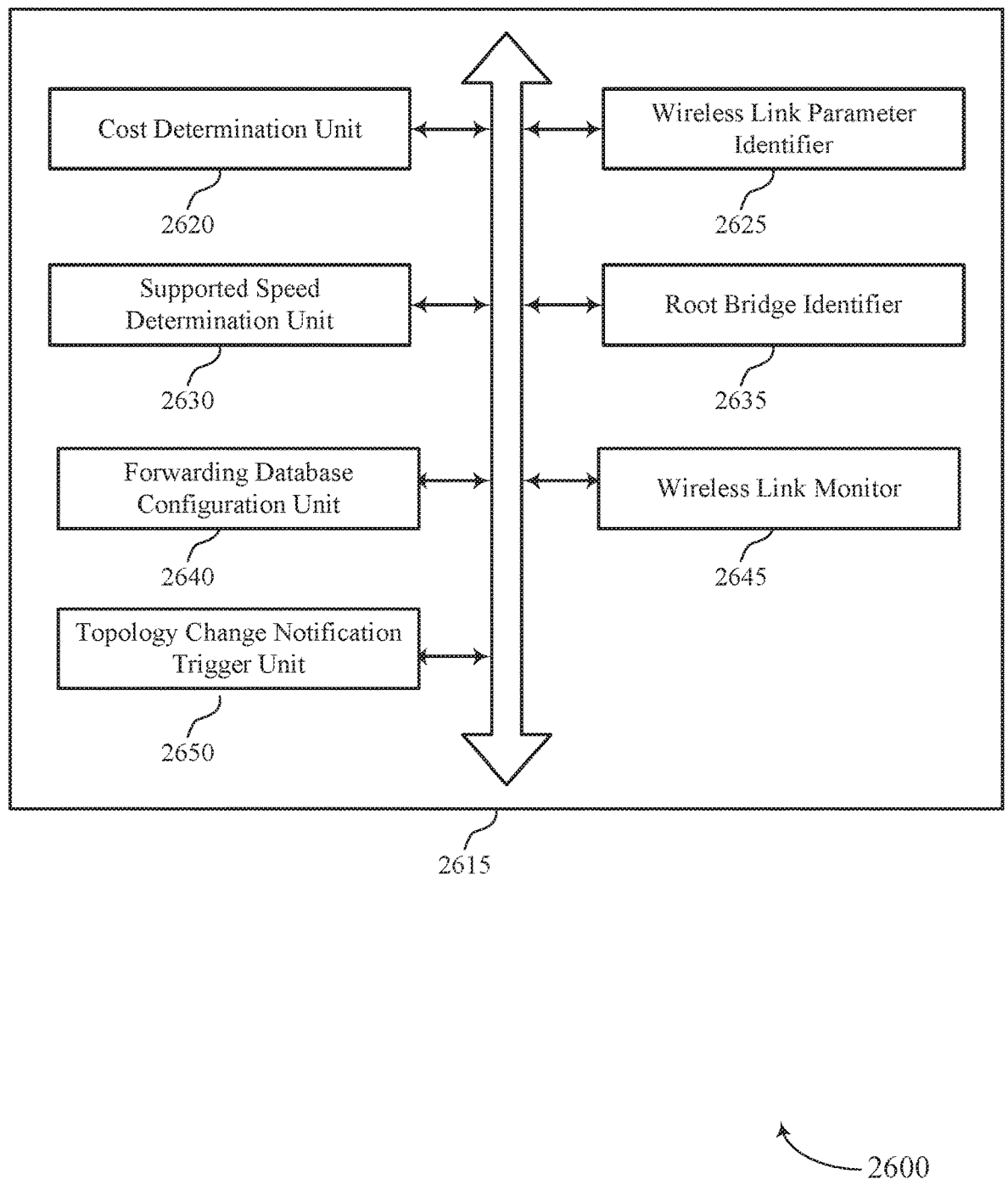

FIG. 26 shows a block diagram 2600 of a cellular bridge communications manager 2615 that supports Ethernet over cellular in accordance with aspects of the present disclosure. The cellular bridge communications manager 2615 may be an example of aspects of a cellular bridge communications manager 2715 described with reference to FIGS. 24, 25, and 27. The cellular bridge communications manager 2615 may include cost determination unit 2620, wireless link parameter identifier 2625, supported speed determination unit 2630, root bridge identifier 2635, forwarding database configuration unit 2640, wireless link monitor 2645, and topology change notification trigger unit 2650. Each of these modules may communicate, directly or indirectly, with one another (e.g., via one or more buses).

Cost determination unit 2620 may identify a cost for the wireless link between the first cellular node and the second cellular node and identify the cost for the wireless link between the first cellular node and the second cellular node is based on an identification that the BPDU is received at the UE, or that the BPDU is received at the P-GW or UPF. In some cases, the identified cost for the wireless link includes a fixed value, or a value indicating a downlink capacity of the wireless link, or a value indicating an uplink capacity of the wireless link, or a combination thereof.

Wireless link parameter identifier 2625 may identify, at a first cellular bridge of a local area network including the first cellular bridge and other network bridges, a value for one or more parameters of a wireless link between a first cellular node of the first cellular bridge and a second cellular node of the first cellular bridge. In some cases, the one or more parameters of the wireless link include a cellular node category, or an available bandwidth, or a duplexing mode, or a signal strength measurement, or a combination thereof.

Supported speed determination unit 2630 may determine one or more supported port speeds of the first bridge based on the identified value for the one or more parameters of the wireless link and determine a port speed for communications between the first bridge and the second bridge based on the one or more supported port speeds for the first bridge and the one or more supported port speeds for the second bridge.

Root bridge identifier 2635 may identify a root bridge of the local area network.

In some cases, the cellular bridge communications manager 2615 may communicate in a first VLAN of the local area network using one or more first ports and a second VLAN of the local area network using one or more second ports. In some cases, the cellular bridge communications manager 2615 includes or is part of a UE, or a P-GW, or a UPF, or a combination thereof.

Forwarding database configuration unit 2640 may maintain a first forwarding database for the first VLAN and maintain a second forwarding database for the second VLAN.

Wireless link monitor 2645 may determine that the wireless link is unavailable, where determining that the wireless link is unavailable includes at least one of determining that the wireless link has been lost and determining that a channel quality of the wireless link has degraded past a channel quality threshold.

Topology change notification trigger unit 2650 may trigger a topology change notification based on determining that the wireless link is unavailable.

Figure 27:
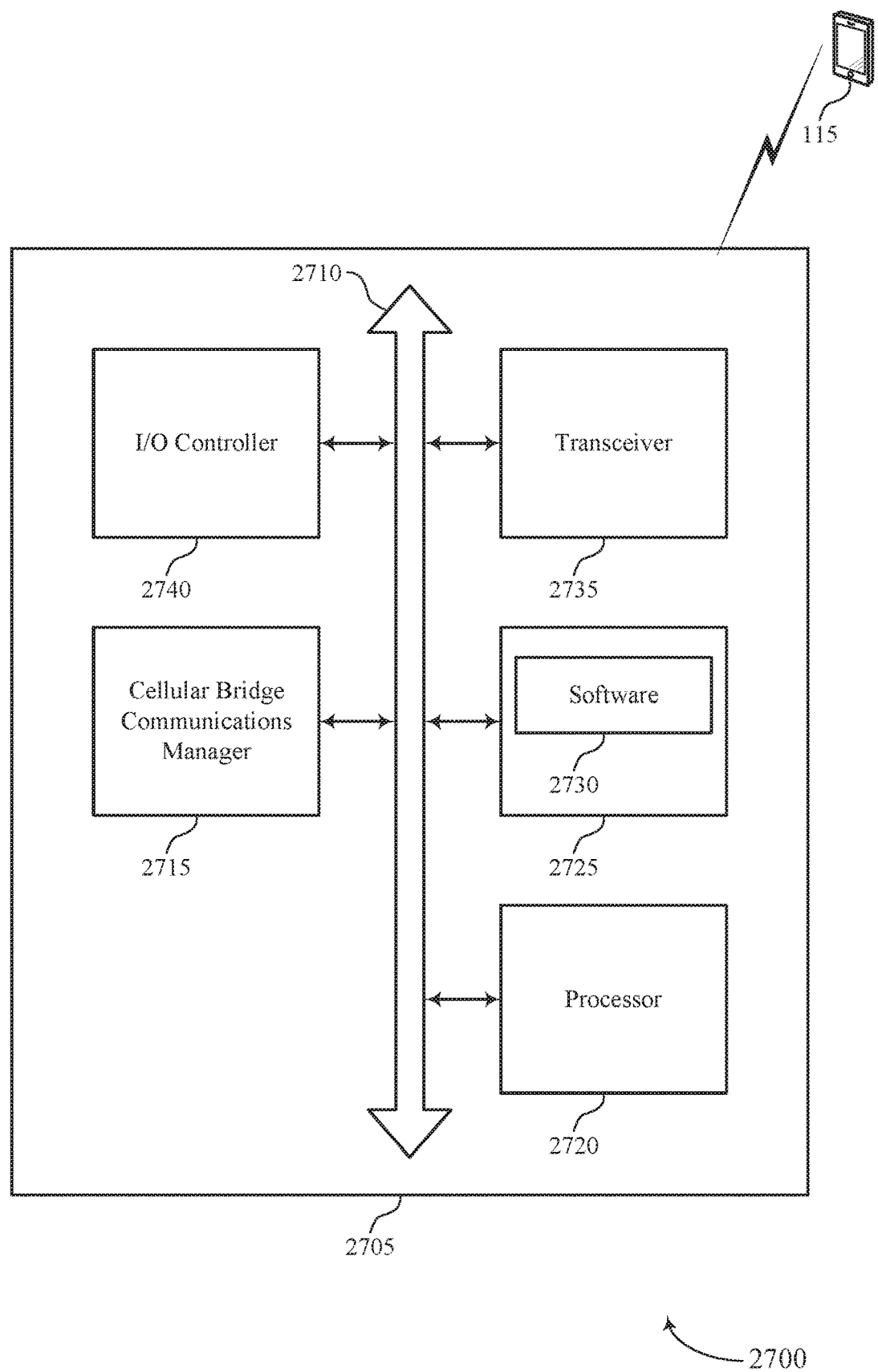
FIG. 27 illustrates a block diagram of a system including a cellular bridge that supports Ethernet over cellular in accordance with aspects of the present disclosure.

FIG. 27 shows a diagram of a system 2700 including a device 2705 that supports Ethernet over cellular in accordance with aspects of the present disclosure. Device 2705 may be an example of or include the components of cellular bridge as described above, e.g., with reference to FIG. 1. Device 2705 may include components for bi-directional voice and data communications including components for transmitting and receiving communications, including cellular bridge communications manager 2715, processor 2720, memory 2725, software 2730, transceiver 2735, and I/O controller 2740. These components may be in electronic communication via one or more buses (e.g., bus 2710).

Processor 2720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2720 may be configured to operate a memory array using a memory controller. In other cases, a memory controller may be integrated into processor 2720. Processor 2720 may be configured to execute computer-readable instructions stored in a memory to perform various functions (e.g., functions or tasks supporting Ethernet over cellular).

Memory 2725 may include RAM and ROM. The memory 2725 may store computer-readable, computer-executable software 2730 including instructions that, when executed, cause the processor to perform various functions described herein. In some cases, the memory 2725 may contain, among other things, a BIOS which may control basic hardware or software operation such as the interaction with peripheral components or devices.

Software 2730 may include code to implement aspects of the present disclosure, including code to support Ethernet over cellular. Software 2730 may be stored in a non-transitory computer-readable medium such as system memory or other memory. In some cases, the software 2730 may not be directly executable by the processor but may cause a computer (e.g., when compiled and executed) to perform functions described herein.

Transceiver 2735 may communicate bi-directionally, via one or more antennas, wired, or wireless links as described above. For example, the transceiver 2735 may represent a wireless transceiver and may communicate bi-directionally with another wireless transceiver. The transceiver 2735 may also include a modem to modulate the packets and provide the modulated packets to the antennas for transmission, and to demodulate packets received from the antennas.

I/O controller 2740 may manage input and output signals for device 2705. I/O controller 2740 may also manage peripherals not integrated into device 2705. In some cases, I/O controller 2740 may represent a physical connection or port to an external peripheral. In some cases, I/O controller 2740 may utilize an operating system such as iOS®, ANDROID®, MS-DOS®, MS-WINDOWS®, OS/2®, UNIX®, LINUX®, or another known operating system. In other cases, I/O controller 2740 may represent or interact with a modem, a keyboard, a mouse, a touchscreen, or a similar device. In some cases, I/O controller 2740 may be implemented as part of a processor. In some cases, a user may interact with device 2705 via I/O controller 2740 or via hardware components controlled by I/O controller 2740.

Figure 28:
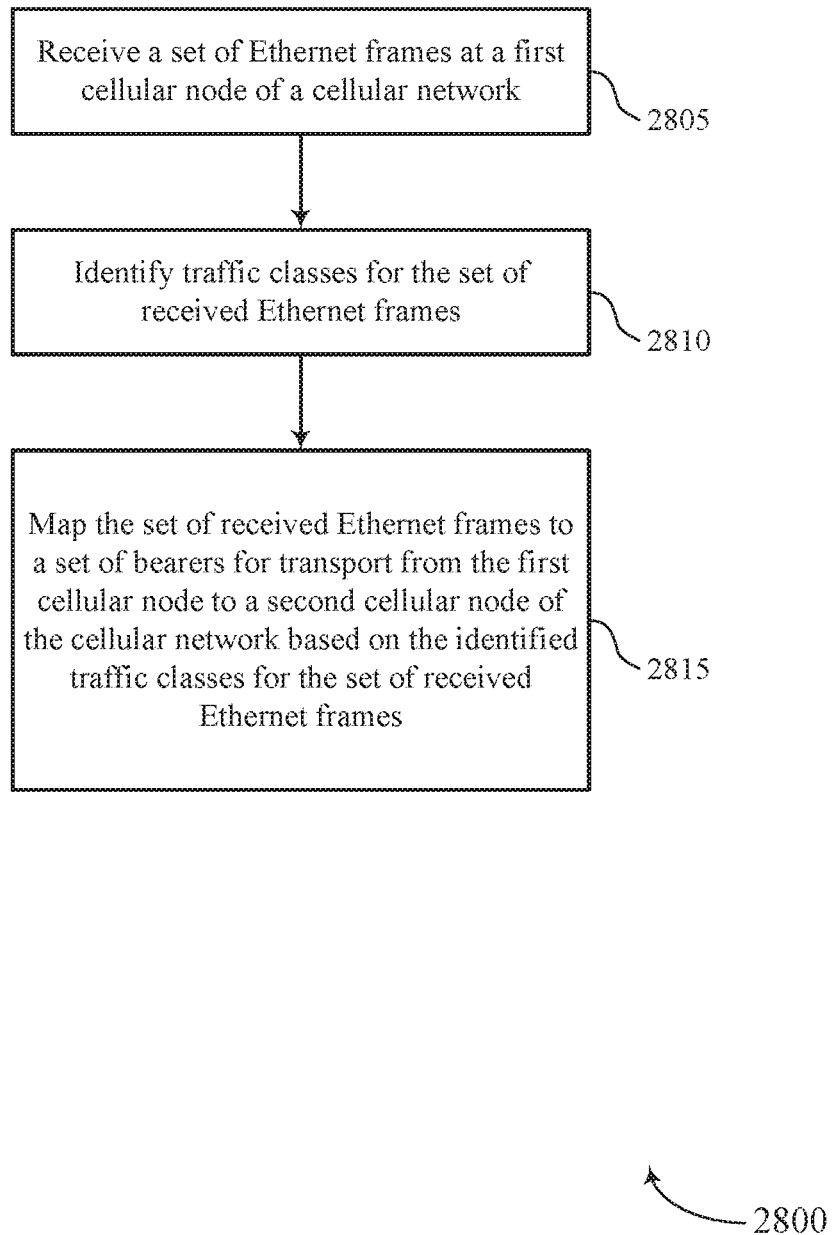
FIGS. 28 through 31 illustrate methods for Ethernet over cellular in accordance with aspects of the present disclosure.

FIG. 28 shows a flowchart illustrating a method 2800 for Ethernet over cellular in accordance with aspects of the present disclosure. The operations of method 2800 may be implemented by a cellular node (such as cellular node 225 or cellular node 505) or its components as described herein. For example, the operations of method 2800 may be performed by a cellular node communications manager as described with reference to FIGS. 16 through 19. In some examples, a cellular node may execute a set of codes to control the functional elements of the device to perform the functions described below. Additionally or alternatively, the cellular node may perform aspects of the functions described below using special-purpose hardware.

At block 2805 the cellular node may receive a plurality of Ethernet frames at a first cellular node of a cellular network. The operations of block 2805 may be performed according to the methods described herein. In certain examples, aspects of the operations of block 2805 may be performed by a receiver as described with reference to FIGS. 16 through 19.

At block 2810 the cellular node may identify traffic classes for the plurality of received Ethernet frames. The operations of block 2810 may be performed according to the methods described herein. In certain examples, aspects of the operations of block 2810 may be performed by a traffic classifier as described with reference to FIGS. 16 through 19.

At block 2815 the cellular node may map the plurality of received Ethernet frames to a plurality of bearers for transport from the first cellular node to a second cellular node of the cellular network based at least in part on the identified traffic classes for the plurality of received Ethernet frames. The operations of block 2815 may be performed according to the methods described herein. In certain examples, aspects of the operations of block 2815 may be performed by a traffic mapper as described with reference to FIGS. 16 through 19.

Figure 29:
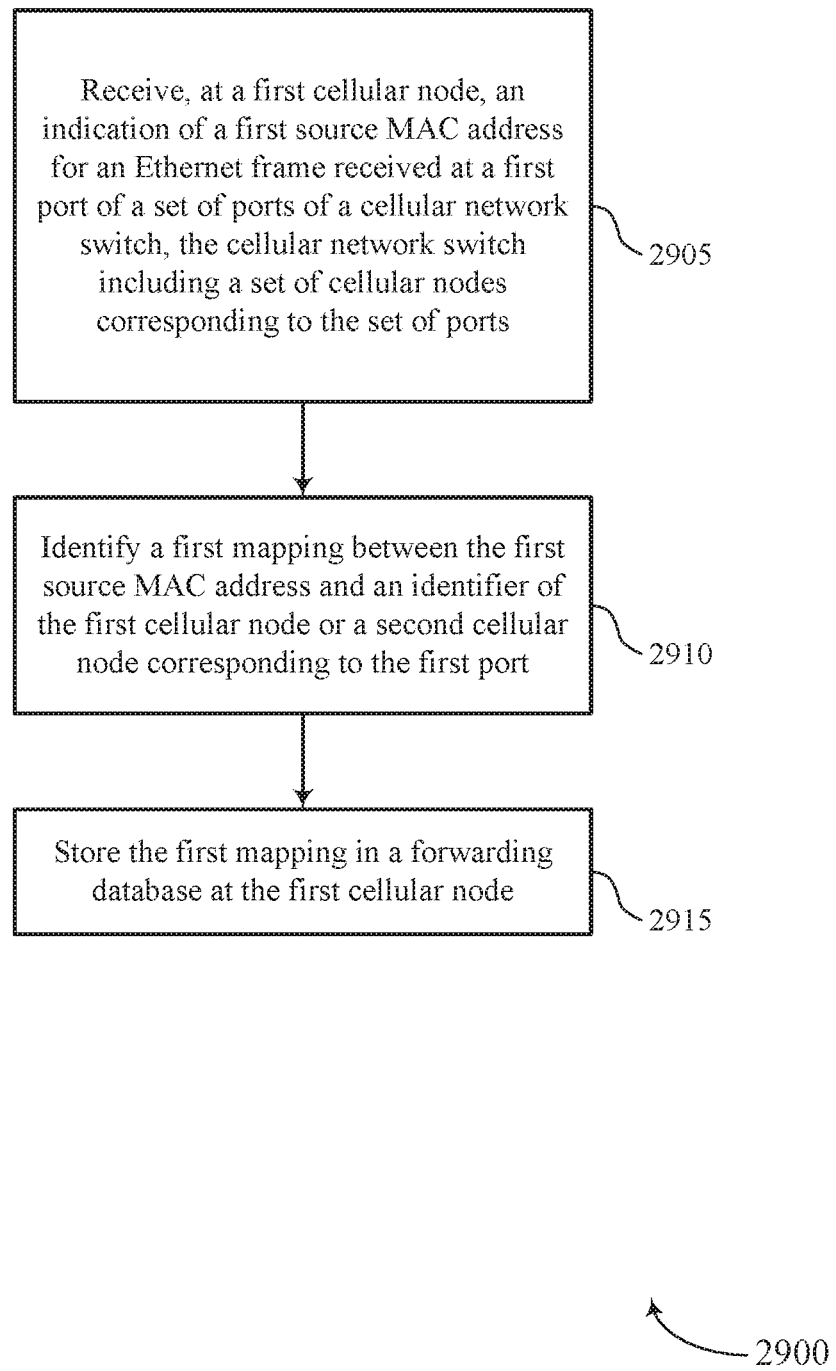

FIG. 29 shows a flowchart illustrating a method 2900 for Ethernet over cellular in accordance with aspects of the present disclosure. The operations of method 2900 may be implemented by a core network device (such as cellular node 225 or components of core network 130) or its components as described herein. For example, the operations of method 2900 may be performed by a core network device communications manager as described with reference to FIGS. 20 through 23. In some examples, a core network device may execute a set of codes to control the functional elements of the device to perform the functions described below. Additionally or alternatively, the core network device may perform aspects of the functions described below using special-purpose hardware.

At block 2905 the core network device may receive, at a first cellular node, an indication of a first source MAC address for an Ethernet frame received at a first port of a plurality of ports of a cellular network switch, the cellular network switch including a plurality of cellular nodes corresponding to the plurality of ports. The operations of block 2905 may be performed according to the methods described herein. In certain examples, aspects of the operations of block 2905 may be performed by a receiver as described with reference to FIGS. 20 through 23.

At block 2910 the core network device may identify a first mapping between the first source MAC address and an identifier of the first cellular node or a second cellular node corresponding to the first port. The operations of block 2910 may be performed according to the methods described herein. In certain examples, aspects of the operations of block 2910 may be performed by a source mapping identifier as described with reference to FIGS. 20 through 23.

At block 2915 the core network device may store the first mapping in a forwarding database at the first cellular node. The operations of block 2915 may be performed according to the methods described herein. In certain examples, aspects of the operations of block 2915 may be performed by a forwarding database configuration unit as described with reference to FIGS. 20 through 23.

Figure 30:
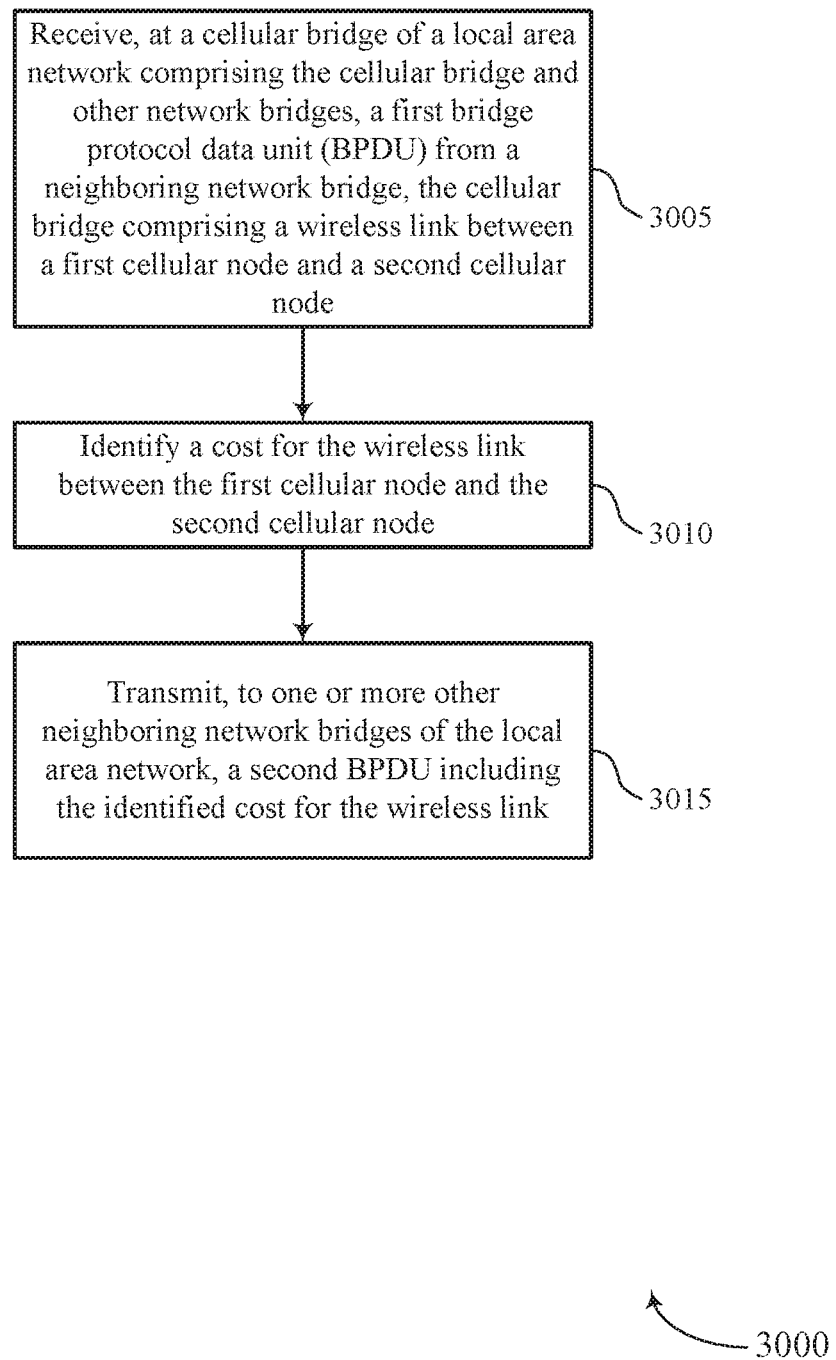

FIG. 30 shows a flowchart illustrating a method 3000 for Ethernet over cellular in accordance with aspects of the present disclosure. The operations of method 3000 may be implemented by a cellular bridge (such as EPC 1315 or cellular bridge 1515) or its components as described herein. For example, the operations of method 3000 may be performed by a cellular bridge communications manager as described with reference to FIGS. 24 through 27. In some examples, a cellular bridge may execute a set of codes to control the functional elements of the device to perform the functions described below. Additionally or alternatively, the cellular bridge may perform aspects of the functions described below using special-purpose hardware.

At block 3005 the cellular bridge may receive, at a cellular bridge of a local area network comprising the cellular bridge and other network bridges, a first bridge protocol data unit (BPDU) from a neighboring network bridge, the cellular bridge comprising a wireless link between a first cellular node and a second cellular node. The operations of block 3005 may be performed according to the methods described herein. In certain examples, aspects of the operations of block 3005 may be performed by a receiver as described with reference to FIGS. 24 through 27.

At block 3010 the cellular bridge may identify a cost for the wireless link between the first cellular node and the second cellular node. The operations of block 3010 may be performed according to the methods described herein. In certain examples, aspects of the operations of block 3010 may be performed by a cost determination unit as described with reference to FIGS. 24 through 27.

At block 3015 the cellular bridge may transmit, to one or more other neighboring network bridges of the local area network, a second BPDU including the identified cost for the wireless link. The operations of block 3015 may be performed according to the methods described herein. In certain examples, aspects of the operations of block 3015 may be performed by a transmitter as described with reference to FIGS. 24 through 27.

Figure 31:
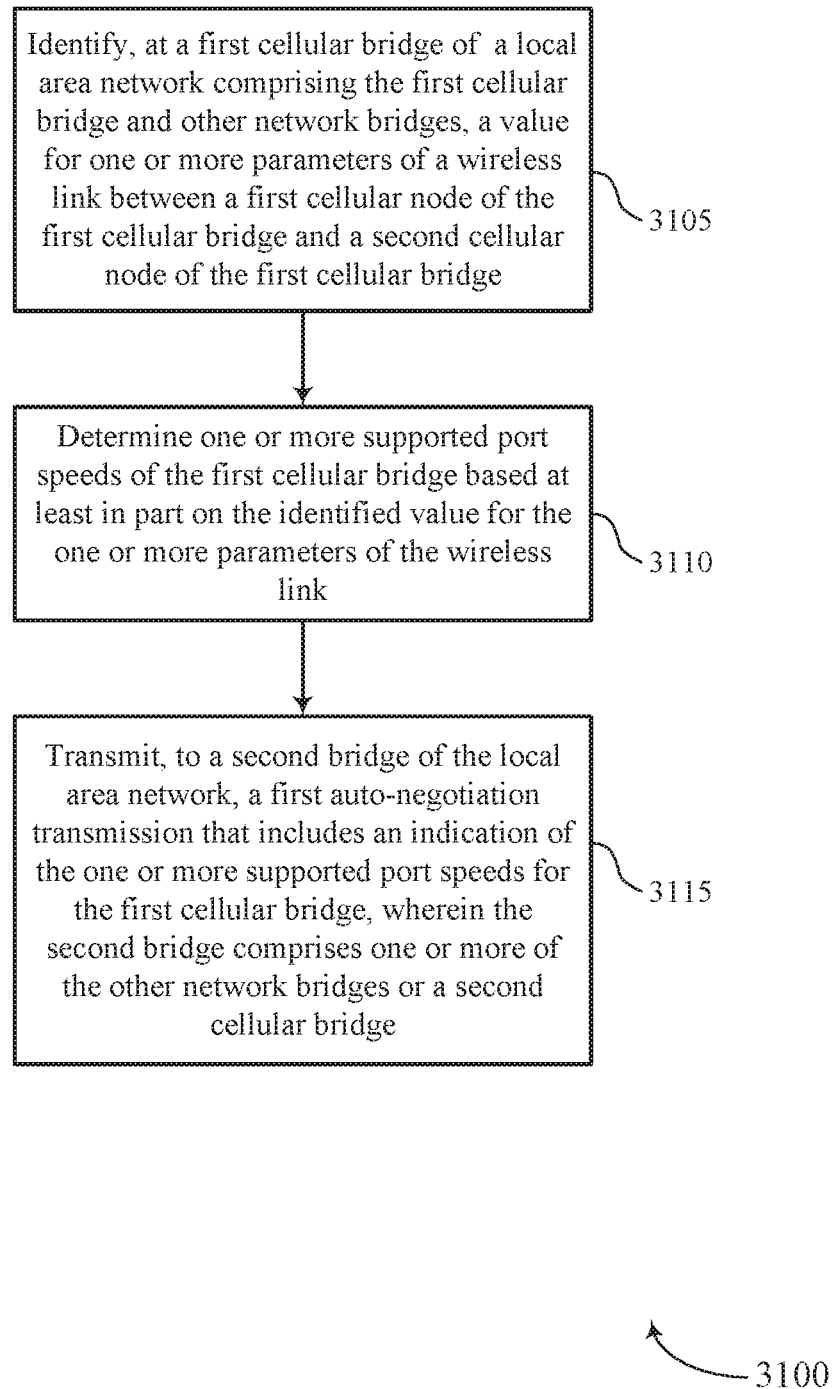

FIG. 31 shows a flowchart illustrating a method 3100 for Ethernet over cellular in accordance with aspects of the present disclosure. The operations of method 3100 may be implemented by a cellular bridge (such as EPC 1315 or cellular bridge 1515) or its components as described herein. For example, the operations of method 3100 may be performed by a cellular bridge communications manager as described with reference to FIGS. 24 through 27. In some examples, a cellular bridge may execute a set of codes to control the functional elements of the device to perform the functions described below. Additionally or alternatively, the cellular bridge may perform aspects of the functions described below using special-purpose hardware.

At block 3105 the cellular bridge may identify, at a first cellular bridge of a local area network comprising the first cellular bridge and other network bridges, a value for one or more parameters of a wireless link between a first cellular node of the first cellular bridge and a second cellular node of the first cellular bridge. The operations of block 3105 may be performed according to the methods described herein. In certain examples, aspects of the operations of block 3105 may be performed by a wireless link parameter identifier as described with reference to FIGS. 24 through 27.

At block 3110 the cellular bridge may determine one or more supported port speeds of the first bridge based at least in part on the identified value for the one or more parameters of the wireless link. The operations of block 3110 may be performed according to the methods described herein. In certain examples, aspects of the operations of block 3110 may be performed by a supported speed determination unit as described with reference to FIGS. 24 through 27.

At block 3115 the cellular bridge may transmit, to a second bridge of the local area network, a first auto-negotiation transmission that includes an indication of the one or more supported port speeds for the first cellular bridge, wherein the second bridge comprises one or more of the other network bridges or a second cellular bridge. The operations of block 3115 may be performed according to the methods described herein. In certain examples, aspects of the operations of block 3115 may be performed by a transmitter as described with reference to FIGS. 24 through 27.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and communications network 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, in a first forwarding database of a cellular network, one or more mappings between media access control (MAC) addresses for one or more Ethernet frames received at the cellular network and an identification for at least a first cellular node of a plurality of cellular nodes of the cellular network, wherein the first cellular node is identified by a first port of a plurality of ports of the cellular network and is coupled with one or more Ethernet devices via an Ethernet connection;
    receiving, at the first cellular node of the cellular network and from a base station of the cellular network via a cellular connection, an indication of a source MAC address for an Ethernet frame received by a second cellular node of the cellular network that is identified by a second port of the plurality of ports of the cellular network;
    identifying, in the first forwarding database, a first mapping between the source MAC address for the Ethernet frame received by the second cellular node and an identifier of the first cellular node corresponding to the first port or the second cellular node corresponding to the second port; and
    storing the first mapping in a second forwarding database at the first cellular node.

2. The method of claim 1, further comprising:
    receiving a broadcast, multicast, or unknown unicast Ethernet frame; and
    mapping the received broadcast, multicast, or unknown unicast Ethernet frame to a cellular broadcast channel or a plurality of unicast frames for a plurality of UEs.

3. The method of claim 1, wherein the cellular network comprises the plurality of cellular nodes that are identified by the plurality of ports.

4. The method of claim 1, further comprising:
    transmitting, to a third cellular node, the one or more mappings from the first forwarding database.

5. The method of claim 4, wherein:
the first cellular node comprises a user equipment (UE); and
the third cellular node comprises a node of next generation core (NGC).

6. The method of claim 1, further comprising:
receiving a second Ethernet frame at the second cellular node corresponding to the second port;
identifying a second source MAC address for the second Ethernet frame; and
updating the first forwarding database with a second mapping between the second source MAC address and the identifier of the first cellular node corresponding to the first port or the second cellular node corresponding to the second port.

7. The method of claim 6, wherein:
updating the first forwarding database comprises: identifying a first time indication in the first forwarding database for the first mapping;
the method further comprising comparing the first time indication to a second time indication for the second mapping; and
updating the first forwarding database with the second mapping based at least in part on the comparison.

8. The method of claim 6, further comprising:
monitoring a time indication in the first forwarding database for the first mapping;
identifying that the time indication exceeds an age threshold; and
removing the first mapping from the first forwarding database based at least in part on the identification.

9. The method of claim 1, further comprising:
receiving a second Ethernet frame at the first cellular node corresponding to the first port;
identifying a destination MAC address for the second Ethernet frame, the destination MAC address a same address as the source MAC address; and
routing the second Ethernet frame to the first cellular node or the second cellular node based at least in part on the identification and the first forwarding database.

10. The method of claim 1, wherein:
the identifier of the second cellular node comprises an international mobile subscriber identity (IMSI), or a subscription identifier, or a certificate identifier, or an access point name (APN), or a Data Network Name (DNN), or a General Packet Radio Service (GPRS) Tunneling Protocol (GTP) tunnel endpoint identifier (TED), or a combination thereof.

11. The method of claim 1, wherein:
the source MAC address is associated with a virtual local area network (VLAN) identifier, and identifying the first mapping between the source MAC address and the identifier of the first cellular node or the second cellular node comprises identifying a mapping between a source pair and the identifier of the first cellular node or the second cellular node, the source pair comprising the source MAC address and the associated VLAN identifier.

12. The method of claim 1, wherein:
the cellular network communicates in a first virtual local area network (VLAN) using the first port of the plurality of ports and a second VLAN using the second port of the plurality of ports.

13. The method of claim 12, further comprising:
maintaining a third forwarding database for the first VLAN; and
maintaining a fourth forwarding database for the second VLAN.

14. An apparatus for wireless communication, comprising:
a processor;
memory coupled with the processor; and
instructions stored in the memory and operable, when executed by the processor, to cause the apparatus to:
identify, in a first forwarding database of a cellular network, one or more mappings between media access control (MAC) addresses for one or more Ethernet frames received at the cellular network and an identification for at least a first cellular node of a plurality of cellular nodes of the cellular network, wherein the first cellular node is identified by a first port of a plurality of ports of the cellular network and is coupled with one or more Ethernet devices via an Ethernet connection;
receive, at the first cellular node of the cellular network and from a base station of the cellular network via a cellular connection, an indication of a source MAC address for an Ethernet frame received by a second cellular node of the cellular network that is identified by a second port of the plurality of ports of the cellular network;
identify, in the first forwarding database, a first mapping between the source MAC address for the Ethernet frame received by the second cellular node and an identifier of the first cellular node corresponding to the first port or the second cellular node corresponding to the second port; and
storing the first mapping in a second forwarding database at the first cellular node.

15. The apparatus of claim 14, wherein the instructions are further executable by the processor to:
receive a broadcast, multicast, or unknown unicast Ethernet frame; and
map the received broadcast, multicast, or unknown unicast Ethernet frame to a cellular broadcast channel or a plurality of unicast frames for a plurality of UEs.

16. The apparatus of claim 14, wherein the instructions are further executable by the processor to:
provide the one or more mappings from the first forwarding database to a third cellular node of the plurality of cellular nodes.

17. The apparatus of claim 14, wherein the instructions are further executable by the processor to:
receive a second Ethernet frame at the second cellular node corresponding to the second port;
identify a second source MAC address for the second Ethernet frame; and
update the first forwarding database with a second mapping between the second source MAC address and the identifier of the first cellular node corresponding to the first port or the second cellular node corresponding to the second port.

18. The apparatus of claim 17, wherein:
updating the first forwarding database comprises: identifying a first time indication in the first forwarding database for the first mapping;
the instructions are further executable to compare the first time indication to a second time indication for the second mapping; and
update the first forwarding database with the second mapping based at least in part on the comparison.

19. The apparatus of claim 17, wherein the instructions are further executable by the processor to:

monitor a time indication in the first forwarding database for the first mapping;
identify that the time indication exceeds an age threshold; and
remove the first mapping from the first forwarding database based at least in part on the identification.

20. The apparatus of claim 16, wherein:
the first cellular node comprises a user equipment (UE); and
the third cellular node comprises a node of next generation core (NGC).

21. The apparatus of claim 14, wherein the cellular network comprises the plurality of cellular nodes that are identified by the plurality of ports.

22. The apparatus of claim 14, wherein the instructions are further executable by the processor to:
receive a second Ethernet frame at the first cellular node identified by the first port;
identify a destination MAC address for the second Ethernet frame, the destination MAC address a same address as the source MAC address; and
route the second Ethernet frame to the first cellular node identified by the first port or the second cellular node identified by the second port based at least in part on the identification and the first forwarding database.

23. The apparatus of claim 14, wherein:
the identifier of the second cellular node comprises an international mobile subscriber identity (IMSI), or a subscription identifier, or a certificate identifier, or an access point name (APN), or a Data Network Name (DNN), or a General Packet Radio Service (GPRS) Tunneling Protocol (GTP) tunnel endpoint identifier (TEID), or a combination thereof.

24. The apparatus of claim 14, wherein:
the source MAC address is associated with a virtual local area network (VLAN) identifier, and identifying the first mapping between the source MAC address and the identifier of the first cellular node or the second cellular node comprises identifying a mapping between a source pair and the identifier of the first cellular node or the second cellular node, the source pair comprising the source MAC address and the associated VLAN identifier.

25. The apparatus of claim 14, wherein:
the cellular network communicates in a first virtual local area network (VLAN) using the first port of the plurality of ports and a second VLAN using the second port of the plurality of ports.

26. The apparatus of claim 25, wherein the instructions are further executable by the processor to:
maintain a third forwarding database for the first VLAN; and
maintain a fourth forwarding database for the second VLAN.

27. An apparatus for wireless communication, comprising:
means for identifying, in a first forwarding database of a cellular network, one or more mappings between media access control (MAC) addresses for one or more Ethernet frames received at the cellular network and an identification for at least a first cellular node of a plurality of cellular nodes of the cellular network, wherein the first cellular node is identified by a first port of a plurality of ports of the cellular network and is coupled with one or more Ethernet devices via an Ethernet connection;
means for receiving, at the first cellular node of the cellular network and from a base station of the cellular network via a cellular connection, an indication of a source MAC address for an Ethernet frame received by a second cellular node of the cellular network that is identified by a second port of the plurality of ports of the cellular network;
means for identifying, in the first forwarding database, a first mapping between the source MAC address for the Ethernet frame received by the second cellular node and an identifier of the first cellular node corresponding to the first port or the second cellular node corresponding to the second port; and
means for storing the first mapping in a second forwarding database at the first cellular node.

28. A non-transitory computer-readable medium storing code for wireless communications, the code comprising instructions executable by a processor to:
identify, in a first forwarding database of a cellular network, one or more mappings between media access control (MAC) addresses for one or more Ethernet frames received at the cellular network and an identification for at least a first cellular node of a plurality of cellular nodes of the cellular network, wherein the first cellular node is identified by a first port of a plurality of ports of the cellular network and is coupled with one or more Ethernet devices via an Ethernet connection;
receive, at the first cellular node of the cellular network and from a base station of the cellular network via a cellular connection, an indication of a source MAC address for an Ethernet frame received by a second cellular node of the cellular network that is identified by a second port of the plurality of ports of the cellular network;
identify, in the first forwarding database, a first mapping between the source MAC address for the Ethernet frame received by the second cellular node and an identifier of the first cellular node corresponding to the first port or the second cellular node corresponding to the second port; and
store the first mapping in a second forwarding database at the first cellular node.

* * * * *